(12) United States Patent
Gatto et al.

(10) Patent No.: US 7,600,251 B2
(45) Date of Patent: *Oct. 6, 2009

(54) UNIVERSAL PEER-TO-PEER GAME DOWNLOAD

(75) Inventors: Jean-Marie Gatto, London (GB);
Thierry Brunet de Courssou, Henderson, NV (US)

(73) Assignee: IGT, Reno, NV (US)

( * ) Notice: Subject to any disclaimer, the term of this patent is extended or adjusted under 35 U.S.C. 154(b) by 986 days.

This patent is subject to a terminal disclaimer.

(21) Appl. No.: 11/172,518

(22) Filed: Jun. 29, 2005

(65) Prior Publication Data

US 2005/0282637 A1  Dec. 22, 2005

(51) Int. Cl.
*H04L 9/00* (2006.01)
*H04L 9/32* (2006.01)

(52) U.S. Cl. .............................. 726/1; 726/26; 726/27; 713/170; 713/189

(58) Field of Classification Search ............. 726/26–27, 726/30, 1; 713/161, 163, 165, 167–168, 713/170, 173, 176, 189, 192–194; 705/1–2, 705/57–59
See application file for complete search history.

(56) References Cited

U.S. PATENT DOCUMENTS

| | | |
|---|---|---|
| 5,265,874 A | 11/1993 | Dickinson et al. |
| 5,290,033 A | 3/1994 | Bittner et al. |
| 5,823,879 A | 10/1998 | Goldberg et al. |
| 5,920,861 A | 7/1999 | Hall et al. |
| 6,048,269 A | 4/2000 | Burns et al. |
| 6,077,163 A | 6/2000 | Walker et al. |
| 6,185,682 B1 * | 2/2001 | Tang ........................... 713/168 |
| 6,210,274 B1 | 4/2001 | Carlson |
| 6,428,413 B1 | 8/2002 | Carlson |
| 6,749,510 B2 | 6/2004 | Giobbi |
| 7,108,605 B2 * | 9/2006 | LeMay et al. .................. 463/43 |

(Continued)

FOREIGN PATENT DOCUMENTS

WO    0225409 A2    3/2002

(Continued)

OTHER PUBLICATIONS

MSDN Library, "RefreshPolicy" (downloaded on Feb. 19, 2004).

(Continued)

*Primary Examiner*—Hosuk Song
(74) *Attorney, Agent, or Firm*—Young Law Firm, P.C.

(57) ABSTRACT

A universal peer-to-peer game download for future proof gaming machines and legacy gaming machines, not requiring a central server for downloading. A peer-to-peer network of gaming machines includes a network; a first gaming machine including a first locked enclosure, a first computing device disposed within the first locked enclosure for controlling game play on the first gaming machine, a first download-enabled computing device that is configured to be selectively coupled to the network and disposed within the first locked enclosure, and a second gaming machine. The first download enabled computing device is configured to couple to the second gaming machine over the network and to download a package authenticated by a certificate directly from the second gaming machine, the package including software components to be installed and executed on the first computing device.

93 Claims, 28 Drawing Sheets

U.S. PATENT DOCUMENTS

| | | |
|---|---|---|
| 7,152,158 B2 | 12/2006 | Watanabe et al. |
| 2001/0029205 A1 | 10/2001 | Taho et al. |
| 2001/0047348 A1 | 11/2001 | Davis |
| 2002/0026581 A1 | 2/2002 | Matsuyama et al. |
| 2002/0068631 A1 | 6/2002 | Raverdy et al. |
| 2002/0116615 A1 | 8/2002 | Nguyen et al. |
| 2002/0147040 A1 | 10/2002 | Walker et al. |
| 2003/0033255 A1 | 2/2003 | Burton et al. |
| 2003/0211881 A1 | 11/2003 | Walker et al. |
| 2004/0039911 A1 | 2/2004 | Oka et al. |
| 2004/0198496 A1 | 10/2004 | Gatto et al. |
| 2005/0282637 A1 | 12/2005 | Gatto et al. |
| 2006/0035713 A1 | 2/2006 | Cockerille |
| 2006/0046819 A1 | 3/2006 | Nguyen et al. |
| 2006/0046824 A1 | 3/2006 | Silva |
| 2007/0048714 A1 | 3/2007 | Plastina et al. |

FOREIGN PATENT DOCUMENTS

| | | |
|---|---|---|
| WO | WO 2004/080550 A2 | 9/2004 |

OTHER PUBLICATIONS

MSDN Library, "RegisterGPNotification" (downloaded on Feb. 12, 2004).
MSDN Library, "RefreshPolicyEx" (downloaded on Feb. 12, 2004).
Microsoft TechNet, MSIEXE command at http://www.microsoft.com/technet/prodtechnol/winxppro/ proddocs/msiexec.asp (downloaded on Feb. 16, 2004).
Microsoft Next-Generation Secure Computing Base ("NGSCB") (downloaded on Feb. 16, 2004).
Microsoft Corporation, "Using Software Restriction Policies to Protect Against Unauthorized Software" Microsoft Windows XP and Windows.NET Technical Article, pp. 1-50 (Jan. 2002).
M. Myers et al., "Certificate Management Messages over CMS", ftp://ftp.isi.edu/in-notes/rfc2797.txt (Apr. 2000).
R. Housley et al., "Internet X.509 Public Key Infrastructure Certificate and Certificate Revocation List (CRL) Profile", ftp://ftp.isi.edu/in-notes/rfc3280.txt (Apr. 2002).
M. Nystrom et al., "PKCS #10: Certification Request Syntax Specification Version 1.7", ftp://ftp.isi.edu/in-notes/rfc2986.txt (Nov. 2000).
Enterprise News and Reviews, "Microsoft: Why Longhorn Matters", http://www.eweek.com/article2/0,1759,1786193,00.asp, printed Apr. 15, 2005.
Mary Jo Foley, "Microsoft dusts off 'Palladium' security for Longhorn", Microsoft Watch, http://www.microsoft-watch.com/article2/0,1995,1786571,00.asp, printed Apr. 15, 2005.
Paula Rooney, "Ballmer Touts Interop with Sun, Trusted Computing Group", http://www.crn.com/sections/breakingnews/breakingnews.jhtml?articleld=160911712, printed Apr. 20, 2005.
Microsoft Corp., "Microsoft CEO Steve Ballmer Affirms Commitment to Dynamic Systems Initiative", Press Release, printed Apr. 20, 2005.
Sygate Technologies, "Sygate Supports Microsoft and Trusted Computing Group Alignment for Defining Endpoint Enforcement Standards", Press Release, printed Apr. 20, 2005.
Sygate web site, "Policy Enforcement", printed Apr. 20, 2005.
Barbara Darrow and Paula Rooney, "Allchin Talks Turkey About Longhorn", http://www.crn.com/sections/breakingnews/dailyarchives.jhtml;jsessionid=2P2WCO1SRT, printed Apr. 18, 2005.
Microsoft manual, "Windows Installer v3.0 RC1 (MSI3.0)", Published Sep. 2003, Revised Mar. 2004, 27 pgs.
Microsoft manual, Windows Installer v3.0 RC1 Patch Sequencing (Draft Whitepaper), Published Mar. 2004, 51 pgs.
Microsoft manual, "Using Administrative Template Files with Registry-Based Group Policy", Published Sep. 2004, 58 pgs.
Microsoft, "Frequently Asked Questions About Windows Installer", Published Aug. 26, 2002, http://microsoft.com/windows2000/community/centers/management/msi_faq.mspx, printed May 5, 2005.
Microsoft, "How to add a Windows 2000 ADM template to a Group Policy snap-in in Office XP", http://support.microsoft.com/default.aspx?scid=kb;en-us;307732, printed Apr. 15, 2005.
Microsoft, "Using Administrative Template Files with Registry-E Group Policy", published Oct. 11, 2004, 41 pgs, http://www.microsoft.com/technet/prodtechnol/windowsserver2003/technologies/manage..., printed Apr. 15, 2005.
International Search Report mailed May 11, 2005, in related International Application No. PCT/US2004/006045, filed Feb. 27, 2005 (3pgs).
Written Opinion mailed May 11, 2005, in related International Application No. PCT/US2004/006045, filed Feb. 27, 2005 (10pgs).
Office Action mailed Jun. 30, 2005, in parent U.S. Appl. No. 10/789,975, filed Feb. 27, 2004 (14pgs).
International Search Report dated Mar. 30, 2007, in related International Application No. PCT/US06/35560, filed Sep. 12, 2006.
Written Opinion dated Mar. 30, 2007, in related International Application No. PCT/US06/35560, filed Sep. 12, 2006.
International Search Report dated Apr. 20, 2007, in related International Application No. PCT/US06/10926, filed Mar. 24. 2006.
Written Opinion dated Apr. 20, 2007, in related International Application No. PCT/US06/10926, filed Mar. 24, 2006.
International Preliminary Report on Patentability dated Jun. 5, 2007, in related International Application No. PCT/US04/06045, filed Feb. 27, 2004.
Office Action mailed Jun. 27, 2007 in related U.S. Appl. No. 11/138,736, filed May 25, 2005.
International Search Report mailed Sep. 19, 2007, in related International Application No. PCT/US06/12043, filed Mar. 31, 2006.
Written Opinion of the International Searching Authority mailed Sep. 19, 2007, in related International Application No. PCT/US06/12043, filed Mar. 31, 2006.
Notice of Allowance mailed Nov. 21, 2007, in related U.S. Appl. No. 11/138,736, filed May 25, 2005.
International Search Report mailed Feb. 28, 2008, in related International Application No. PCT/US07/81574, filed Feb. 2, 2007.
Written Opinion of the International Searching Authority mailed Feb. 28, 2008, in related International Application No. PCT/US07/81574, filed Feb. 2, 2007.
Office Action mailed Oct. 19, 2007, in related U.S. Appl. No. 10/789,975, filed Feb. 27, 2004.
Notice of Allowance mailed Nov. 21, 2007, in related U.S. Appl. No. 11/138,736, filed May 25, 2005.
Final Office Action mailed May 13, 2008, in parent U.S. Appl. No. 10/789,975, filed Feb. 27, 2004.
Office Action mailed May 13, 2008, in related U.S. Appl. No. 11/277,026, filed Mar. 20, 2006.
International Search Report and Written Opinion of the International Searching Authority in related PCT application PCT/US08/60899, mailed Aug. 22, 2008.
International Preliminary Examination Report of Jan. 2, 2009 in corresponding PCT application PCT/US06/12043 (16 pages).
Whistler Server Resource Kit documentation, Chapter 12, "Designing a Public Key Infrastructure", (86 pages) (C) 1985-2001 Microsoft Corporation. All rights reserved.

\* cited by examiner

FIG. 4

Certificate

General | Details | Certification Path

Show: Extensions Only

| Field | Value |
|---|---|
| Basic Constraints | Subject Type=End Entity, Pat... |
| Certificate Policies | [1]Certificate Policy:Policy Ide... |
| Netscape Cert Type | SSL Client Authentication (80) |
| 2.16.840.1.113733.1.6.7 | 16 04 4e 6f 6e 65 |
| CRL Distribution Points | [1]CRL Distribution Point: Distr... |

1/21

Edit Properties...      Copy to File...

OK

| Component File Name | Part Number | Version | Subject Name for Code-Sign PKI Certificate |
|---|---|---|---|
| Infinity.dll | 0099-00001-00 | 1.0.101.0 | GDS.exe.0099-00001-00[1.0.1.0] Infinity.dll |
| Infinity.Hello.dll | 0099-00001-99 | 1.0.5.0 | GDS.exe.0099-00001-00[1.0.1.0] Infinity.dll |

UNIVERSAL PEER-TO-PEER GAME DOWNLOAD

CROSS-REFERENCE TO RELATED CASES

This application is related in subject matter to Ser. No. 10/789,975, filed Feb. 27, 2004, which application is hereby incorporated herein by reference in its entirety.

BACKGROUND OF THE INVENTION

1. Field of the Invention

The present inventions relate generally to the field of network connected pay computer-controlled games, either games of skills or games of chance, and more particularly to the field of automated monitoring and control of a large number of clusters of pay gaming terminals. The gaming terminals may be slot machines, video lotteries, bingo systems or lottery terminals in all their forms; that is, desktop terminals, wall or pedestal mounted kiosks, or full size consoles, operating either in a local area network (LAN) or in a wide area network (WAN). The present inventions also relate to the monitoring, control and payment systems linked to the gaming terminals.

2. Description of the Prior Art and Related Information

Pay entertainment and gaming systems of the prior art, either of the cash-in or of the cash-less type, are seriously limited due to the technical choices made in order to comply with gaming regulatory requirements. Regulators are mainly concerned with funds that may be illegally acquired by individuals as well as with funds that may not be acquired by legitimate winners as a result of flaws, cheating and/or stealing. Game regulators are reluctant to accept state-of-the-art operating systems, multimedia and Internet technologies because of security concerns and tend to favor antiquated technology based upon secrecy rather that "open" state-of-the-art technology. A "Request/Authorize" method for downloadable games has been proposed by another company (IGT's Secure Virtual Network in a Gaming Environment—Publication U.S. 2002/0116615 A1) but the method disclosed therein does not cover how to ensure that only certified authorized components may execute.

Although downloadable games are undeniably going to flourish, they have yet to create confidence within the regulatory arena.

SUMMARY OF THE INVENTION

Embodiments of the present invention overcome the security limitations of the prior art and allow game operators the flexibility to dynamically configure their estate of gaming terminals. It is to be noted that although the gaming industry has coined the term "downloadable game" and that gaming standard GLI-21 entitled "Game Download System" has been published by Game Laboratory International (GLI), the term downloadable game is rather restrictive, as the downloading of software components to computer terminals and computer servers is by itself pervasive in any network distributed computer system. However, downloading certified game components in a secure manner is a problem that has yet to find a satisfactory solution.

Embodiments of the present invention may allocate an individual PKI certificate to each executable software component and each of its versions, binding the PKI certificate to the executable software and associating a distinctive policy for each PKI certificate. The PKI certificate's "Subject Name" (or "Issued to" field, or "CommonName" field) may be a concatenation of the software component identification, its version number and optionally other identification characters, for example.

According to other embodiments, the present invention offers a method to enable dynamic configuration of gaming terminals installed in one or a plurality of gaming premises whereby certified games, certified data files and certified support software components may be activated in accordance with a predetermined schedule or automatically in response to the observed gaming activity. This may be accomplished by configuring and then enforcing the software execution policies for selected PKI certificates in accordance with the desired authorized game configuration and schedule.

Further embodiments of the present invention offer a method to ensure the trust of non-executable files such as initialization or configuration files, video files, sound files, multimedia files, file containing list of hashes, CRCs, and/or signatures. This method relies on the certificate Software Restriction Policy as described herein.

Still further embodiments of the invention enable the certification authority to bind the certificates to the tested software components.

The present invention, according to still further embodiments thereof enables a dynamic generation of the list of games made available to the players without transferring a configuration file or files from the central server to the gaming machines. For example, a method according to an embodiment of the present invention relies on attempting to execute a game component on which a certificate Software Restriction Policy is enforced.

Embodiments of the present invention leverage the technology described in commonly assigned U.S. patent application filing 60/393,892 entitled—"Secure Game Download" in which code signing and Software Restriction Policy enable executing authorized game software. Code signing and Software Restriction Policy (SRP) technologies are available in Microsoft Windows XP, Windows 2000 and Windows 2003, Embedded Windows XP as well as in future Windows versions (as of this writing, the next version is code-named "Longhorn") to ensure that only executable software components from a trusted publisher, let's say "Microsoft", are allowed to run. Code signing and Software Restriction Policy technology are applied to executable components such as *.exe, *.dll, *.ocx, *.vbs, *.msi, *.cab, etc. In addition, Software Installation Policy (SIP) ensures that software components are installed in a controlled fashion. Embodiments of the present invention extend the use of code signing, Software Restriction Policy and Software Installation Policy to individual software components that are allowed to execute in a network connected gaming system by associating a distinctive code-signing certificate to each executable software component. Each executable software component version (usually comprising major version, minor version, revision and build) may have a unique certificate. A distinctive certificate may be created for each software component version and the two entities (the compiled code and the certificate) may be bound together by a code signing operation, herein called "signcode.exe".

Code signed software components may be packaged together with non-signed software components (if any) into a MSI Microsoft installation package (MSI=Microsoft Software Installation). An MSI package is an executable component that in turn receives a distinctive certificate bound to its content by a code signing operation. Only the software component version that has successfully passed the regulatory certification process may be allowed to run by enforcing an unrestricted policy to the associated certificate.

Moreover, embodiments of the present invention extend the use of code signing and Software Restriction Policy to ensure that only authorized non-executable components are used by the authorized executable components. This is of particular value for configuration files or media files that may affect the game outcome such as fixing the return to player at, for example, 95% between 5:00 PM and 11:00 PM, or at 98% during other time periods. For this, non-executable components may be placed in code signed MSI (Microsoft Software Installation) installation packages. Each individual MSI package is an executable component whose execution can be controlled by Software Restriction Policy (SRP). A distinctive certificate may be created for each package version (a part number is created for a preselected aggregate of non-executable components) and the two entities may be bound together by the code signing operation "signcode.exe". Within the network connected gaming system, trust for non-executable components may be established by executing the associated authorized code signed packages using SRP upon computer startup or alternatively on demand, resulting in the re-installation of the original non-corrupted non-executable components. The non-executable components may be: initialization or configuration files, video files, sound files, multimedia files, file containing list of hashes, CRCs, and/or signatures, for example.

For example, DRM (Digital Rights Management) technology offered by Microsoft Windows Media Player may be used to ensure that only authorized multimedia files may be played or viewed.

Also, RM (Rights Management) technology offered with Microsoft Office 2003, with the associated RM services and SDK (Software Development Kit) may be used to ensure that only authorized data files may be accessed, viewed, copied or modified.

Software Installation Policy (SIP) and Software Restriction Policy (SRP) configured with an individual PKI certificate associated to each authorized software component offer a "Policy/Enforce" model, or in other words a "Configure the Policy and then Enforce the Policy" model to enable network installation (or "game download") and activation at predetermined times (or "game scheduling") of selected authorized software components, in order to control the software of the network connected gaming system and offer selected games to players. This "Policy/Enforce" method may be constructed on a demonstrable trusted base; it offers transparent security and fine-grained auditing, contrasting with conventional "Request/Authorize" methods that do not demonstrate reliance on a trusted base to enforce the use of only trusted software components.

A network-connected gaming system comprises hundreds of authorized certified software components that may be selectively downloaded and scheduled. Considering on-going support for 50 customers and for 200 distinctive games over a period of 5 years, tens of thousands of software components will each need to receive individual certificates and be certified. Accordingly, embodiments of the present invention include an automated certification platform. Herein, such a certification platform is denoted "Integrated Certification Environment" or ICE. Embodiments of such a certification platform according to the present invention are designed to automate the stepping through the procedure that must be done by the regulatory certification authority to produce only authorized software components that may be dynamically installed in a gaming system, and to prevent generation of erroneous software components. In addition, the ICE offers support to selectively enable the download of approved system software components using Microsoft Software Update Services (SUS), for example.

Embodiments of the present methods rely on established security standards and a demonstrable trusted base (as opposed to relying on security by secrecy) in order to offer transparent security and allow fine-grained auditing. Embodiments of the present inventions are also applicable to any of the subsystems available in a network connected gaming system that require preventing non-authorized software components from executing or affecting the game outcome, such as the gaming terminals, the game management system (CMS or MCS) that monitor and control whole or part of the estate of gaming machines, the progressive jackpot systems, the bonussing systems as well as game payment verification systems such as IGT's EasyPay and Cyberview's PVU (Payment Verification Unit) and PVS (Payment Verification System). Gaming subsystems may be tested against gaming standards such as those produced by GLI; the game standards are mandated by game regulators in accordance with local regulation and laws. The network-connected subsystems may be located within the premises accommodating the estate of gaming machine (connection via a LAN) or outside of the premises (connection via a WAN).

Accordingly, an embodiment of the present invention is a method for downloading software components to a non-PC based gaming machine over a network, the non-PC based gaming machine including a locked enclosure and persistent storage. Such a method may include steps of providing a PC within the locked enclosure of the non-PC gaming machine, the PC including local storage; connecting the PC to the network; providing an interface between the PC and the non-PC based gaming machine; sending directly, from another gaming machine coupled to the network, a package authenticated by code signing only to the PC over the network, the package including the software components to be installed on the non-PC gaming machine; verifying the code signing and unpacking the software components included in the package, and enabling the non-PC based gaming machine to execute the unpacked software components.

The PC may run a version of the Microsoft Windows® operating system. The non-PC may be a PC hardware not running a version of the Microsoft Windows® operating system. The software components may be authorized by a regulatory authority. The sending step may use a network file copy. The package may be or include a Microsoft MSI package or may be equivalent to a Microsoft MSI package. The interface may include an Application Program Interface (API). The persistent storage of the non-PC gaming machine may include a disk drive or a recordable solid state memory storage. The enabling step may include a step of storing the unpacked software components on the disk drive or the recordable solid state memory storage through the interface. The persistent storage of the non-PC gaming machine may include a ROM. The persistent storage of the non-PC gaming machine may include a ROM, the interface may include a ROM emulator and the enabling step may include sending the unpacked software components to the ROM emulator such that the non-PC based gaming machine executes the software components from the ROM emulator, bypassing the execution of the ROM software of the non-PC gaming machine. The verifying step may include issuing a verification command and/or a step of rebooting the PC. The method may further include the step of rebooting the PC and verifying the code signing of any package stored in the PC's local memory upon reboot. The method may also include a step of sending a menu of available games to the non-PC based gaming machine and when a game is selected from the menu and software for the selected game is not stored in the non-PC gaming machine, the API further may use the verifying and enabling steps to be carried out on a package corresponding to the selected game. A further of sending a menu of available games to the non-PC based gaming machine may be carried out and when a game is selected from the menu and software for the selected game is not stored in the non-PC gaming machine, the API further may cause the verifying, unpacking and enabling steps to be carried out on a package corresponding to the selected game. The package corresponding to the selected game in the verifying and enabling steps may be stored in the PC's local storage. The package corresponding to the selected game may be stored on an other gaming machine coupled to the network and the package corresponding to the selected game may be directly sent to the local storage of the PC from the other gaming machine prior to the verifying and enabling steps being carried out on the downloaded and stored package.

The sending step may be carried-out in a peer-to-peer fashion or a daisy chain fashion. The verifying of the code signing may be followed by aborting the method if the package code signing is invalid. The method may further include a step of sending a selected package stored on the PC directly to the PC of another gaming machine. The sending may be carried out in a peer-to-peer fashion or in a daisy-chain fashion. The verifying of the code signing may be performed using software restriction policy or equivalent centrally federated enforcement infrastructure for enabling the execution of authorized software in network nodes using certificate rules, hash rules and/or path rules. The code signing may use a distinctive certificate for each package.

According to another embodiment thereof, the present invention also include a method for ensuring that only authorized software components execute on a non-PC based gaming machine connected to a network, the non-PC based gaming machine including a locked enclosure. The method may include steps of providing a PC within the locked enclosure of the non-PC gaming machine; connecting the PC to the network; providing an interface between the PC and the non-PC based gaming machine; packaging authorized software components that are executable to the non-PC gaming machine but not to the PC into a code signed MSI installation package; configuring certificate rule policies to enable execution of the code signed MSI installation package; enforcing the policies, and directly sending, from another gaming machine coupled to the network, the code signed MSI installation package to the PC within the secure locked enclosure of the non-PC gaming machine, and executing the code signed MSI installation package upon startup of the non-PC based gaming machines or upon a command.

The method may further include the step of booting up the PC within the locked enclosure upon startup of the non-PC gaming machine. The code signing may use a distinctive certificate for each MSI installation package. The directly sending step may be carried-out in a peer-to-peer fashion or a daisy chain fashion. The non-PC may be or include PC hardware that does not run a version of the Microsoft Windows® operating system. The directly sending step may use a network file copy. The method may also include a step of sending a selected package stored on the PC directly to the PC of another gaming machine. Enforcing the policies may be performed using software restriction policy or equivalent centrally federated enforcement infrastructure for enabling the execution of authorized software in network nodes using certificate rules, hash rules and/or path rules.

According to still another embodiment, the present invention is a gaming machine that may include a locked enclosure; a first computing device disposed within the locked enclosure, the first computing device being configured to run a first operating system and being programmed to enable game play of the gaming machine when the first operating system is booted; a second computing device disposed within the locked enclosure of the gaming machine, the second computing device being configured to run a second operating system and, when the second operating system is booted, to receive game software components directly from an other gaming machine over a network, and a mass storage device within the locked enclosure, the mass storage being accessible by the first and the second computing devices. The second computing device may be configured to receive a package authenticated by a code signing directly from the other gaming machine over the network only when booted under the second operating system, the package including the software components to be installed on the mass storage device, and the first computing device may be configured to execute the unpacked software components only when booted under the first operating system. The second computing device may be further configured to verify the code signing and to unpack the software components included in the package when booted under the second operating system. The first and second computing devices may be configured such that only one of the first and second computing devices can be booted at any given time. The first computing device may be configured to be uncoupled from the network when the first computing device is booted under the first operating system. For example, the first operating system may be Linux, an embedded commercial operating system or a proprietary operating system. The second operating system may be Microsoft Windows®, or a commercial operating system capable of secure network communication and of enforcing policies via built-in or third party add-in functionalities, for example. The first computing device may be non PC-based. Alternatively, the first computing device may be a PC-based gaming machine that is not capable of securely receiving game software components over the network. The first computing device may be a PC-based computing device not running a version of the Microsoft Windows® operating system. The second computing device may include a PC. The second computing device may run a version of the Microsoft Windows® operating system. Receiving a package may be carried-out in a peer-to-peer fashion or a daisy chain fashion. The step of receiving a package may use a network file copy. The verifying of the code signing may be done under software restriction policy or equivalent centrally federated enforcement infrastructure for enabling the execution of authorized software in network nodes using certificate rules, hash rules and/or path rules. The verifying of the code signing may be followed by aborting if the package code signing is invalid. The method may also include a step of sending a selected package stored on the PC directly to the PC of another gaming machine. The sending may be carried out in a peer-to-peer fashion or in a daisy-chain fashion.

According to another embodiment thereof, the present invention may also be viewed as a method for downloading software components over a network to a first gaming machine controlled by a first computing device, the first gaming machine being disposed within a locked enclosure, a second gaming machine being coupled to the network. The method may include steps of providing a second computing device within the locked enclosure of the first gaming machine; connecting the second computing device to the second gaming machine over the network; providing an interface between the second computing device and the first computing device; downloading a package authenticated by a code signing directly from the second gaming machine over the network, the package including software components to be installed and executed on the first computing device, the software components not being compatible with the second computing device; verifying the code signing and unpacking the software components included in the package, and enabling the first computing device to execute the unpacked software components.

The downloading step may be carried out with the software components not being executable by the second computing device. The first providing step may be carried out such that the second computing device may run a version of the Microsoft Windows® operating system. The first providing step may be carried out with the second computing device including a PC. The package downloading step may be carried out with the software components being authorized by a regulatory authority. The package may include a Microsoft MSI package or equivalent package, for example. The second providing step may be carried out such that the interface may include an Application Program Interface (API). The verifying step may include one of issuing a verification command and a step of rebooting the second computing device. The method may also include a step of rebooting the second computing device and verifying the code signing of any package stored in a local memory of the second computing device upon reboot. A step of downloading a package may be carried-out in a peer-to-peer fashion or a daisy chain fashion. The step of downloading a package may use a network file copy. The verifying of the code signing may be followed by aborting of the method if the package code signing is invalid. The method may also include a step of sending a selected package stored on the second computing device directly to a selected gaming machine over the network. The sending may be carried out in a peer-to-peer fashion or in a daisy-chain fashion. The verifying of the code signing may be performed using software restriction policy or equivalent centrally federated enforcement infrastructure for enabling the execution of authorized software in network nodes using certificate rules, hash rules and path rules.

The present invention, according to still another embodiment thereof, is a method for downloading software components to a PC based gaming machine over a network to which a plurality of other gaming machines are coupled, the PC based gaming machine including a persistent data storage. The method may include steps of configuring the PC based gaming machine with a dual-boot capability including a first operating system and a second operating system, the persistent storage being accessible by the first operating system and by the second operating system; executing the game software when the first operating system is booted; connecting the PC to the network when the second operating system is booted; downloading a package authenticated by a code signing to the PC based gaming machine directly from one of the other gaming machines coupled to the network only when booted under the second operating system, the package including the software components to be installed on the persistent data storage; verifying the code signing and unpacking the software components included in the package when booted under the second operating system, and enabling the PC based gaming machine when booted under the first operating system to execute the unpacked software components.

The first operating system may be Linux, an embedded commercial operating system or a proprietary operating system, for example. The second operating system may be a selected one of Microsoft Windows, a commercial operating system capable of secure network communication by enforcing policies via build-in or third party add-in functionalities, for example. Each of the first and second operating systems may be capable of requesting a reboot under the first or second operating systems. The software components may be authorized by a regulatory authority. The package may be a Microsoft MSI package or may be equivalent thereto, for example. The step of downloading a package may be carried-out in a peer-to-peer fashion or a daisy chain fashion. The step of downloading a package may use a network file copy. The verifying of the code signing may be followed by aborting of the method if the package code signing is invalid. The method may further include a step of sending a selected package stored on the PC directly to the PC of another gaming machine. The sending may be carried out in a peer-to-peer fashion or in a daisy-chain fashion. The verifying of the code signing may be performed using software restriction policy or equivalent centrally federated enforcement infrastructure for enabling the execution of authorized software in network nodes using certificate rules, hash rules and path rules.

Yet another embodiment of the present invention is a network of gaming machines that may include a network; a first gaming machine including a first locked enclosure, a first computing device disposed within the first locked enclosure for controlling game play on the first gaming machine, a first download-enabled computing device that is configured to selectively couple to the network and disposed within the first locked enclosure, and a second gaming machine; the first download enabled computing device may be configured to couple to the second gaming machine over the network and to download a package authenticated by a code signing directly from the second gaming machine, the package including software components to be installed and executed on the first computing device. The first download-enabled device may be further configured to verify the code signing, to unpack the software components included in the package, and to store the unpacked software components in a first mass storage device. The first computing device may be further configured to execute the unpacked software components. The second gaming machine may include a second locked enclosure, a second computing device disposed within the second locked enclosure for controlling game play on the second gaming machine, and a second download-enabled computing device that may be configured to be selectively coupled to the network and disposed within the second locked enclosure and the first download enabled computing device may be configured to couple to the second download-enabled computing device over the network to download the package. The software components may not be executable by the first download-enabled computing device. The unpacked software components may not be executable by the second download-enabled computing device. The second download enabled computing device may be configured to couple to the first download enabled device over the network and to download a package authenticated by a code signing directly from the first download-enabled device, the package including software components to be installed and executed on the second computing device. The second gaming machine may be configured to couple to the first download enabled device over the network and to download a package authenticated by a code signing directly from the first download-enabled device, the package including software components to be installed and executed on the second gaming machine. The step of downloading a package may be carried-out in a peer-to-peer fashion or a daisy chain fashion. The package downloading step may use a network file copy. The verifying of the code signing may be performed using software restriction policy or equivalent centrally federated enforcement infrastructure for enabling the execution of authorized software in network nodes using certificate rules, hash rules and path rules. The verifying of the code signing may be followed by aborting if the package code signing is invalid.

The present invention, according to still another embodiment thereof, is a method of propagating new software components to a plurality of gaming machines coupled to a network. The method may include steps of broadcasting, from one of the plurality of gaming machines coupled to the network, a package authenticated by a code signing directly to other ones of the plurality of gaming machines coupled to the network, the package including the new software components to be installed and executed on the other ones of the plurality of gaming machines coupled to the network, at each of the gaming machines to which the package was broadcast, verifying the code signing, unpacking and storing the new software components included in the package, and executing the stored software components.

The plurality of gaming machines may include both PC-based gaming machines and non PC-based gaming machines. The verifying of the code signing may be performed using software restriction policy or equivalent centrally federated enforcement infrastructure for enabling the execution of authorized software in network nodes using certificate rules, hash rules and path rules. The verifying of the code signing may be followed by aborting of the method if the package code signing is invalid.

BRIEF DESCRIPTION OF THE DRAWINGS

FIG. 4 illustrates the information that may be entered in the Extended Attributes of a PKI certificate, according to an embodiment of the present invention.

FIG. 20 illustrates the method to generate a code signed companion software component, according to an embodiment of the present invention.

DETAILED DESCRIPTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Figure 1:
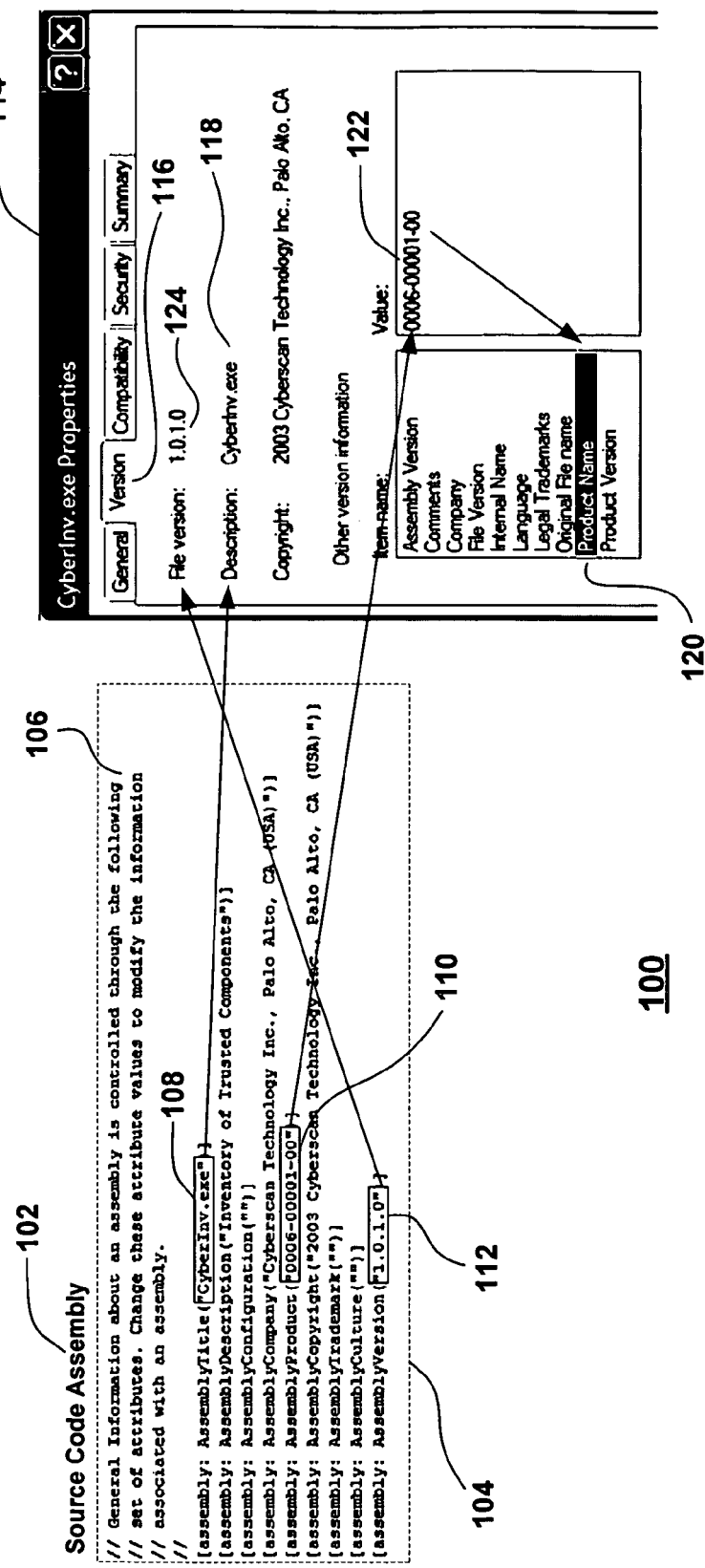
FIG. 1 illustrates the intrinsic information that uniquely identifies each executable software component, according to an embodiment of the present invention.

FIG. 1 illustrates Software Component Identification and Traceability via File Properties, according to an embodiment of the present invention. Shown at 100 in FIG. 1 is the intrinsic information that uniquely identifies each executable software component. The executable component source code comprises executable code lines (e.g. X=X+1; not shown here) and associated source code assembly information 102, 104 that comprises comment lines 106 and assembly information. Herein, AssemblyTitle 108, AssemblyProduct 110 and AssemblyVersion 112 are configured. The AssemblyTitle 108 is set to CyberInv.exe that is the friendly name of the executable software component; AssemblyProduct 110 is set to 0006-00001-00 that is the part number of the executable software component and AssemblyVersion 112 is set to 1.0.1.0, which is the version number of the executable software component. Once the source code is compiled and the executable is built (CyberInv.exe in this case), the configured assembly information is available via the File Property of Windows 114 when right clicking on the file CyberInv.exe and selecting "Properties" and "Version", as shown at 116. The friendly name is shown in the Description field 118, the part number is shown in the Product Name field 120, 122 and the version is shown in the File Version field 124.

It will be apparent to those of skill in the art of software development that intrinsic information that uniquely identifies each executable software component may be obtained in various combinations of assembly directives and file property fields. Additional information may be configured such as, for example, the software component part number, major version number, minor version number, build number, revision number, project name, type of software component, language variant, game regulation variant, friendly name, identification of the certification laboratory, identification of the client, and other predetermined identification identifiers. The identifiers associated with the executable software component using source code assembly directives may, therefore, be traceable via the File Property features of the Windows operating system.

An example of such a configuration is CST3000-0006-00001-00[1.0.1.0] {21}^11~9% S CyberInv.exe that comprises a concatenation of identifiers that may be used in a file name or a PKI certificate subject name. According to this example, CST3000 is the marketing system product identification or the project name; 0006-00001-00 is the software component part number; [1.0.1.0] details the software component major version number, minor version number, build number, revision number; {21} is the software component variant identifier; ^11 identifies the certification lab that certifies the software component; ~9 identifies the customer for which this software component is certified; % S is the software component language variant ("S" for Spanish in this example); CyberInv.exe is the software component friendly name for quick identification. Spaces may be used freely and the identifier fields may be written in any order so as to facilitate reading. Identifier fields may be omitted whenever the context already provides such information. The framing or delimiter characters such as [ ], { }, ~, ^, % which are allowable characters to be used in file names and certificate subject names facilitate human recognition as well as string searches for particular attributes (global search for all Spanish variants for example).

In the same manner, a selected set of identification information making up the certificate subject name may be used for making up the file name of PKI certificate related files such as *.CER, *.P7B and *.PVK such as to facilitate human identification, string searches and file searches.

Figure 2:
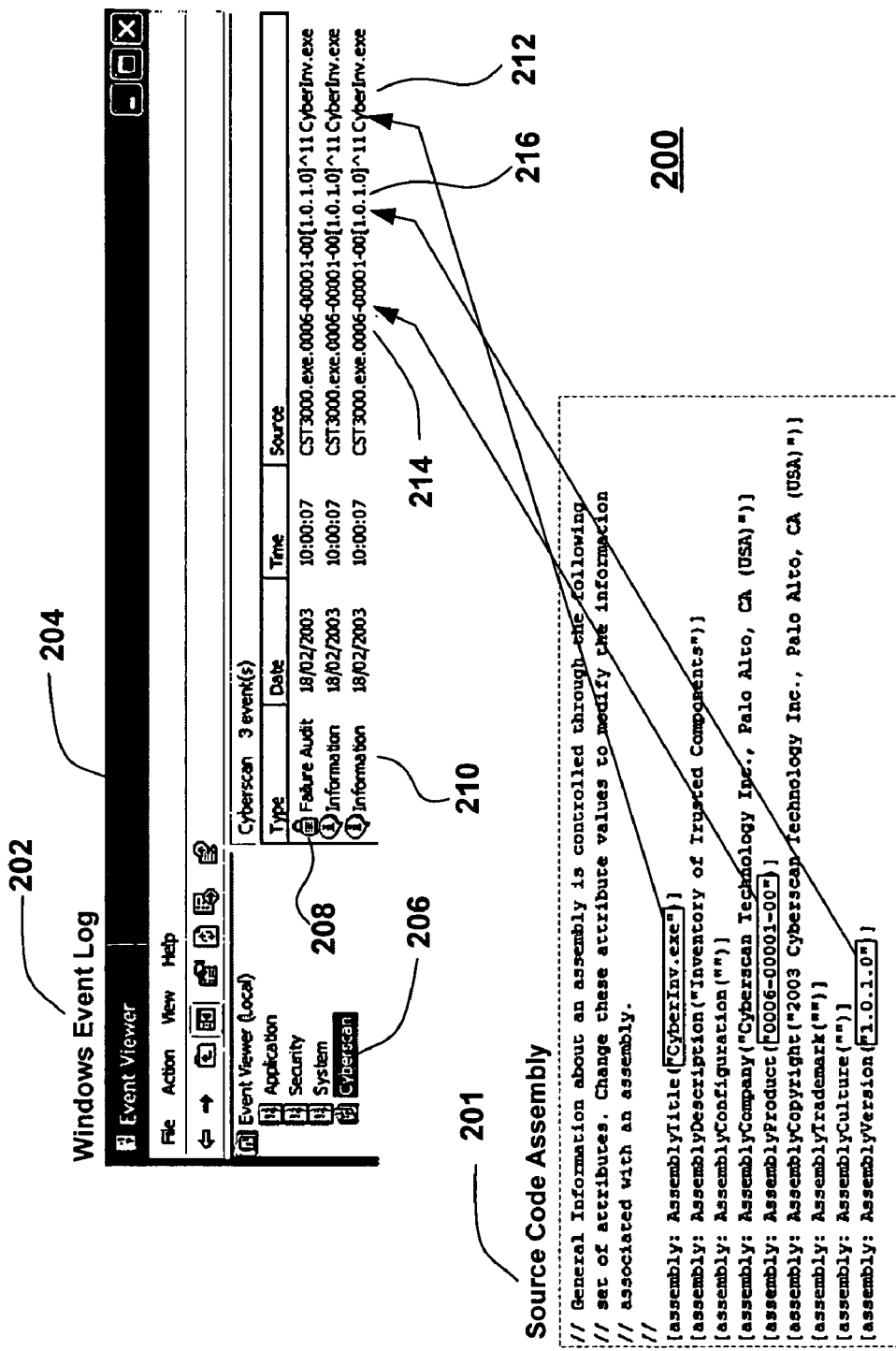
FIG. 2 illustrates the information uniquely identifying each executable software component being made available into the Windows Event Log upon execution of the software component, according to an embodiment of the present invention.

FIG. 2 illustrates traceability via the Windows Event Log. Reference numeral 200 in FIG. 2 illustrates the information uniquely identifying each executable software component being made available to the Windows Event Log upon execution of the software component. The Windows Event Log 202 is a repository for logging important events; it is viewed via the Event Viewer 204. Windows default event log bins (or containers) are Application, Security and System. In the illustrated example, an Event Log bin 206 denominated "Cyberscan" has been added. The Cyberscan bin 206 contains traceability information in its "Source" field that is being logged by each of the executable software components. The software executable software component makes use of the Event Log API to "splash" its identification information into the source field of a predetermined bin in the Windows Event Log each time it starts execution, or at any other time should the occurrence of an event be traced, in order to provide an audit trail to be examined by auditors. The part number 214, version 216 and friendly name 212 identifiers associated to the executable software component using source code assembly directives 201 are therefore traceable via the Event Log features of the Windows operating system. Other information associated with the executable software component may be splashed into the event log for additional traceability. The "Type" field 208 may flag an important audit condition such as here "Failure Audit" to alert the auditor.

Figure 3:
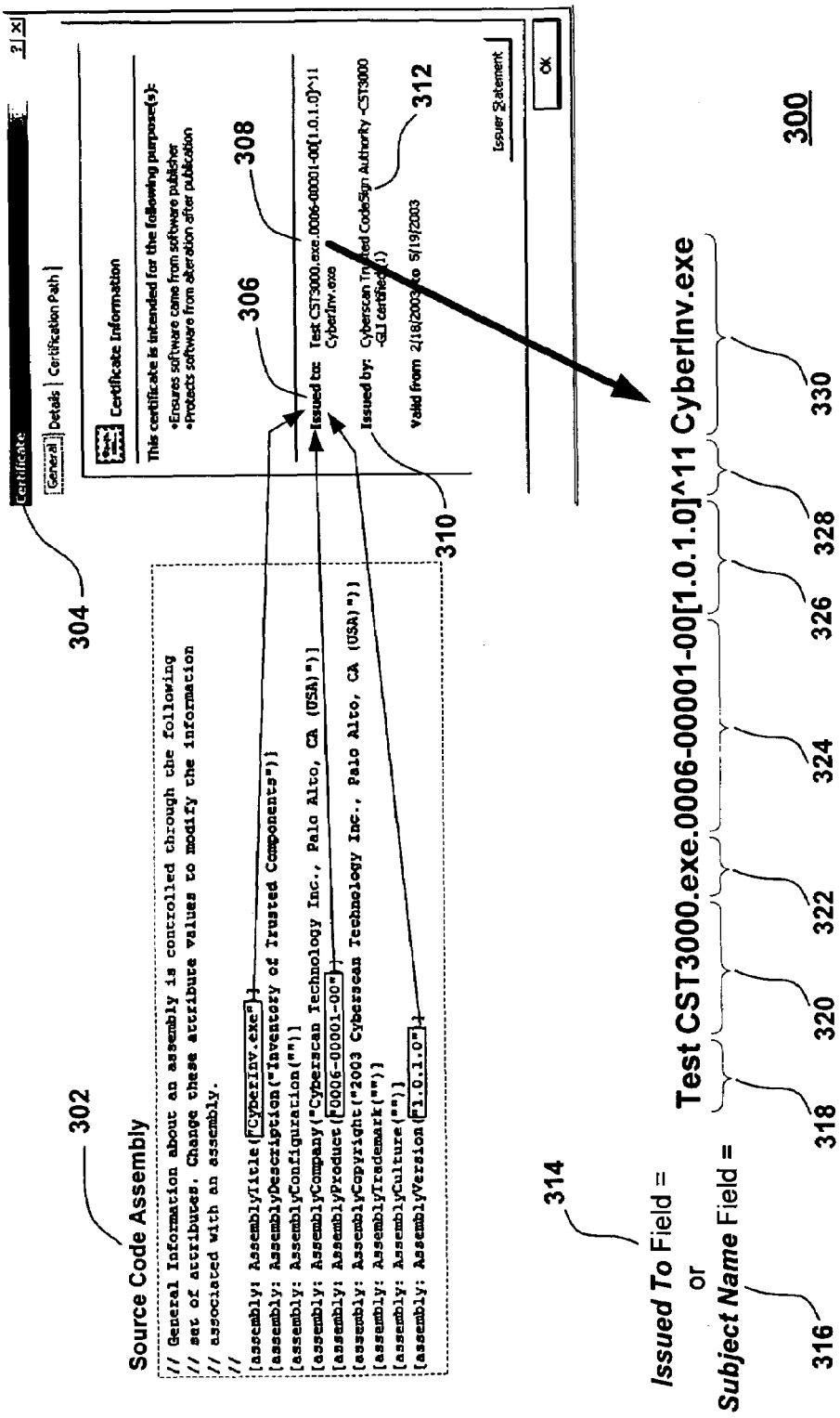
FIG. 3 illustrates the information (test certificate indicator, project/product code, type of executable code, part number, major/minor/build/version, certification lab identifier, friendly name) uniquely identifying each executable software component being used to generate the "Subject Name" (or "Issued to" field, or "CommonName" field) of the individual PKI certificate associated to each executable software component, according to an embodiment of the present invention.

FIG. 3 illustrates the Certificate "Issued to" Field. Reference numeral 300 illustrates the information 308 (test certificate indicator 318, project/product code 320, type of executable code 322, part number 324, major/minor/build/version 326, certification lab identifier 328, friendly name 330) uniquely identifying each executable software component being used to generate the "Subject Name" 316 (or "Issued to" field 306, 314, or also known as the "CommonName" field) of the individual PKI certificate 304 associated with each executable software component, according to an embodiment of the present invention. The friendly name, part number and version of the executable software components may be substantially identical to those entered in the source code assembly 302. "Subject Name" 316 and "Issued to" field 306, 314 refer to the same information; Subject Name is preferably used hereafter. The certificate authority 312 responsible for generating the PKI certificate is shown in the "Issued by" field 310.

FIG. 4 at 400 illustrates the information that may be entered in the Extended Attributes 408 of a PKI certificate 402, according to an embodiment of the present invention. This information may be viewed by selecting, for example, the "Details" tab 404 of the certificate 402 and selecting "Extensions Only", as shown at 406. Intrinsic information that uniquely identifies each executable software component may be entered in the extended attributes of a PKI certificate in order to attain the same purpose as described for FIG. 3 as an alternative to entering the information in the certificate Subject Name. In the same manner, additional identification information to those entered in the Subject Name may be entered in the extended attributes.

Figure 5:
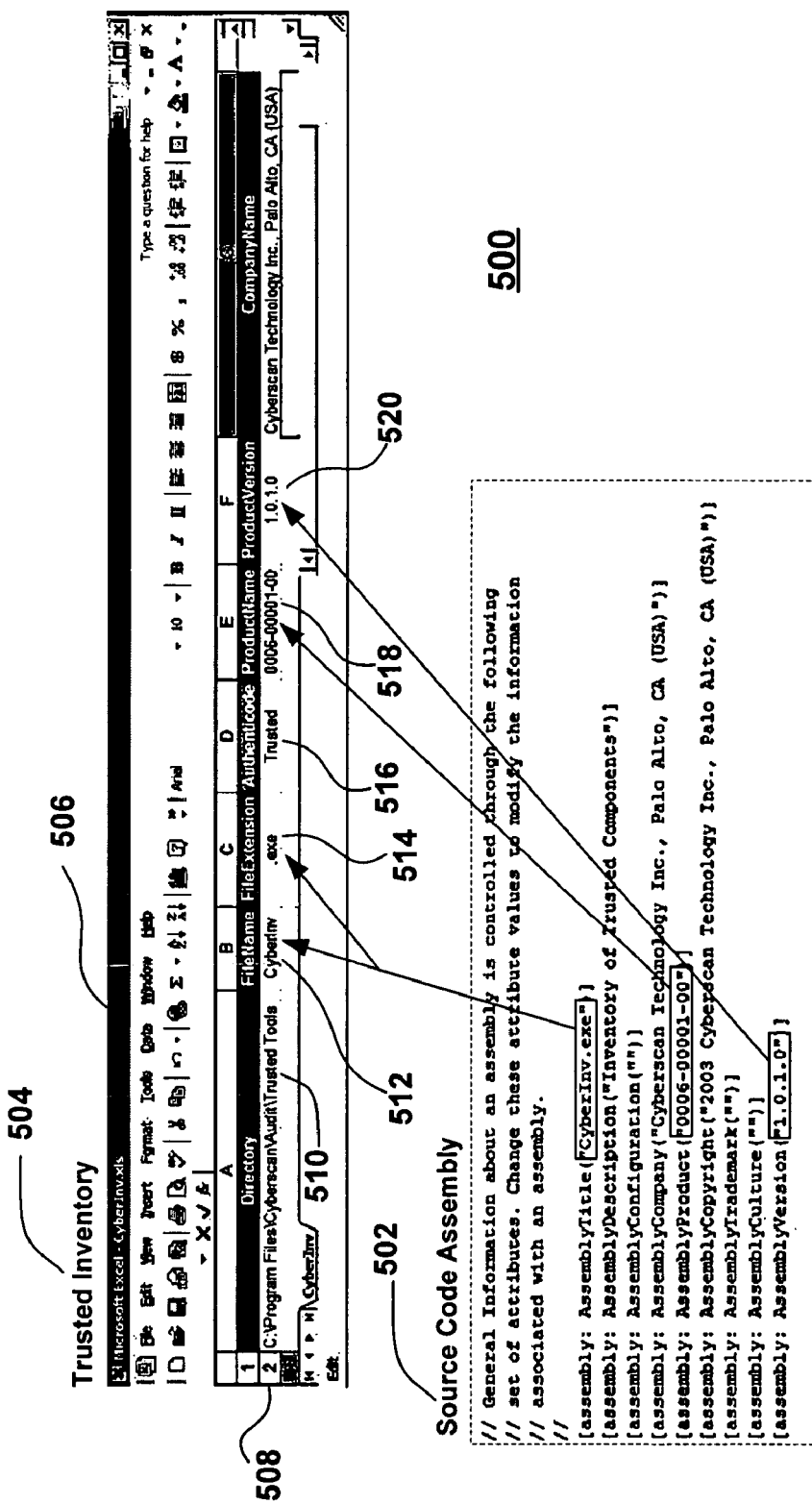
FIG. 5 illustrates the information that may be obtained using the Trusted Inventory tool, according to an embodiment of the present invention.

FIG. 5 illustrates traceability via the Trusted Inventory Tool 504, according to an embodiment of the present invention. Reference numeral 500 in FIG. 5 illustrates the information that may be obtained using the Trusted Inventory tool 504. The trusted inventory tool 504 is a simple application that searches for executable files through the branches of a given tree directory and determines whether the executable software component may be trusted by, for example, calling the Microsoft ChkTrust.exe tool. If the executable software component is signed by a valid PKI certificate and its executable binary data is uncorrupted (its recalculated hash matches the code signature), the ChkTrust.exe tool returns the authenticode "Trusted" attribute; an "Untrusted" attribute is returned otherwise. The Trusted attributes are automatically tabulated in a spreadsheet such as, for example, Microsoft Excel as depicted at 506. Each line 508 in the table provides details on the executable software component that is being examined, such as program path location 510, friendly name 512, executable type 514, authenticode trusted attribute 516, part number 518 and version 520. According to an embodiment of the present invention, therefore, the part number 518, version 520 and friendly name 512 514 identifiers associated with the executable software component using source code assembly directives 502 are traceable via the Trusted Inventory tool.

Figure 6:
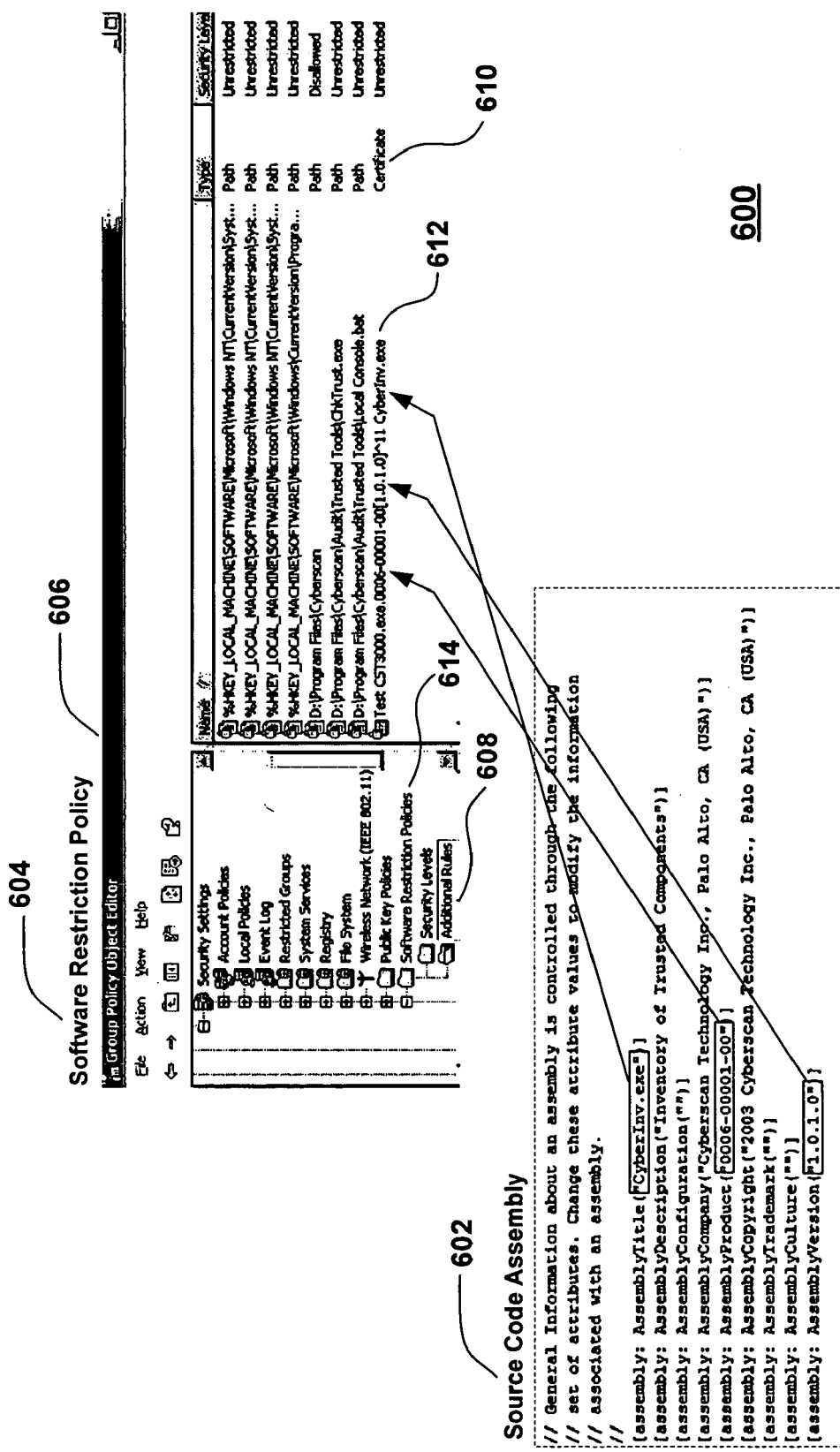
FIG. 6 illustrates the information that may be entered to configure a type-certificate Software Restriction Policy rule, according to an embodiment of the present invention. A Software Restriction Policy (SRP) is configured using the Group Policy Object Editor.

Reference numeral 600 in FIG. 6 illustrates the information that may be entered to configure a type-certificate Software Restriction Policy rule. A Software Restriction Policy (SRP) 604 may be configured using the Group Policy Object Editor 606. The type-certificate Software Restriction Policy rule 610 may be entered in the "Additional Rules" node 608 of the Software Restriction Policy object 614. In FIG. 6, the part number, version and friendly name configured in the source code assembly 602 are recognizable in the certificate subject name 612.

Figure 7:
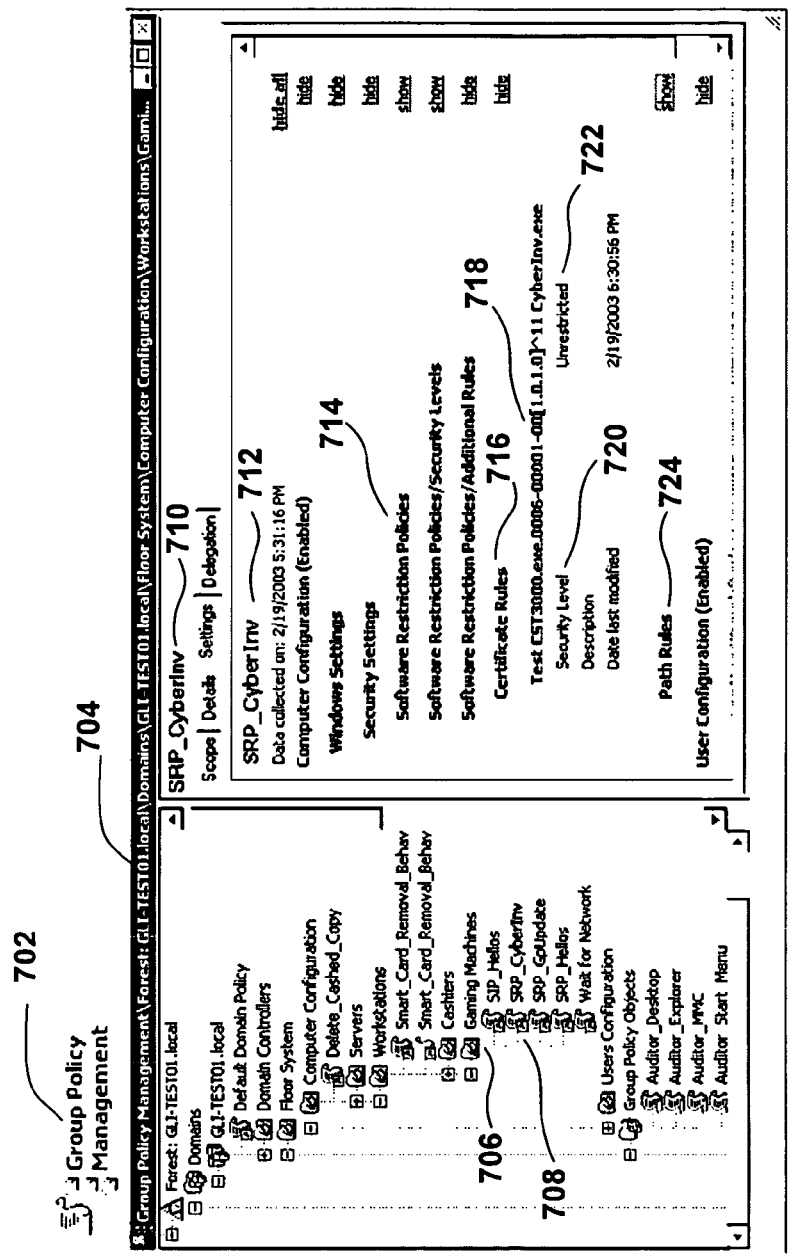
FIG. 7 illustrates the policies that are associated to the active directory container used to configure the gaming machines, according to an embodiment of the present invention.

FIG. 7 illustrates SRP Certificate Rules Policies via the Group Policy Management Console, according to an embodiment of the present invention. Reference numeral 700 in FIG. 7 illustrates the policies that are associated to the active directory container used to configure the gaming machines referenced at 706. Policies are managed using the Group Policy Management Console 702, 704. In this illustration, a policy named "SRP_CyberInv" 708, 710, 712 is selected, for the purpose of viewing a detailed report of the rules that are configured. The report shows details in a hierarchical order. This exemplary policy defines only one certificate rule 716 in the Software Restriction Policy node 714. The certificate subject name 718 is set with a security level 720 of "Unrestricted", as shown at 722, thus ensuring that only the executable software component identified in the certificate subject name is authorized to execute when the policy 714 is enforced. The SRP path rules 724 must be configured such as to prevent non-authorized software from executing. The policy 708 is enforced when it is linked to its container object 706 herein named "Gaming Machines".

Figure 8:
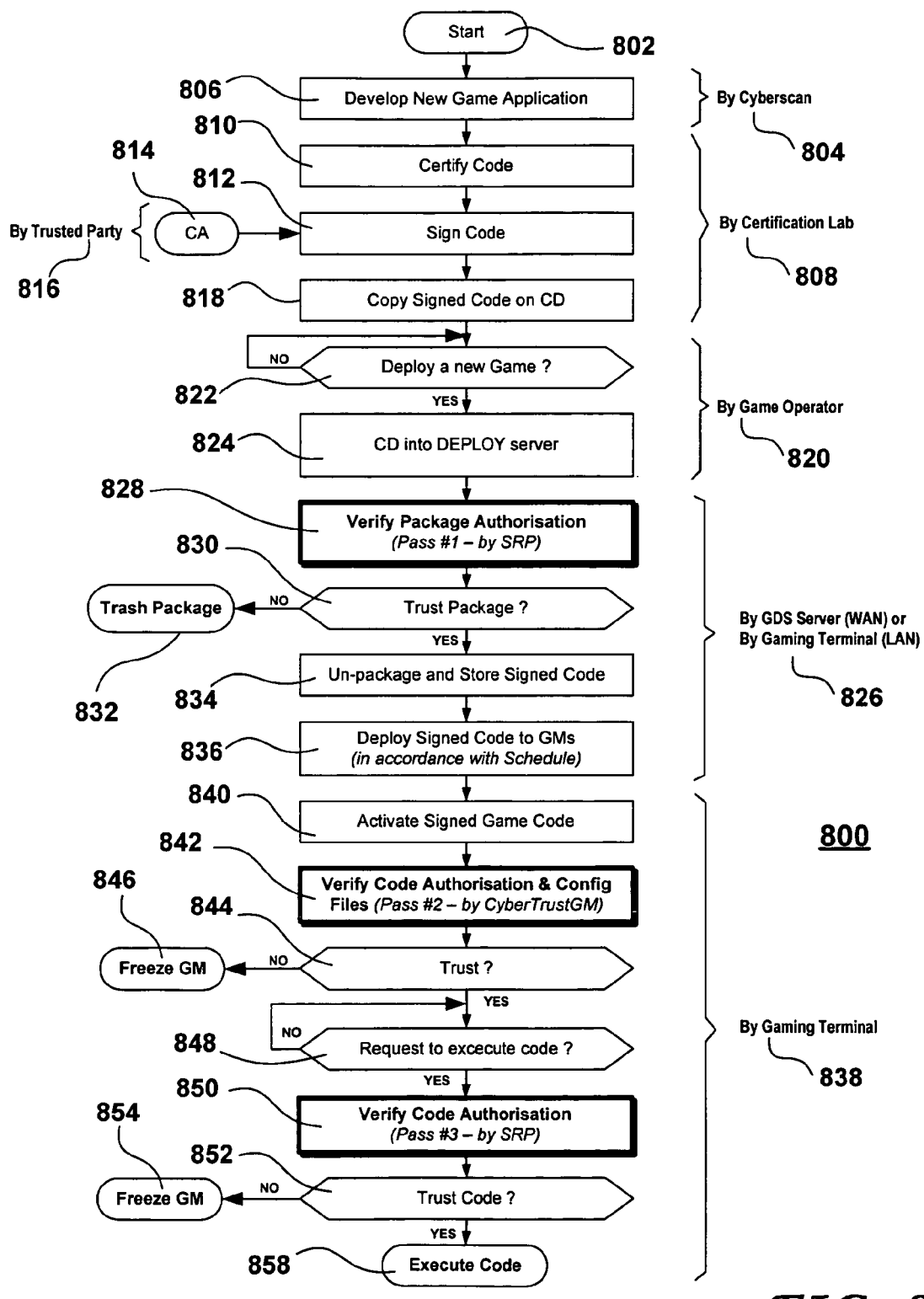
FIG. 8 illustrates an exemplary cycle from the moment a game is being created until it is first executed on a gaming terminal, according to an embodiment of the present invention.

Reference numeral 800 in FIG. 8 illustrates an exemplary cycle from the moment a game is being created until it is first executed on a gaming terminal, according to an embodiment of the present invention. The flowchart 800 starts at 802 when the decision to initiate a project to develop and release a new game is made. The game developer (Cyberscan here, for illustrative purposes only) 804 develops a new game application 806 whose code must be certified at 810 by a recognized certification lab 808. The certified code must then be signed as shown at 812 using PKI certificates produced by a certificate issuing authority (CA) 814 controlled by a trusted party 816. The trusted party 816 may be the certification lab 808. The signed executable software components may be packaged in code-signed MSI installation packages signed in a manner substantially identical to the executable software components, that is, with a unique PKI certificate whose subject name contains part number, version and friendly name identifiers for the MSI package. The MSI packages together with scripts may then be copied to a removable media, such as a CD-ROM 818 for example.

The game operator 820 receives the CD-ROM and when it decides to deploy the new game 822, it copies the packages and associated scripts from the removable media into a library repository on a server 824 (the DEPLOY server in this case). The scripts contain automation tasks such as copying to the repository and configuring the policies.

In the case of gaming terminals connected in a LAN, each gaming terminal 826 is controlled by the policies as soon as they are enforced. The Software Installation Policies (SIPs) controlling the installation of the new game automatically execute the MSI installation packages upon policy enforcement, provided the corresponding Software Restriction Policies have been configured to authorize the execution of the MSI installation packages. This process is performed at 828, 830. If no SRP authorizes the execution of the MSI installation packages, the installation is ignored, as shown at 832. When the MSI installation package is authorized to execute, the software components and other files contained in the package may be copied to the gaming terminals, as suggested at reference numeral 834 836. Other configuration tasks may also be carried out during the Microsoft installer installation process such as, for example, setting the Windows registry, setting shortcuts and installing software patches.

Download of the game software components from the game repository to the gaming terminals may occur as soon as the associated Software Installation Policies are enforced (and the SRPs for the MSI installation package is permitted accordingly). Therefore, scheduling of the download may be achieved by simply enforcing the associated software installation policies at a given time; this may be accomplished by having an operator manually enforcing the SIP at a predetermined time via the group policy management console, or having a process automatically enforcing the SIP at a predetermined time via the API to the group policy management console. Enforcing a policy may be achieved by linking the selected policy to the selected policy object in the domain controller active directory.

Game activation 840 that authorizes execution of the game may be achieved by enforcing the associated Software Restriction Policies. In the same manner, scheduled game activation and deactivation in order to offer selected authorized games to the players at predetermined authorized times may be achieved by simply enforcing the associated Software Restriction Policies at a given time; this may be accomplished by having an operator manually enforce the SRP at a predetermined time via the group policy management console, or having a process automatically enforce the SRP at a predetermined time via the API to the group policy management console. Enforcing a policy may be achieved by linking the selected policy to the selected policy object in the domain controller active directory. Alternatively, a selected executable software component may be prevented from executing by configuring its associated SRP security level to "disallowed".

Figure 9:
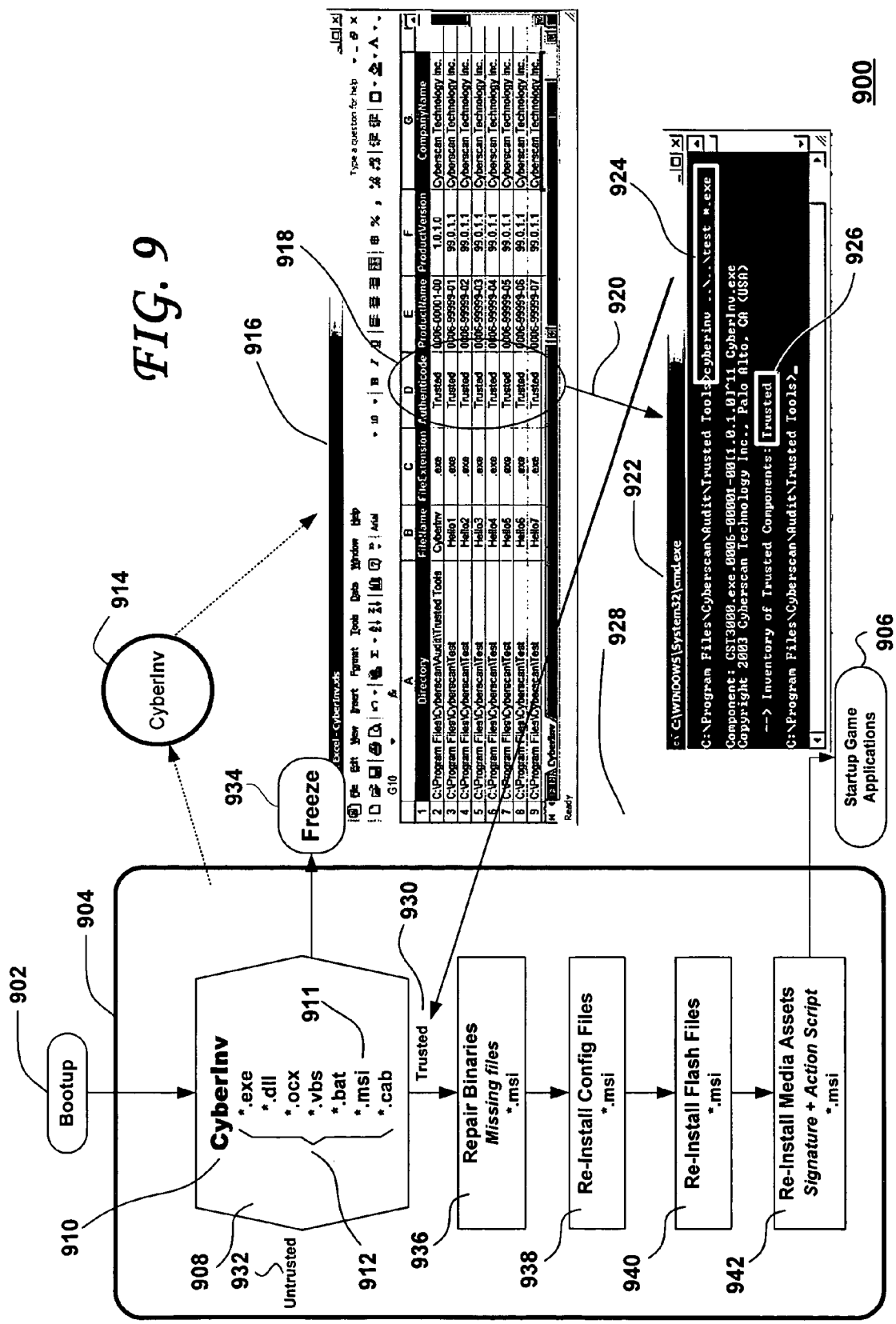
FIG. 9 illustrates the global verification process performed by the terminal in order to check that no unauthorized file may execute or may affect game outcome, according to an embodiment of the present invention.

At this stage, a global verification process 842, 844 as described relative to FIG. 9 may advantageously be executed to verify the trust of every software component installed on the gaming terminal. Should the global verification fail, the gaming terminal may be locked at 846 pending servicing by an attendant.

When a player selects a game from a gaming terminal 838 from a selection menu and requests execution thereof, as shown at 848, the authenticodes of the game's executable software components are verified by the associated enforced Software Restriction Policy as shown at 850 before beginning execution 858. Should the authenticode verification fail at 852, the gaming terminal may be locked at 854 pending servicing by an attendant. If the code is trusted, as verified by the associated enforced SRP, the game is allowed to execute, as shown at 858.

Policy changes are automatically distributed by the Windows server operating system throughout the network connected gaming system at periodic intervals; this automatic process may be disabled if required. Alternatively, the RegisterGPNotification function may be used by the game application software executing on each gaming terminal to check if an applicable group policy has changed. The gaming terminal may then decide on enforcing the policies locally immediately. The gpupdate.exe service, the RefreshPolicy function or the RefreshPolicyEx function may be used by the game application software executing on each gaming terminal to enforce the configured policies. A reboot may optionally be performed in order to recheck the gaming terminal trusted base and ensure the policies have been completely enforced (long game installation for example).

The RegisterGPNotification function enables an application to receive notification when there is a change in policy. When a policy change occurs, the specified event object is set to the signaled state. Further information on the RegisterGPNotification function may be found at: http://msdn.microsoft.com/library/default.asp?url=/library/en-us/policy/policy/registergpnotification.asp. The RefreshPolicy function causes policy to be applied immediately on the client computer. Further information on the RefreshPolicy function may be found at: http://msdn.microsoft.com/library/default.asp?url=/library/en-us/policy/policy/refreshpolicy.asp. The RefreshPolicyEx function causes policy to be applied immediately on the computer. The extended function allows specifying the type of policy refresh to apply to be specified. Further information on the RefreshPolicyEx may be found at http://msdn.microsoft.com/library/default.asp?url=/library/enus/policy/policy/refreshpolicyex.asp.

The menu of authorized games offered to the player may be dynamically generated by each terminal without requiring the central system to dispatch the list of authorized games or having each terminal fetch the list of authorized games from the central system; this may be done by having each terminal check the policies enforced on the games. This may be accomplished by having a process in each terminal attempt to execute each of the entry point for each game (the parent module which is first called upon selecting a game to play). If the execution succeeds, then the game is authorized and may be added to the games menu offered to the player. If the execution is denied (SRP is unlinked or the security level is disallowed), then the game is not authorized and it is removed from the games menu offered to the player. Similarly, if a game entry software component file is not found, then the software is not installed or has been removed and is removed from the games menu offered to the player. The process of dynamically generating the game selection menu may be optimized in many ways in order to reduce the game time to start overhead to check if it is authorized.

In a casino, although new games may be scheduled to be downloaded to gaming terminals and activated at predetermined times, it is a requirement that games may not be changed while a player is playing. In practical terms, a player is considered to have terminated his or her game play when the player's credit balance remains at zero for a predetermined period of time. The predetermined period time is sufficient for allowing the player to enter a new bill or other form of credit instrument to continue playing. Therefore, the game application software on each game terminal may, according to embodiments of the present invention, continually test for this condition (credit=0 for a predetermined time) before checking for change in policy, enforcing the policy changes and then updating the menu of games to be made available to the next player.

FIG. 9 at 900 illustrates the global verification process performed by a terminal to check that no unauthorized files are allowed to execute or affect the game outcome. This process may be performed by any of the subsystems connected in the gaming systems.

The process may start with a computer cold or hot reboot 902 such that the operating system trusted base may be thoroughly verified before the game software components are verified. The trusted base is detailed in commonly assigned and copending International Application No. PCT/US2002/029927, filed Sep. 19, 2002, entitled "Secure Game Download", the specification of which is hereby incorporated herein by reference, and also in Microsoft Next Generation Secure Computing Base (NGSCB), which document is hereby incorporated herein by reference. Details of Microsoft's NGSCB are located at www.microsoft.com/ngscb. During the trusted base verification, the integrity of the Driver Signing framework, the Windows File Protection framework and Software Restriction Policies framework are verified. With NGSCB operating system such as forthcoming "Longhorn", a framework called Nexus deeply integrated directly within the hardware components (in each major chipsets) and the BIOS which constitutes a mechanism for authenticating the trustworthiness of the software and hardware configuration, is booted prior to checking the integrity of the Driver Signing framework, the Windows File Protection framework and Software Restriction Policies framework.

On completion of the operating system boot-up 902 or at another time, the global verification process 904 may be executed. The CyberInv process 910, 914 is also shown and described at FIG. 5. The CyberInv process 910, 914 verifies all the executable files in given folder trees such as 912 (*.exe, *.dll, *.ocx, *.vbs, *.bat, *.msi, *.cab, for example) for trustworthiness. If any file is found to be untrusted as shown at 932, then the gaming terminal may be frozen as shown at 934 pending examination by security personnel. A spreadsheet file 916 may be produced that list the verification status of each executable file. If the authenticode of all the files is trusted as shown at 918 then the CyberInv process 908, 910, 914, 924 returns at 920 a trusted status, as shown at 926 930. Consequently, all of the executable software components may be considered to be trusted, as shown at 930.

However, it is to be noted that the fact that an executable software component is trusted does not imply that the software component is authorized to execute; it merely indicates that the software executable software component has a valid authorized authenticode certificate and that the software component binary data is not corrupted. Checking whether an executable software component having a valid authorized authenticode certificate is authorized to execute requires that the applicable Software Restriction Policy be checked. This may be performed automatically when the software component is loaded by the operating system to start its execution, either when dynamically building the menu of authorized games, or each time upon starting execution of the game when the player has selected a game to play—or using an appropriate service that may be called by an application.

Although RM (Rights Management) and DRM (Digital Rights Management) technology from Microsoft is readily available for authenticating the trustworthiness of non-executable files such as media files, Word files and emails, for example, it adds management complexity on top of the Software Restriction Policy framework when used in a network-connected gaming system. Addressing this, embodiments of the present invention offer a method for a network connected gaming system to trust non-executable files such as initialization or configuration files, video files, sound files, multimedia files, file containing list of hashes, CRCs, and/or signatures. The present method relies on packaging the non-executable files in a MSI installation package, the MSI package being subsequently code-signed with a unique certificate and the appropriate Software Restriction Policy is configured to enable installation (execution in fact) of this MSI package. Executable files and non-executable files may be packaged together for convenience. The selected aggregate of executable files and non-executable receives at least a part number (and preferably a version number as well) that is used in the subject name of the associated certificate. Consequently, according to embodiments of the present invention, when the MSI package is installed, the installed non-executable files are obtained from a trusted and authorized source.

As the CyberInv process 908 has authenticated the trustworthiness of all the *.msi files 911, therefore whenever there is a need to ensure that the non-executable files are trusted, the associated MSI package is re-installed. It is to be noted that the service that performs the installation of the MSI packages (msiexec.exe in the current versions of Windows) may be executed with a variety of execution modifiers, such as shown at http://www.microsoft.com/technet/treeview/default.asp?url=/technet/prodtechnol/winxppro/proddocs/msiexec.asp. Of particular interest is the c option that reinstalls a file if it is missing or if the stored checksum of the installed file does not match the new file's value (the log file will contain the anomalies detected for subsequent forensic analysis), as shown at 936. In the global verification process 904, the c option of the msiexec.exe command may be used for re-installing every package containing configuration files 938 (such as initialization or configuration files, files containing list of hashes, CRCs, and/or signatures), Flash files 940 (Macromedia Flash and Director), and other media assets files 942 in order to ensure the trustworthiness of these files.

Subsequent to completion of process 908, all the MSI packages for the executable software components may be re-installed with for example, the msiexec.exe command using the p option in order to re-install missing authorized executable software components (the log file will contain the anomalies detected for subsequent forensic analysis).

Subsequent to the successful completion of the global verification process 904, the trustworthiness of the game application framework is established and may be started, as shown at 906.

It is to be noted that when a player wins an amount equal to or greater than $25,000 in a casino, there is a requirement to check the integrity of the gaming application. With legacy gaming terminals, the gaming terminal is powered-down and the ROMs are extracted in order to be verified in a trusted verifier named a "Kobetron". The Kobetron produces a signature for each of the ROMs that is compared with the corresponding signature produced by the certification lab. In this manner, the integrity of the all the software components of the legacy gaming terminal, including the operating system, the game application and the configuration data may be verified. According to embodiments of the invention, when executing the global verification process 904 subsequent to the gaming terminal bootup at 902, a verification equivalent to a "Kobetron verification" may be performed. This metaphor helps greatly in the acceptability of downloadable game technology by game regulators who are reluctant to accept state-of-the-art operating systems, multimedia and network technologies.

Figure 10:
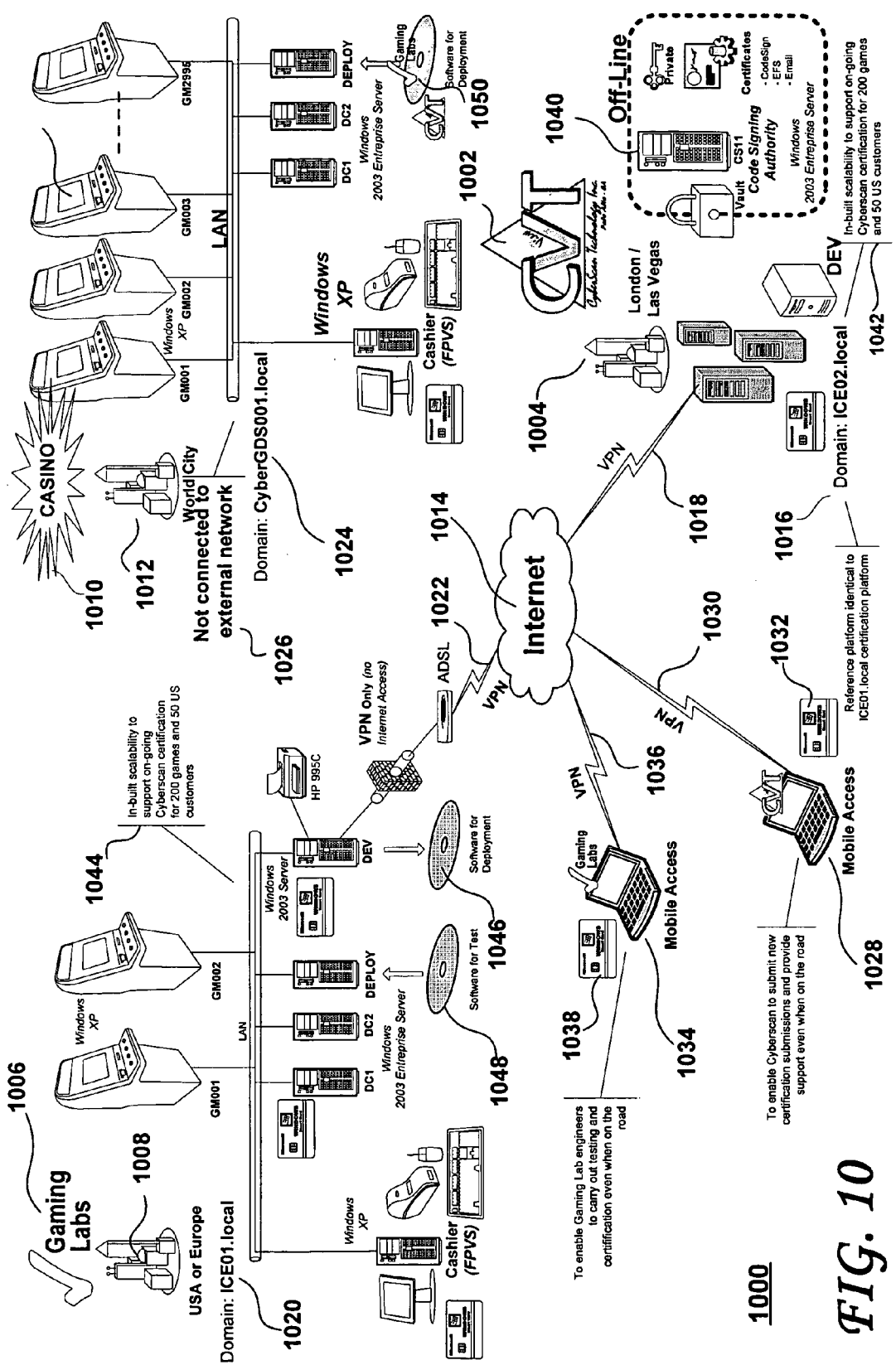
FIG. 10 illustrates the configuration of the three parties involved in a new game cycle detailed at FIG. 8, according to an embodiment of the present invention.

FIG. 10 at 1000 illustrates the configuration of the three parties involved in a new game cycle detailed at FIG. 8, according to an embodiment of the present invention. The three parties involved in a game cycle, according to embodiments of the present invention, are the game developer 1002 whose facilities are located in a given city 1004, the certification laboratory 1006 whose facilities are located in a given city 1008 and the gaming operator 1010 located in a given city 1012. The game developer 1002 and the certification lab 1006 may have a network 1020 of connected gaming system(s) representative of the network connected gaming system in place at the location (e.g., the casino) of the gaming operator 1010. In addition, the game developer 1010 and the certification lab 1006 each may have an integrated software development environment for compiling the game applications source code, each capable of managing at least 200 games for 50 distinct game operators as shown at 1044, (resulting in thousands of source code variants due to local regulation variances). The development environments may be kept synchronized via the secure network link 1016, 1018, 1014, 1022, 1020. A certification authority (CA) 1040 may be located at the game developer's site or may be controlled by an authorized trusted party such as VeriSign. The game developer site and the certification lab site may be accessible from the outside by authorized mobile users 1034, 1028 via secure links 1022, 1018, 1030, 1036. Logon authentication may be carried out using, for example, smartcards as shown at 1038, 1032 or by other secure means.

The game developer 1002 supplies the certification lab 1006 with a CD-ROM (or other media) containing the software components to be tested, as shown at 1048. The certification lab then certifies the software components supplied on the CD-ROM and provides the game developer 1002 with a CD-ROM containing the certified software components for deployment, as shown at 1046. The CD-ROM 1046 containing the authorized software components that were tested and certified by the certification lab 1006 may then be provided to the game operator (e.g., the casino) for installation and deployment on one or more of the gaming machines GM001, GM002, GM2995 coupled to the network 1024. The certified authorized software components are code-signed using a certificate produced in accordance with an embodiment of the present invention, as described hereinabove. The network 1024 is preferably not coupled to any external network, as suggested at 1026.

Figure 11:
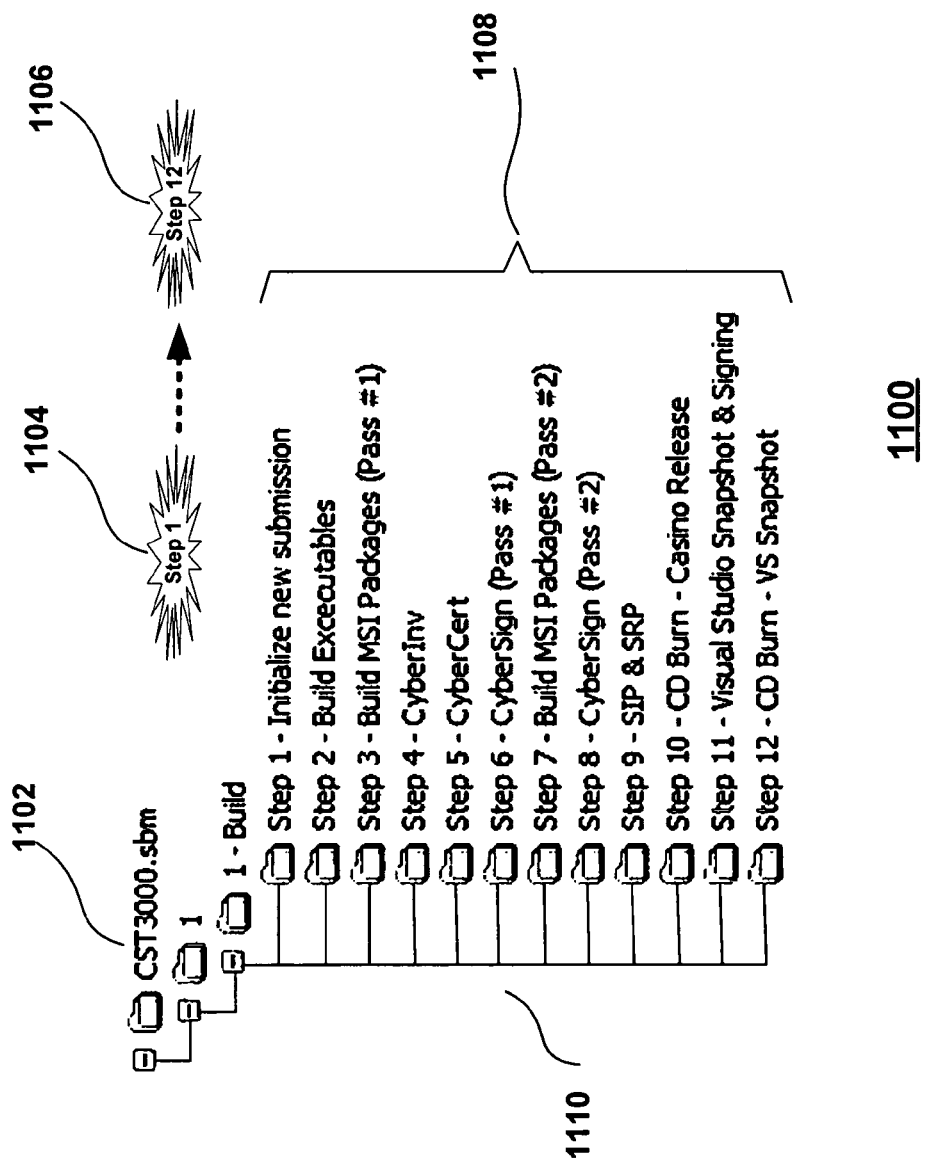
FIG. 11 illustrates the 12 folders created on the disk repository of the development environment, according to an embodiment of the present invention.

FIG. 11 shows a 12-Step Integrated Certification Environment Process, according to an embodiment of the present invention. Shown at 1100 are the 12 folders 1110 created on the disk repository 1102 of the development environment. The 12 folders 1110 are mapped to the 12-step procedure 1104 to 1106 involved in producing the CD-ROM 1050 containing the certified authorized software components. Each folder contains the computer resources and instructions to carry out each step. The folders are clearly named with the step number and the title description of the procedure step at 1108.

Figure 12:
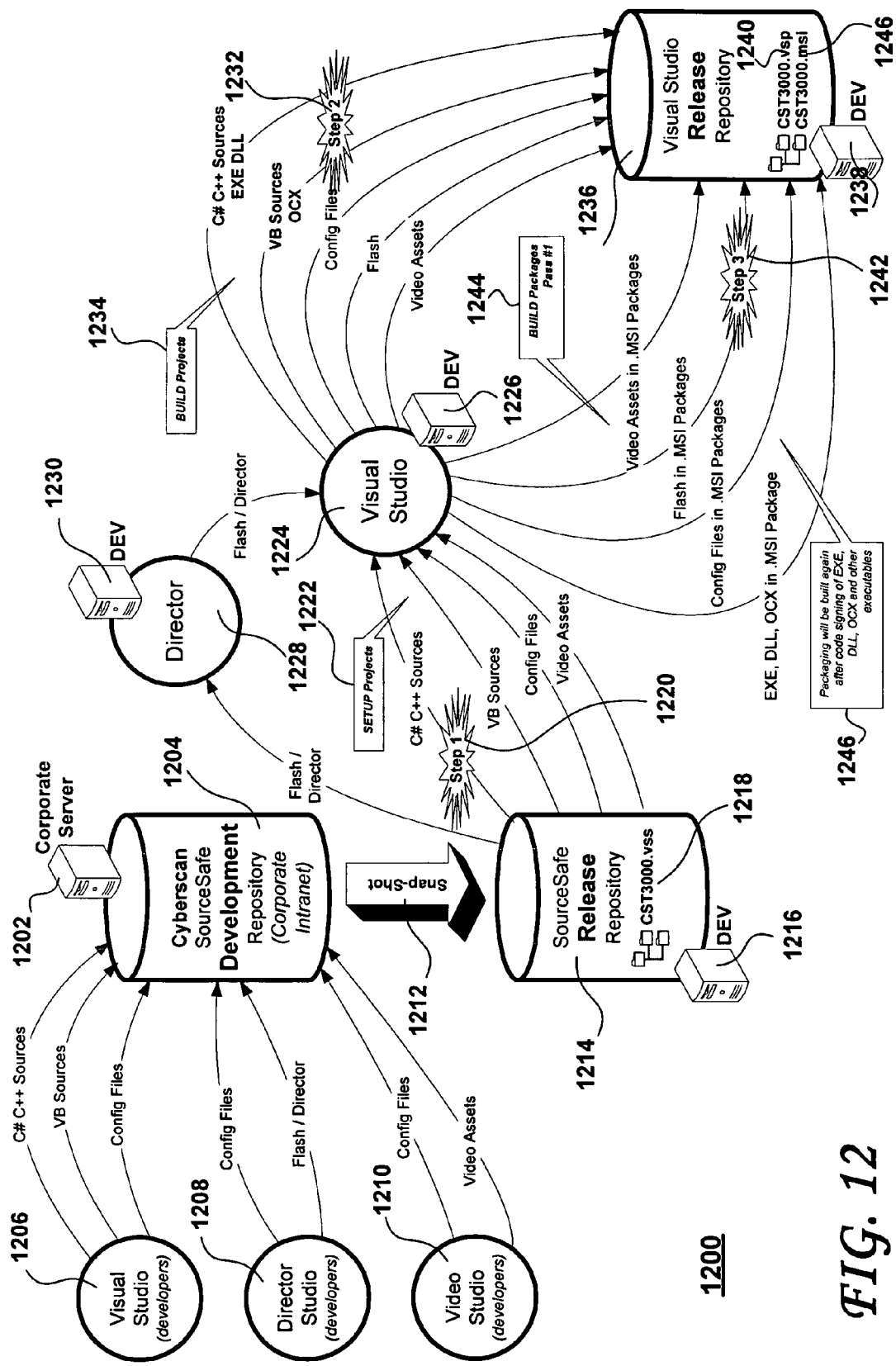
FIG. 12 illustrates the dataflow for step 1 to step 3 for producing the certified authorized software components, according to an embodiment of the present invention.

FIG. 12 shows a dataflow diagram of Step #1 to Step #3 of the Integrated Certification Environment Processor for producing certified authorized software components, according to an embodiment of the present invention. Step 1 at 1220 may include obtaining a snapshot 1212 of the repository 1204 containing the game developer's source code 1206, data files 1208 and media assets 1210 in order to configure the building environment of the reference platform with all the source code, data files, media asset files and resources files required to initiate the certification process. The snapshoot files 1212 may be stored in a repository 1218 controlled by a version configuration and control system (SCCS) such as Microsoft Visual Source Safe 1214 (VSS) on the DEV development computer 1216. The files may be grouped in project directories as "Projects" such that the source files, control files and resource files are stored in convenient systematic fashion in the Visual Studio repository 1240 on the development computer 1238. An inventory of the files submitted for certification may be produced. Step 1 may be qualified as "SETUP Projects" 1222.

Step 2 at 1232 may include compiling the source code and producing binary executable code. Microsoft Visual Studio 1224 is constructed so as to manage source code as projects (a project can be a given game) regrouping all of the dependent source code, and data files. Step 2 is also referenced as building the projects or "BUILD Projects", as shown at 1234. Media assets may require a different compiling environment on the DEV computer 1230 such as the Macromedia Director 1228.

Step 3, shown at 1242 may include producing the projects MSI packages 1244 for the source code compiled in Step 2. Relevant non-executable file such as configuration files and media assets may be packaged in MSI packages with the compiled source code. It is to be noted 1246 that packages will be built again (step 8 hereafter) after code signing of EXE, DLL, OCX and other executables (step 6 hereafter). Step 3 may be referenced as "BUILD Packages Pass #1" 1244.

Figure 13:
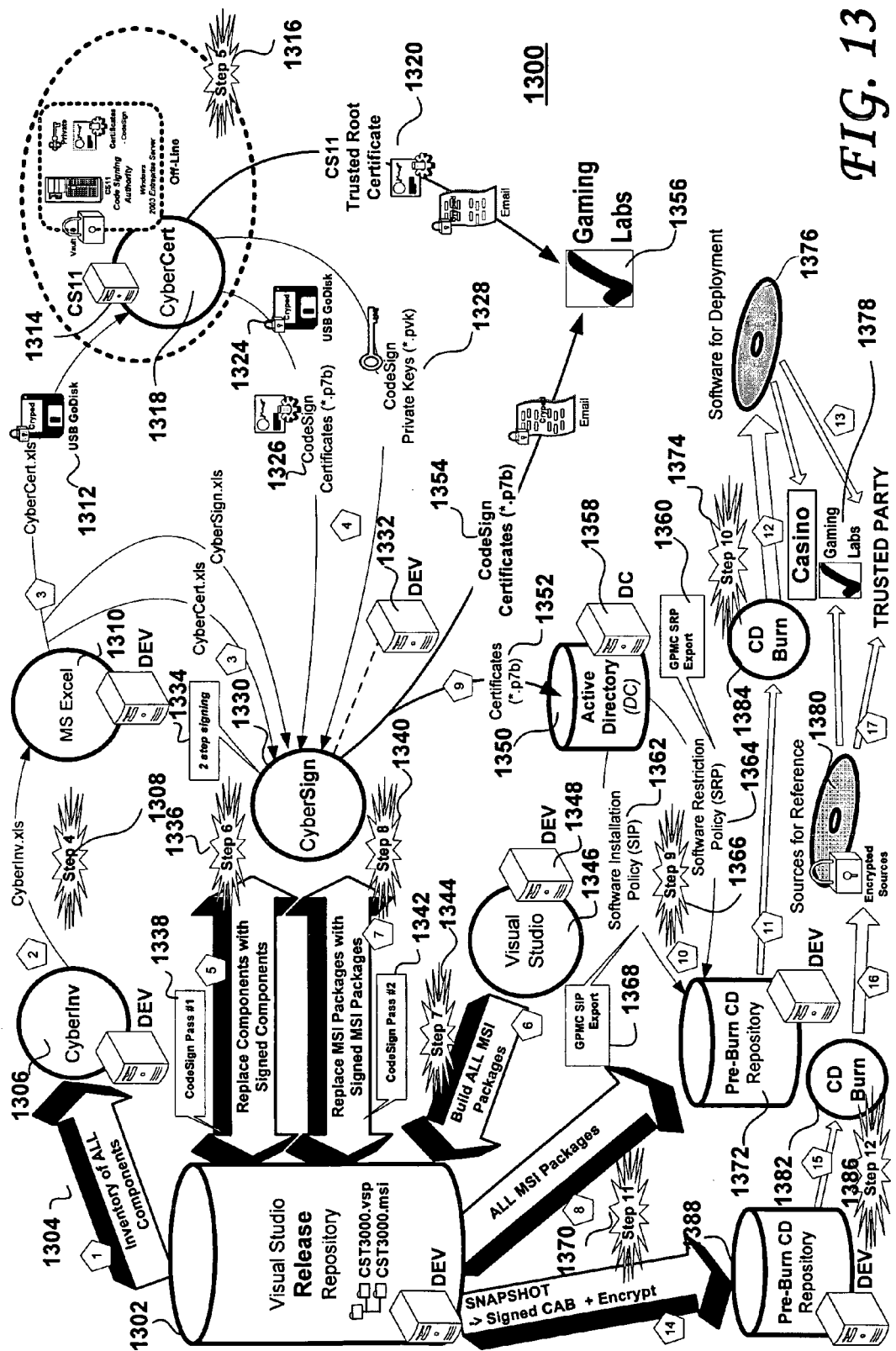
FIG. 13 illustrates the dataflow for step 4 to step 12 for producing the certified authorized software components, according to an embodiment of the present invention.

FIG. 13 shows, at 1300, the dataflow for step 4 to step 12 for producing the certified authorized software components, according to an embodiment of the present invention. Step 4 at 1308 calls for the CyberInv.exe process 1306, for a selected project (a Visual Studio project may typically regroup all the software components for an entire game), perform an inventory 1304 of the compiled software components produced by Visual Studio 1302 on completion of the Build Project process 1234 (FIG. 12) as well as the MSI install packages produced by the Build MSI Packages Pass #1 1244 process (FIG. 12). The CyberInv.exe 1306 process may also include any other executable software components not directly managed under Visual Studio such as, for example, ocx, *.vbs, *.bat, *.cab, *js. (in fact, any executable component that is supported by the Software Restriction Policy technology).

The CyberInv.exe process 1306 produces the CyberInv.xls 1307 Excel spreadsheet file 916 shown at FIG. 9, which is examined by an authorized user in the MS Excel program 1310. The CyberInv.xls 1307 file is copied to the folder "Step 4—CyberInv" folder in 1110 in FIG. 11. The binary files having just been compiled are not code-signed; consequently the authenticode field shows an "Untrusted" status for each of the binary components. The friendly name, file type, part number and version (including build number) are extracted directly from the assembly information contained in the source code, therefore truly reflecting the identity of the source code component.

Because the build number is incremented each time the code is recompiled in a Build operation, it is to be noted that the version number will change accordingly. The authorized user eliminates the rows that are irrelevant to the game to be certified and saves the file under the CyberCert.xls 1311 file name which contains the necessary friendly name 512, executable type 514, part number 518 and version 520 information to compose the PKI certificate subject name in accordance with method detailed at FIG. 3 for subsequent code signing. The program path location 510 of the unsigned software components is also available for later retrieval of the unsigned binary file. The CyberCert.xls 1311 file is copied to the folder "Step 5—CyberCert" folder in 1110 in FIG. 11.

The CyberCert.xls 1311 file may be securely copied in encrypted form to a removable media such as a floppy disk, a CD-ROM or a USB disk 1312, or alternatively transferred to another location by secure communication means.

The CyberCert.xls 1311 file is split into 2 files CyberSign1.xls 1317 and CyberSign2.xls 1319. CyberSign2.xls contains only the rows associated to the MSI packages and CyberSign1.xls contains the rows corresponding to the other executable file. CyberSign1.xls is copied to the "Step 6—CyberSign (Pass #1)" folder in 1110 in FIG. 11, and CyberSign2.xls is copied to the "Step 8—CyberSign (Pass #2)" folder.

Step 5 at 1316 includes having a certification authority (CA) 1315 located at the game developers' site or controlled by an authorized trusted party such as VeriSign generating certificates in accordance with the details provided in the CyberCert.xls 1311 file, that is, with a subject name created in accordance with the method detailed relative to FIG. 3. An automated process CyberCert.exe 1318 executing on the offline CA computer Windows server named CS11 1314 may automate the generation of the PKI public certificates 1326 and the associated private keys 1328 using the CyberCert.xls 1311 file.

The trusted root certificate for the authorized CA 1320 is supplied to the certification lab, the game regulators or other parties for reference and for importing as a trusted root into the ICE computer system and the gaming system certificates store.

The public certificates 1326 and their associated private keys 1328 are forwarded to the DEV computer 1332 of the ICE system in encrypted form on a removable media such as a floppy disk, a CD-ROM or a USB disk 1324, or alternatively transferred by secure communication means. Public certificates 1326 and their associated private keys 1328 that are associated with the MSI packages are copied into the "Step 6—CyberSign (Pass #1)" folder in 1110, and the other public certificates 1326 and their associated private keys 1328 that are associated with other software components are copied to the "Step 8—CyberSign (Pass #2)" folder.

Step 6 1336 includes steps of code signing the non-MSI executable components listed in the CyberSign1.xls 1317 file using the corresponding public certificates 1326 and their private keys 1328. The code signing may be performed using the SignCode.exe utility provided by Microsoft, or equivalent. A password may be required for the private key depending on the security option selected when generating the certificate at the CA. The CyberSign.exe process 1330 may automate the code-signing of all the non-MSI executable components listed in the CyberSign1.xls 1317 file using the friendly name, file type, part number and version (including build number) given in each row. The CyberSign.exe process may call the SignCode.exe utility or the equivalent API. During the code signing process, the compiled executable software components may be replaced at 1339 by their code-signed form. Step 6 is designated as "CodeSign Pass#1" 1338.

Step 7 at 1344 includes re-building all the MSI install packages 1345 performed during step 3 at 1242. This time, the MSI packages contain the non-MSI code-signed executable components.

Step 8 at 1340 includes code signing the MSI executable components listed in the CyberSign2.xls 1319 file using the corresponding public certificates 1326 and their private keys 1328. The code signing may be performed using the SignCode.exe utility provided by Microsoft, or equivalent. A password may be required for the private key depending on the security option selected when generating the certificate at the CA. The CyberSign.exe process 1330 may automate the code-signing of all the MSI executable components listed in the CyberSign2.xls 1319 file using the friendly name, file type, part number and version (including build number) given in each row. The CyberSign.exe process may call the SignCode.exe utility or the equivalent API. During the code signing process, the executable MSI software components may be replaced 1341 by their code-signed form. Step 8 is designated as "CodeSign Pass#2" at 1342. The executable MSI software components are copied as shown at 1371 to the CD Pre-Burn repository 1372.

Because of the necessity of performing step 7, the CyberSign 1330 code-signing process to be used for the ICE (Integrated Certification Environment) is designated a "2-Pass code-sign", as indicated at 1334.

Step 9 1366 includes (a) configuring the software restriction policy (SRP) 1360 for the ICE system test gaming terminals (via the active directory 1350 in the domain controller DC) with the certificate rules corresponding to the certificate produced at step 5 (the *.p7b certificate at reference numeral 1326 may be converted to *.cert certificates for compatibility reasons when configuring the SRP); (b) configuring the Software Installation Policy (SIP) 1368 for the ICE system test gaming terminals with the MSI packages produced at step 7, then (c) using the GPMC (Group Policy Management Console) or equivalent service, exporting the SIP via SIP export scripts 1362 and the SRP via SRP export scripts 1364 (the policy export facility is available in the Group Policy Management Console GPMC 702, 704). These SIP and SRP export scripts may be copied into the folder "Step 9—SIP & SRP" folder in 1110. These SIP and SRP export scripts may be later imported in the gaming operator's 1010 gaming system for enforcing the policies on the game components. SIP export scripts 1362 and SRP export scripts 1364 are stored in the CD Pre-Burn repository 1372 (or into the folder "Step 10—CD Burn—Casino Release" folder in 1110).

Step 10 at 1374 includes steps of burning at 1384 to a CD-ROM 1376 or other removable media the content of the CD Pre-burn repository 1372 comprising (a) the executable MSI software components 1371; (b) the SIP export scripts 5 1362 and SRP export scripts 1364 and (c) other automation scripts in order to automate the installation of (a) and (b). A copy of CD-ROM 1376 may be forwarded (a) to the gaming operator's 1010 gaming system for game deployment (such as a casino 1379), (b) to the certification lab 1378, and (c) a trusted party 1377 such as a lawyer or in escrow for impartial reference in case of later dispute. The CD-ROM 1376 may later be inserted at 1050 in the gaming operator's 1010 gaming system for game deployment.

Step 11 at 1370 includes steps of (a) taking a snap-shot 1387 of the entire development environment for a selected certified game (Visual Studio repository 1302 and Visual Source Safe repository 1214 1218 that contains all the source file, the compiled code-signed executable files and dependant executable files, the non-executable files, project solution, automation scripts, the source and compiled signed code from other development platforms, the media assets from media development platforms such as MacroMedia Director 1228); in (b) taking a snap-shot 1387 of the code-signed MSI installation packages; in (c) optionally encrypting them; and then in (d) copying them into a CD pre-burn repository 1388 (or into the folder "Step 12—CD Burn—VS Snapshot" folder in 1110).

Step 12 at 1386 includes steps of burning at 1382 to a CD-ROM 1380 or other removable media the content of the CD Pre-burn repository 1388 comprising the software components of step 11. A copy of CD-ROM 1380 may be forwarded to the certification lab 1378 and to a trusted party 1377 such as a lawyer or in escrow for impartial reference in case of later dispute.

Steps 4 to step 12 should be carried out each time a source code is being recompiled subsequent to a modification because a unique certificate must be associated to each build. Deviating form this order may jeopardize certificate integrity because of the risk of a human error that may result in the wrong certificate being used during the code signing process.

Figure 14:
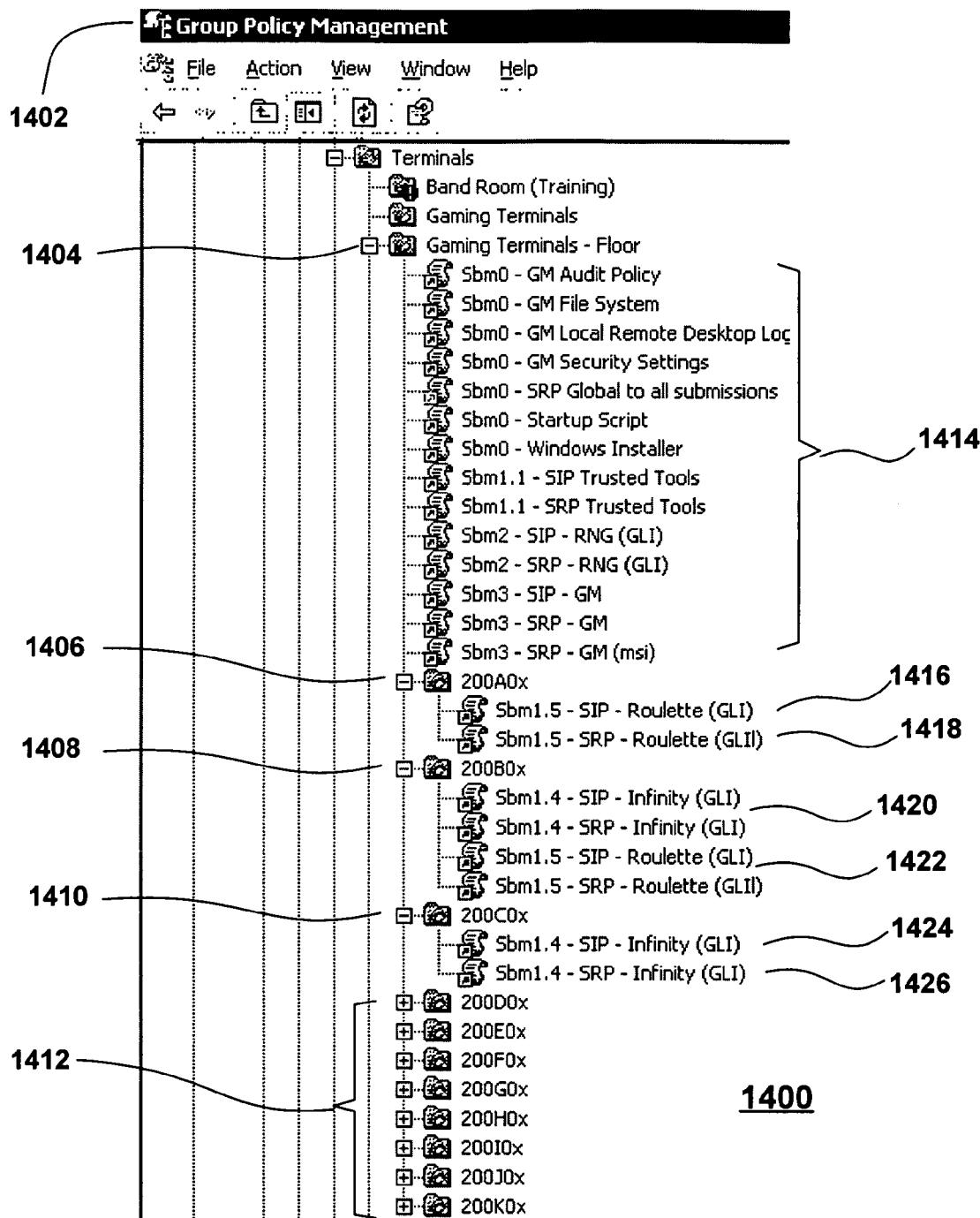
FIG. 14 illustrates the grouping of gaming terminals and the associated enforced policies, according to an embodiment of the present invention.

FIG. 14 illustrates assignment of policies by banks of gaming machines. Reference numeral 1400 in FIG. 14 shows the grouping of gaming terminal and the associated enforced policies. In this illustration, the Group Policy Management console 1402 may be configured such that the active directory Organization Unit (OU) named "Gaming Terminals—Floor" at 1404 is architectured to regroup the gaming terminals in "banks" or sub-Organization Units (sub-OUs) identified by 200A0x 1406, 200B0x 1408, 200C0x 1410, and 200D0x to 200K0x at reference numeral 1412. Each bank contains a predetermined number of gaming terminals, in multiples of 8 units, for example.

Noting the hierarchical tree composed of the OUs and sub-OUs illustrated at 1400, all the policies 1414 apply to the OU "Gaming Terminals—Floor" 1414 which contains all the sub-OUs 1406 1408 1410 and 1412. Using this technique, all the policies 1414 may apply to all the 3000 gaming terminals of a large casino. In the same manner, the policies 1416, 1418 apply to the bank 1406; the policies 1420, 1422 apply to the bank 1408; and the policies 1424, 1426 apply to the bank 1410.

In the illustration, the exemplary game named "Roulette" is assigned a policy named "Sbm1.5—SIP—Roulette (GLI)" 1416 which configures the Software Installation Policy (SIP) and a policy named "Sbm1.5—SRP—Roulette (GLI)" 1418 which configures the Software Restriction Policy (SRP) for that game.

In the same manner, the exemplary game named "Infinity" is assigned a policy named "Sbm1.4—SRP—Infinity (GLI)" 1424 which configures the Software Installation Policy (SIP) and a policy named "Sbm1.4—SRP—Infinity (GLI)" 1426 which configures the Software Restriction Policy (SRP) for that game.

The keyword "Sbm1.4", in this example, denotes the certification submission number 1.4, and the keyword "GLI" denotes the certification lab GLI (Game Laboratories International) approving the Infinity game software.

In the illustration, all of the game terminals regrouped in the bank 200A0x shown at 1406 are, therefore, configured to execute the Roulette game, all the game terminals in the bank 200B0x shown at 1408 are configured to execute the Roulette game and the Infinity game, and all the game terminals in the bank 200C0x shown at 1410 are configured to execute the Infinity game.

Figure 15:
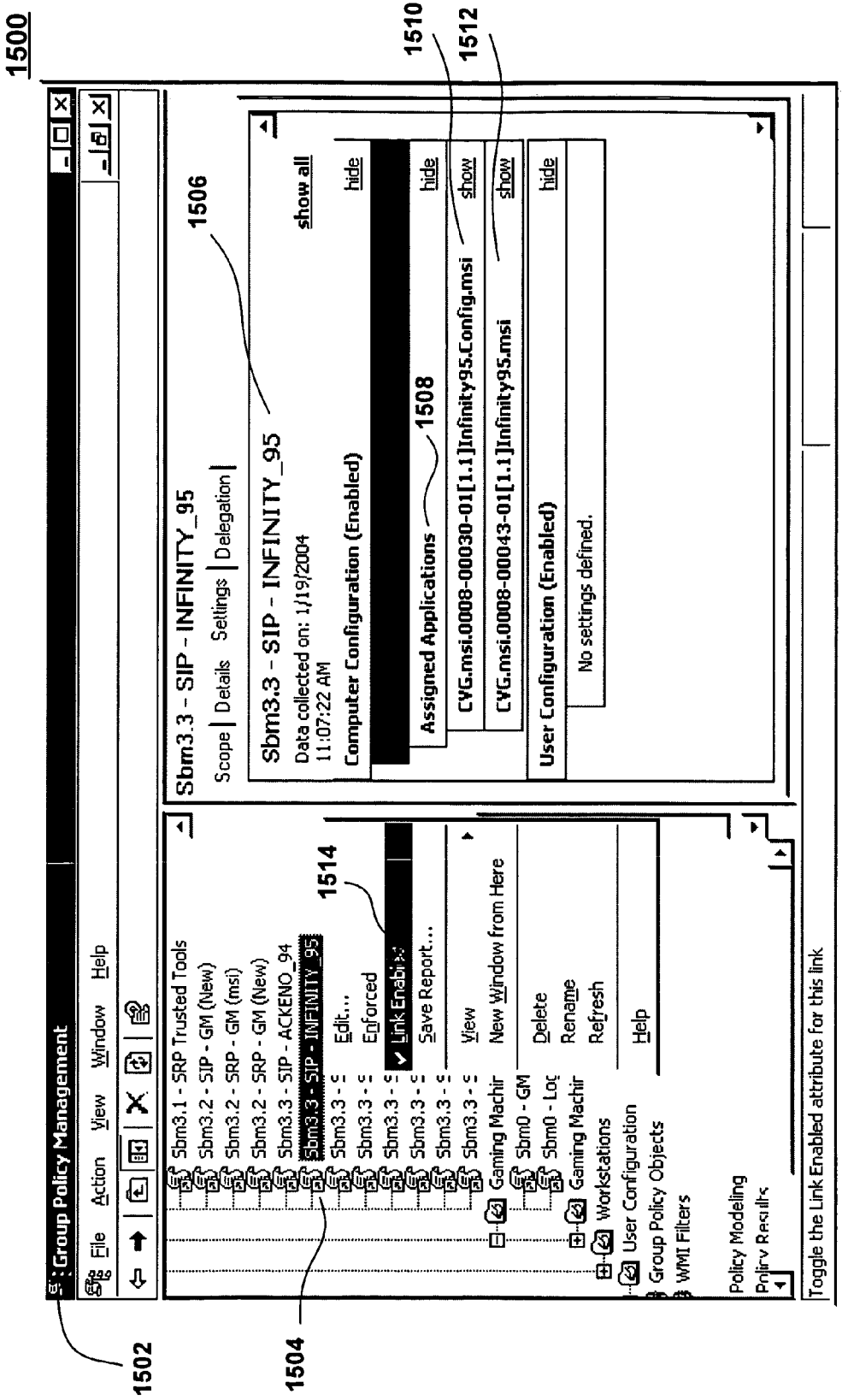
FIG. 15 illustrates a method for enforcing a Software Installation Policy by "linking" the policy, according to an embodiment of the present invention.

FIG. 15 shows the enforcement of a Software Installation Policy (SIP). In FIG. 14, banks of gaming terminals are configured to execute authorized games using SIPs and SRPs policies. However, in order for the gaming terminals to be able to install a game, the associated Software Installation Policy must be enforced. At 1500, FIG. 15 illustrates a method for enforcing a Software Installation Policy by "linking" the policy, according to an embodiment of the present invention. This is accomplished in the Group Policy Management console 1502 by, e.g., right-clicking the selected policy 1504, 1506 "Sbm3.3—SIP—INFINITY_95" associated to the Infinity game with a Return To Players (RTP) percentage of 95% and selecting the "link Enabled" attribute 1514. The software components for the Infinity_95 game contained in the two MSI installation packages 1510 and 1512 will subsequently be installed, provided the associated SRPs are configured to authorize execution of these two MSI packages (refer to description for FIG. 16). Alternatively, the same procedure may be automated via an API called from an appropriate application. It is to be noted that the linking of the policy will in fact enable the enforcement of the policy, but the policy will only be enforced on the gaming terminal when a gpupdate command or equivalent command is performed at the terminal; a terminal reboot may also be required for the policy to be enforced. Also to be noted is that policy changes are automatically distributed by the Windows server operating system throughout the network connected gaming system at periodic intervals; this automatic process may preferably be disabled such as to obtain more predictable policy enforcement changes by issuing explicit commands instead.

Package 1512 (friendly name: Infinity95.msi) contains the executable software components for the Infinity game and package 1510 (friendly name: Infinity95.Config.msi) contains the configuration files (the non-executable files) for the Infinity game. Package Infinity95.Config.msi 1510 is re-installed in the process 938.

Figure 16:
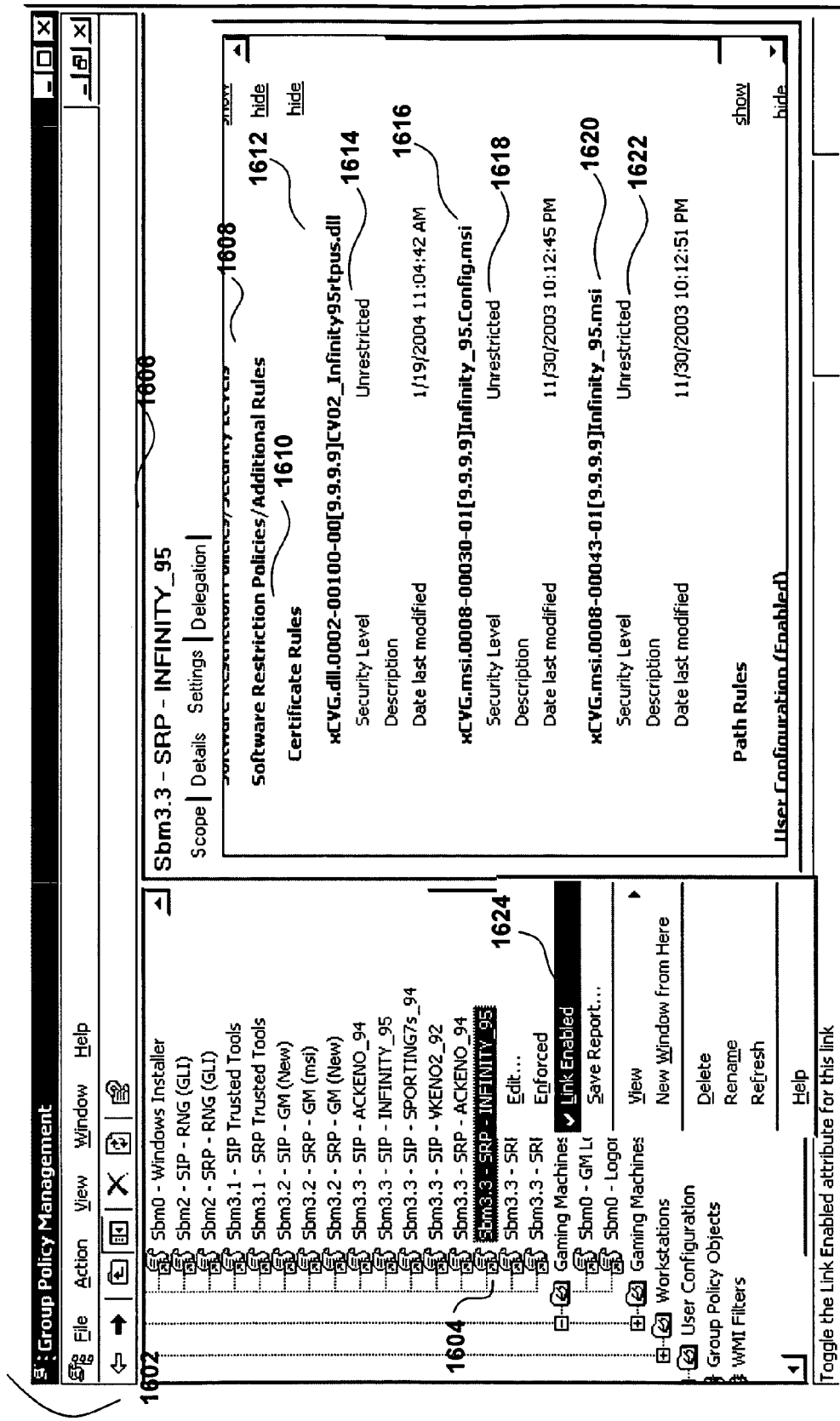
FIG. 16 illustrates a method for enforcing a Software Restriction Policy by "linking" the policy, according to an embodiment of the present invention.

FIG. 16 illustrates the enforcement of a Software Restriction Policy (SRP). In FIG. 14, banks of gaming terminals are configured to execute authorized games using SIPs and SRPs policies. However, in order for the gaming terminals to be able to execute the games, the policies must be enforced. FIG. 16 at 1600 illustrates a method for enforcing a Software Restriction Policy 1608 by "linking" the policy. This is accomplished in the Group Policy Management console 1602 by, e.g., right-clicking the selected policy 1604, 1606 "Sbm3.3-SRP-INFINITY_95" associated to the Infinity game with a Return To Players percentage (RTP) of 95% and selecting the "link Enabled" attribute 1624.

The certificate rules 1610, 1616 and 1620 that are configured with the "Unrestricted" attribute 1618, 1622 authorize the installation of the software components for the Infinity_95 game contained in the two MSI installation packages 1510 and 1512 by authorizing the unique PKI certificate associated to those MSI produced in accordance with the present method. The ".dll" executable software component 1612 is authorized, has its security level attribute set to "Unrestricted" and is, therefore, authorized to execute once it is installed.

The two MSI installation packages 1510 and 1512 for installing the software components for the Infinity_95 game have their associated unique PKI certificate 1616 and 1620 (produced in accordance with the method described herein) configured with the "Unrestricted" security level attribute 1618, 1622 via the certificate rules 1610, thus enabling (or authorizing) execution and installation of the software components for the Infinity_95 game.

The ".dll" executable software component contained in the 1512 package has its security level attribute set to "Unrestricted" thus it is authorized to execute once it is installed.

Alternatively, the same procedure may be automated via an API called from an appropriate application. It is to be noted that the linking of the policy will in fact enable the enforcement of the policy, but the policy will only be enforced on the gaming terminal when a gpupdate command or equivalent command is performed at the terminal; a terminal reboot may also be required for the policy to be enforced. Also to be noted is that policy changes are automatically distributed by the Windows server operating system throughout the network connected gaming system at periodic intervals; this automatic process may preferably be disabled such as to obtain more predictable policy enforcement changes by issuing explicit commands instead.

Figure 17:
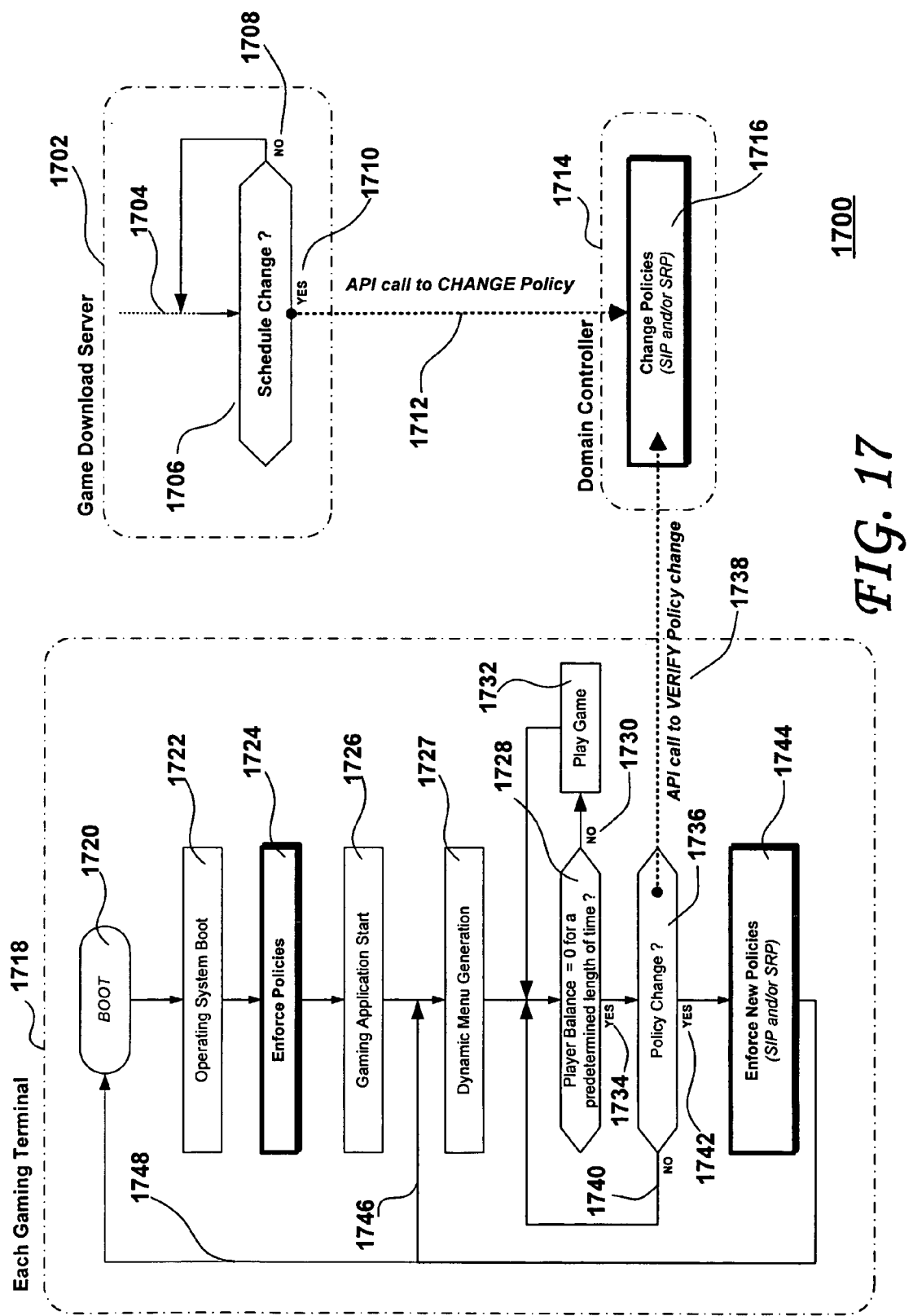
FIG. 17 illustrates the method to enforce a policy at a predetermined time, according to an embodiment of the present invention.

FIG. 17 illustrates a method at 1700 to enforce a policy at a predetermined time, according to an embodiment of the present invention.

Enabling enforcement of policies as described relative to FIG. 15 and FIG. 16 may be carried out interactively by an authorized user at predetermined authorized times, or alternatively may be controlled by a process at predetermined authorized times via the appropriate API. At the central system 1702 (the game download server in this illustration) at a given time 1704, a user or a process may verify a change 1706 in the list of games to be made available to players on a selected set of gaming terminal banks. In case of a schedule change as shown at 1710 (or other reasons such as introducing a new game or revoking an existing game), policies on the domain controller 1714 are being changed accordingly either interactively by a user in the Group Policy Management console as described for FIG. 15 and FIG. 16, or by a process via the equivalent APIs 1712. The changed policies are being enabled for enforcement at 1716 in the domain controller.

In a casino, although new games may be scheduled to be downloaded to gaming terminals and activated at predetermined times, it is a requirement that games are not to be changed while a player is playing. In practical terms, it is considered that a player terminates playing when his or her credit balance remains at zero for a predetermined period of time. The predetermined period time should be sufficient to allow the player to enter a new bill or other form of credit or payment instrument to continue playing. Therefore, the game application software on each game terminal continually tests for this condition (credit=0 for a predetermined period of time) before checking for change in policy, enforcing the policy changes and then updating the menu of games to be made available to the next player.

Upon power-up, each gaming terminal 1718 executes a boot 1720, loads its operating system 1722 and enforces the policies 1724 that are configured at the time of the start-up process. When the game application starts at 1726, it displays a menu of authorized activated games as shown at 1727 to the player using for example the dynamic method described relative to FIG. 19. Whenever the player balance is non-zero 1728, 1730, the player may play as shown at 1732 the games listed on the menu in accordance with the enforced policies. When the player's balance reaches zero at 1734 and remains zero for a predetermined period of time, it is considered that the player is no longer playing. The gaming application of the gaming terminal may then verify at 1736 if a policy has changed 1738. This may be done via the RegisterGPNotification. The RegisterGPNotification function enables an application to receive notification when there is a change in policy. When a policy change occurs, the specified event object is set to the signaled state. Additional details regarding the RegisterGPNotification function may be found at http://msdn.microsoft.com/library/default.asp?url=/library/en-us/policy/policy/registergpnotification.asp.

At 1740, if there is no change in policy, the games listed on the menu will be unchanged for the next player. If there is a change in policy at 1742, the gaming terminal may enter into a process whereby the policies are enforced as shown at 1744, using for example the gpupdate.com service, the RefreshPolicy function or the RefreshPolicyEx function, or equivalent services or API. It is to be noted that the verification of change in policy and the enforcement of the changed policies may be carried out by each terminal independently.

The RefreshPolicy function causes policy to be applied immediately on the client computer. Additional details regarding the RefreshPolicy function may be found at http://msdn.microsoft.com/library/default.asp?url=/library/en-us/policy/policy/refreshpolicy.asp The RefreshPolicyEx function causes policy to be applied immediately on the computer. The extended function allows specifying the type of policy refresh to apply. Additional details regarding the RefreshPolicyEx function may be found at http://msdn.microsoft.com/library/default.asp?url=/library/en-us/policy/policy/refreshpolicyex.asp Once the change in policy is enforced at 1744, the gaming terminal may reboot as shown at 1748 or exit and re-enter the gaming application, which would dynamically recreate the menu list of games 1727 to be made available to the next player, as detailed at FIG. 19.

A similar method relying on explicit WMI calls and administrative templates (*.adm) may be applied to obtain the same result in gaming environments whereby the domain controller active directory is not available such is the case with gaming terminals connected in WAN (Wide Area Network) whereby the network bandwidth is limited or the network availability is poor.

An alternative method relying on SMS (System Management Server) code download instead of SIPs (Software Installation Policy) for installing software components and software MSI packages may be used. However, the executable software components remains under SRP (Software Restriction Policy) in accordance with the unique PKI certificate generated for each component as described in the invention.

Figure 18:
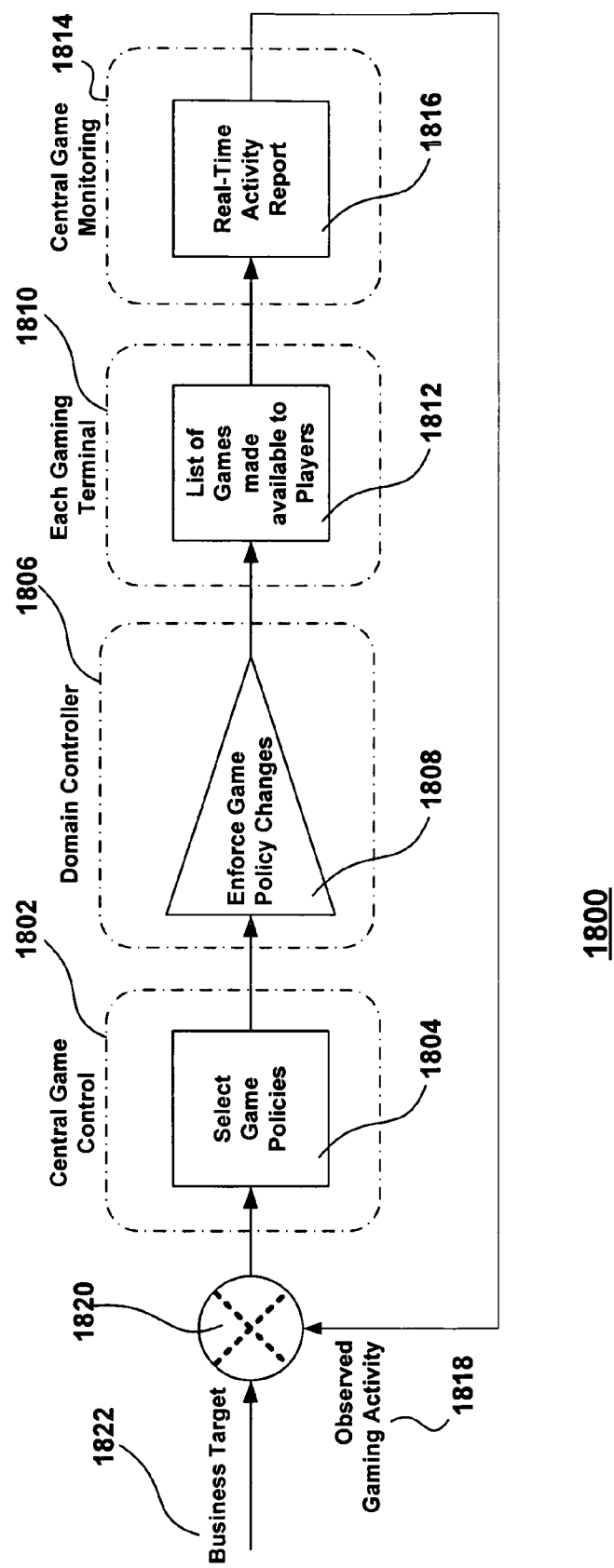
FIG. 18 illustrates the method to enforce a selected policy as the result of observing the gaming activity, according to an embodiment of the present invention.

FIG. 18 shows a close-loop enforcement of a policy, according to an embodiment of the present invention. FIG. 18 at 1800 illustrates a method to enforce a selected policy as the result of observing the gaming activity. The method is directly derived from FIG. 17 whereby the policy change 1716 takes place at 1804 and is selected from a choice of pre-configured policies, for example in a look-up manner, whereby a policy would result in making available to the players a menu of games 1812 (1727 in FIG. 17) to provoke a given gaming activity change which may be monitored in real-time at 1816. The observed activity 1818 may then be compared 1820 to predetermined businesses objectives 1822 and a correction or modification may be applied by selecting a new policy that would change the list of games available on a selected aggregate of gaming terminals 1810. For example, due to a long queue of people who want to play the Infinity game, a greater number of banks of gaming terminals may be configured to make the Infinity game available to players on these terminals. Another reason for applying a new policy might be if a particular area of the casino floor is heavily populated with players while another area is empty. Suppressing some popular games in a highly frequented area and adding them to the less frequently area may help spread the player distribution within the casino or gaming area more evenly. Yet another reason for applying a new policy could be if the gaming activity is low, then games with a higher RTP (return to player), let us say 98% instead of 95%, may be activated in some areas to boost activity.

The process may involve several subsystems as illustrated in FIG. 18: the central game control 1802 wherein policies are selected, the domain controller 1806 that enables enforcement of the policies 1808, a selection set of gaming terminals 1810 wherein each gaming terminal enforces the policies and make the selected games available to the player 1812, a central game monitoring system 1814 that produces activity reports in real time 1816.

The process shown at 1820 of comparing the observed activity 1818 and the targeted activity 1822 and then selecting a change in game policies 1804 may be carried out by the floor manager or the floor director, or alternatively by a knowledge base process. In both cases, a close-loop enforcement of policies (relying on the unique PKI certificate SRP associated to each executable authorized and certified software component) is achieved resulting in the dynamic configuration of the gaming system, either for LAN configurations (such as casino floors) or WAN configuration (such as video lottery terminals distributed across a large geographic area).

Figure 19:
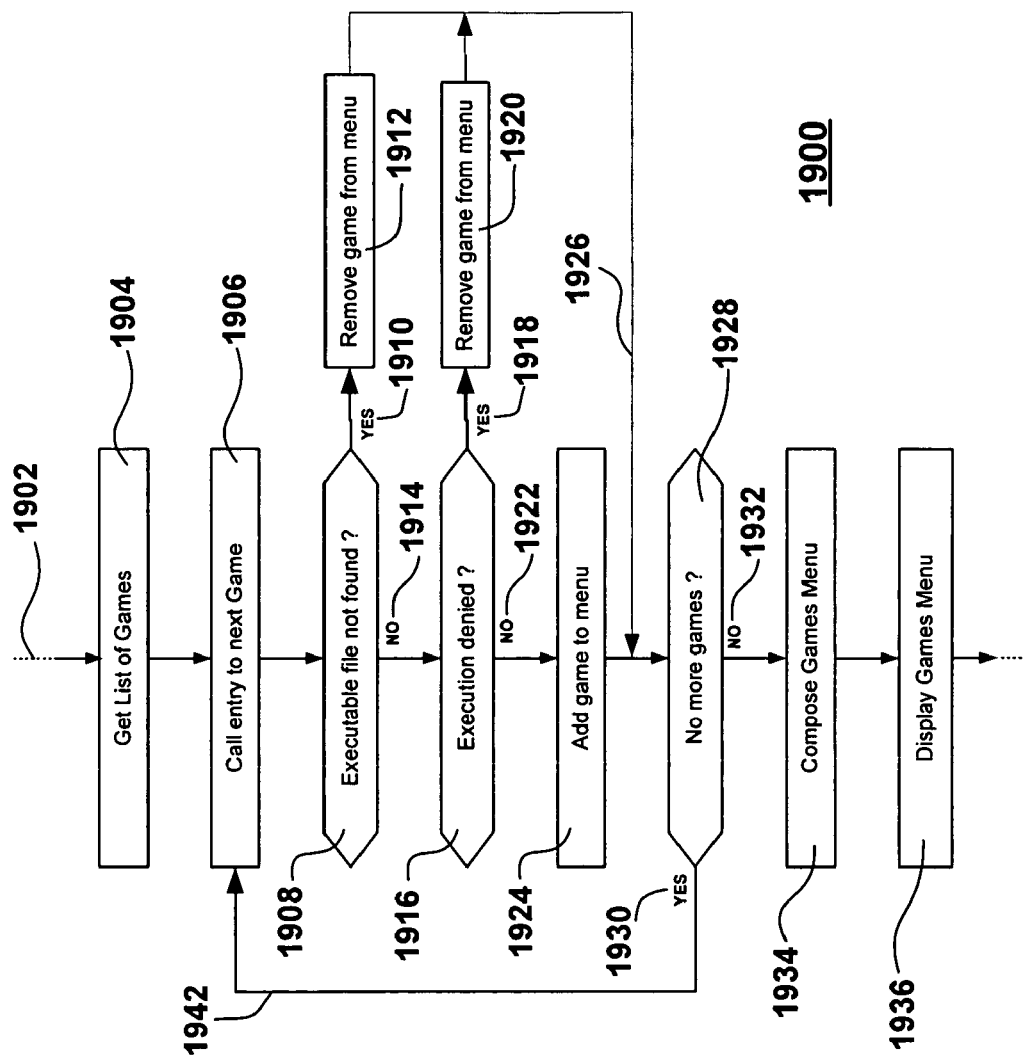
FIG. 19 illustrates the method to generate dynamically the menu list of authorized game made available to the player on each gaming terminal, according to an embodiment of the present invention.

FIG. 19 at 1900 illustrates a method to generate dynamically the menu list of authorized games made available to the player on each gaming terminal, according to an embodiment of the present invention. The dynamic configuration of a large gaming system whereby authorized games made available to players on selected group of gaming terminals using software restrictions policies at the central system may result is hundreds of different game menus. Reliance on SRPs for preventing non-authorized software components to execute is entirely based on a sound and demonstrable trusted base; therefore the gaming system is trusted. Getting the list of authorized games to each gaming terminal would require configurations files to be sent from the central system to each of the gaming terminal; however, this would be illegal because the change in the list of games may affect the game outcome. This is clearly understandable when considering changing a game; let us say Infinity__95 with a RTP or 95% with Infinity__98 with a RTP of 98% at 10:00 PM, then back at 8:00 AM, and this each day except during the weekend, or at other times as a result of the closed loop process described at FIG. 18. Game regulators mandate that the process to manage this type of change be certified with secure means of the same order as when installing/downloading software components using a unique PKI method.

Embodiments of the present invention, therefore, provide secure means to update a list of authorized games to be offered to the player. The menu of authorized games offered to the player may be dynamically generated by each terminal without requiring the central system to dispatch the list of authorized games or having each terminal fetch the list of authorized games from the central system (both are illegal without extreme precaution of the same order as the installing/downloading of software components using a unique PKI method because they may affect the game outcome); this is achieved by having each terminal checking the certificate Software Restriction Policies enforced on the games (a unique PKI certificate being generated for each of the executable game components in accordance with the methods detailed in this document).

As illustrated in FIG. 19 at 1900, each terminal when executing the gaming application 1902 gets a list of the file names for the games available at 1904 from a trusted configuration file (an updated trusted configuration file may have been downloaded in a certified code signed MSI package with the last game download) and a menu is initially compiled for this list. Attempts to execute each of the game entry module of the games contained in the list 1906 are made. If the game entry module is not found at 1910, the software components do not exist on the gaming terminal and the game is removed from the menu 1912, whereupon the process iterates to next game, as suggested at 1926 1928. If the execution of the game entry module is denied at 1916, 1918 because the Software Restriction Policy is preventing this game to execute, the game is removed from the menu as shown at 1920 and the process iterates to next game, as shown at 1926 1928. If the execution of the game entry module is successful at 1922, then the game is authorized and may be added to the games menu offered to the player. The process iterates through other games in the list, as shown at 1928, 1930, 1942, 1906, if any. Once the iteration is completed at 1932, the games menu may be composed at 1934 and the menu is displayed to the player at 1936.

FIG. 20 shows a companion Hello component, according to another aspect of the present invention. Reference numeral 2000 in FIG. 20 illustrates a method to generate a code signed companion software component. Each game comprises an aggregate of executable and non-executable software components, usually comprising files such as *.exe, *.dll, *.dat, *.xml. In general, all the software components are dependent of one component named the main program or the game entry. Starting the execution of the main game component is a lengthy process, as a large number of dependent executable components and graphics need to be verified (SRP verification) and started. Currently, there is no API available in the Windows operating system client computer for verifying the status of a Software Restriction Policy enforcement on a given software component applicable to that client computer.

Another embodiment of the present invention, therefore, provides a method to quickly verify the policy enforcement on a game without starting the entire game, in order to generate the list of available games to be made available to the player in a menu. For each game, a very short companion .dll file may be created having, for example, only one line of code <<Return "HELLO">> which would return the exemplary "HELLO" string when called. Assuming "Infinity.dll" 2010 is the main game component file name 2002 (or friendly name), then the companion file may be named "Infinity.Hello.dll" 2018. Preferably, the companion's 2018 source code would have in its assembly information a part number 2004 as shown at 2020 and a version number 2006 as shown at 2022 that is identical to the main component 2010 part number 2012 and a version number 2014, but this is not mandatory. In addition, assuming the PKI certificate's subject name 2008 associated to the Infinity.dll is "GDS.exe.0099-0001-00 [1.0.101.0] Infinity.dll" 2016, which is used for the code signing of the Infinity.dll, we may proceed with the code signing of Infinity.Hello.dll with the same 2026, 2028 "GDS.exe.0099-0001-00[1.0.101.0] Infinity.dll" certificate, as shown at 2024.

It is to be noted that code signing two distinct software executables with the same certificate is a deviation from the method taught earlier in this document. However, the fact that the role of the companion file is very well defined, as having for example only one line of code <<Return "HELLO">> which would return the "HELLO" string when called, this does not present an issue with the regulators or the certification lab.

Figure 21:
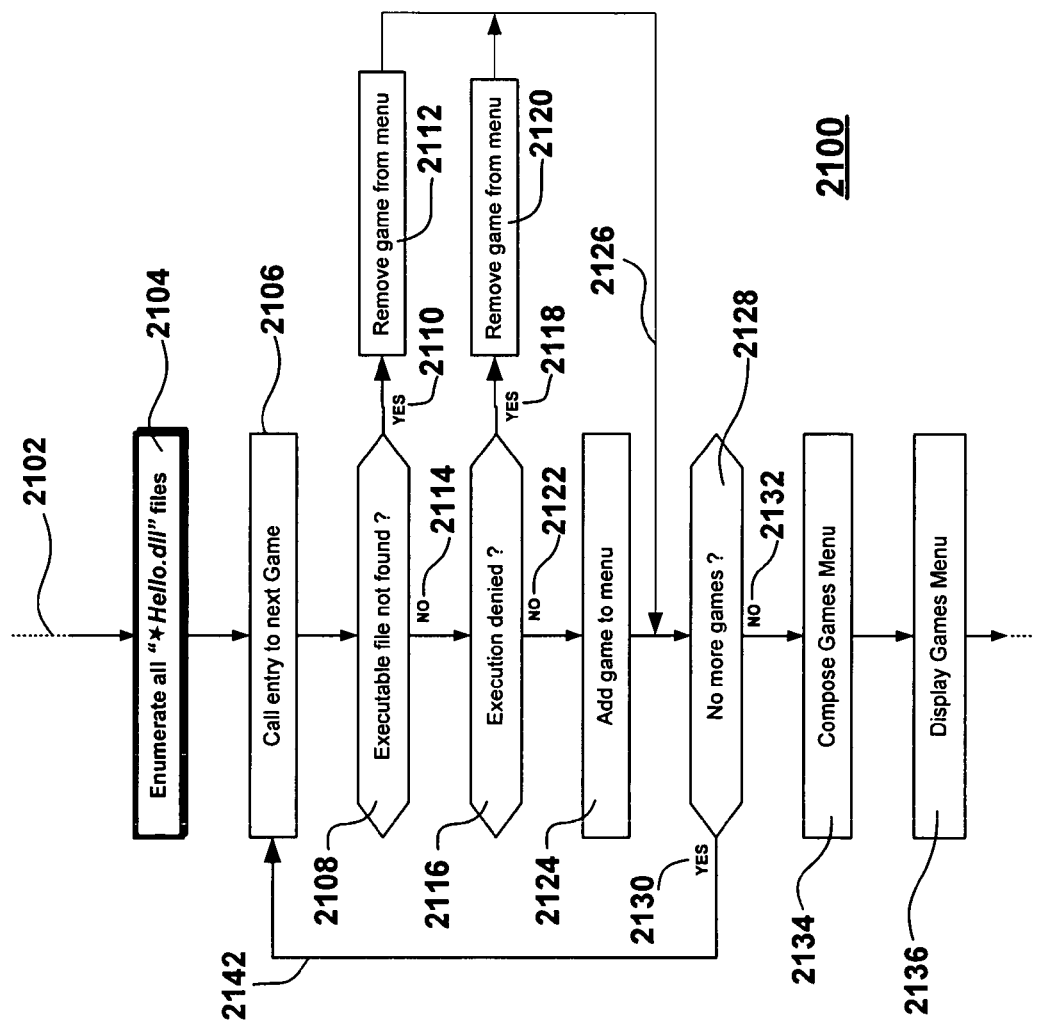
FIG. 21 illustrates the method to quickly generate dynamically the list of game installed on each gaming terminal using the companion software component, according to an embodiment of the present invention.

FIG. 21 shows steps that may be carried out to search for games on each gaming terminal, according to yet another embodiment of the present invention. Reference numeral 2100 in FIG. 21 illustrates a method to quickly generate dynamically the list of games installed on each gaming terminal using the companion software component described above. The process of dynamically generating the game selection menu may be optimized in many ways in order to reduce the overhead of starting the execution of a game to check if it is authorized. However, if the aim is to sense for the enforced SRP or SIP applied to the game or detect local availability of the game software components, then such optimizations (among other possible variations) should be considered to be within the scope of the invention as defined by the claims hereunder. According to an embodiment of the present invention, a method is presented herewith to quickly generate the list of available games to be made available to the player in a menu without transfer of a file from the server. Reference 2100 is identical to reference 1900 in FIG. 19 except for the first process 2104 whereby a file search process is performed for finding (or enumerating) file names with the "*Hello.dll" string, the "*" symbol being the standard wild character used in string searches. A list of the games installed on each gaming terminal may be quickly and dynamically generated by calling the companion software component of the game main component instead of calling the main component itself. The companion component may be as detailed at FIG. 20 or may be a similar construct.

The embodiments of the present invention described herein are also applicable to any of the subsystems available in a network connected gaming system that require preventing non-authorized software components to execute or affect game outcome, such as the gaming terminals, the game management system (CMS or MCS) that monitor and control whole or part of the estate of gaming machines, the progressive jackpot systems, the bonussing systems as well as game payment verification systems such as IGT EasyPay and Cyberview PVU (Payment Verification Unit) and PVS (Payment Verification System). Gaming subsystems are tested against gaming standards such as those produced by GLI (Game Laboratory International); the game standards are mandated by game regulators in accordance with local regulation and laws. The network-connected subsystems may be located within the premises accommodating the estate of gaming machines (connection via a LAN) or outside of the premises (connection via a WAN).

The methods described in the document rely on software installation policies and Software Restriction Policies which may be configured (a) via the domain controller active directory, as this is advantageously the case whenever the network connection is a LAN, and which may also be configured (b) to each of the local computers via WMI services (Windows Management Instrumentation) or administrative templates (.adm files) in order to configure and enforce local group policies when a domain controller is not available as this is the case whenever the network connection is a WAN. Microsoft SMS (Systems Management Server) may be used as an alternative to using software installation policies.

The methods described in the document leverage on software installation policies and/or software restriction policies technology implemented in Microsoft Windows operating system. Whenever similar technology is implemented in other operating systems such as Linux, Unix, Windows CE and QNX, it is considered as part of the invention herein.

In an other embodiment of the invention, it order to make game regulators more at ease with the huge shift in paradigm from prehensile physically secured ROM based gaming machines (whereby access to the ROM is via multiple layers of keys locks and tamper detectors), to a totally virtual or volatile fashion of downloading game code via a network, it may be advantageous to perform download of the game code when the gaming machine is not operational. Consequently, the network downloading of game code from a central repository may not interfere with the games. This is accomplish by terminating all gaming software in order to transform the gaming machine into a generic PC, then transferring the game software under the control of the operating system using pervasive network code download available in most information technology networked environments. An "Out-of-service" message may be displayed on the screen to indicate that the machine is no longer playable, thus is no longer a gaming machine. Once the game code is downloaded by the generic PC, the game code is verified for trustworthiness and is executed, thus transforming the generic PC back into a gaming machine.

Figure 22:
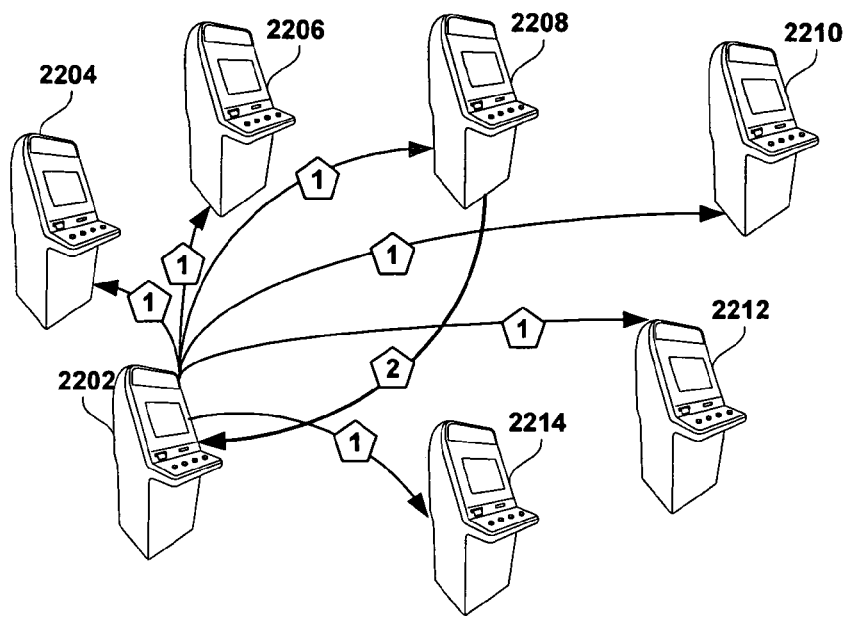
FIG. 22 shows a serverless embodiment of the present invention, in which installation packages are broadcast over the network in a peer-to-peer fashion.

FIG. 22 shows a serverless embodiment of the present invention, in which installation packages (or messages stating the availability of such installation packages) are broadcast over a network in a peer-to-peer fashion—that is, without the intermediary of a central server. FIG. 22 shows a system of interconnected gaming machines 2202-2214. As opposed to a network that includes a deploy or central server into which new installation packages are loaded and from which new installation packages are downloaded, the system of FIG. 22 includes only peers. Indeed, this system is one in which each gaming machine is a peer to every other gaming machine. That is, according to this embodiment, there is no server from which installation packages are always or even preferentially downloaded—the system and the constituent gaming machines thereof may be configured as a true peer-to-peer environment. Given the absence of a server, the gaming machines themselves must either seek out new installation packages from the other peers within the system (through a query-response cycle, for example) or announce to the other gaming machines within the system when they possess one or more new software installation packages or other updates. Failure of one or more gaming machines does not jeopardize the installation of packages to all the other gaming machines.

In the embodiment of FIG. 22, gaming machine 2202 broadcasts (as shown at (1)) a request for new installation packages or a query asking if any of the other gaming machines within the system have any new installation packages. None of the other gaming machines 2204-2214 may have any new installation packages, in which case they may either fail to respond to the query or respond that they do not have any new installation packages. One or more of the gaming machines 2204-2214, however, may have one or more new installation packages available (a new installation package, for example, may be a certificate bound package that contains one or more new software components). In that case, each may respond in the affirmative as they receive the query. Thereafter, for example, gaming machine 2202 may bind together with the first responder (in this case, gaming machine 2208 that responds to gaming machine 2202 at (2)) and negotiate the download of the installation packages in a manner consistent with the protocols described herein, to insure that the downloaded installation packages remain secure and may continue to be trusted.

Figure 23:
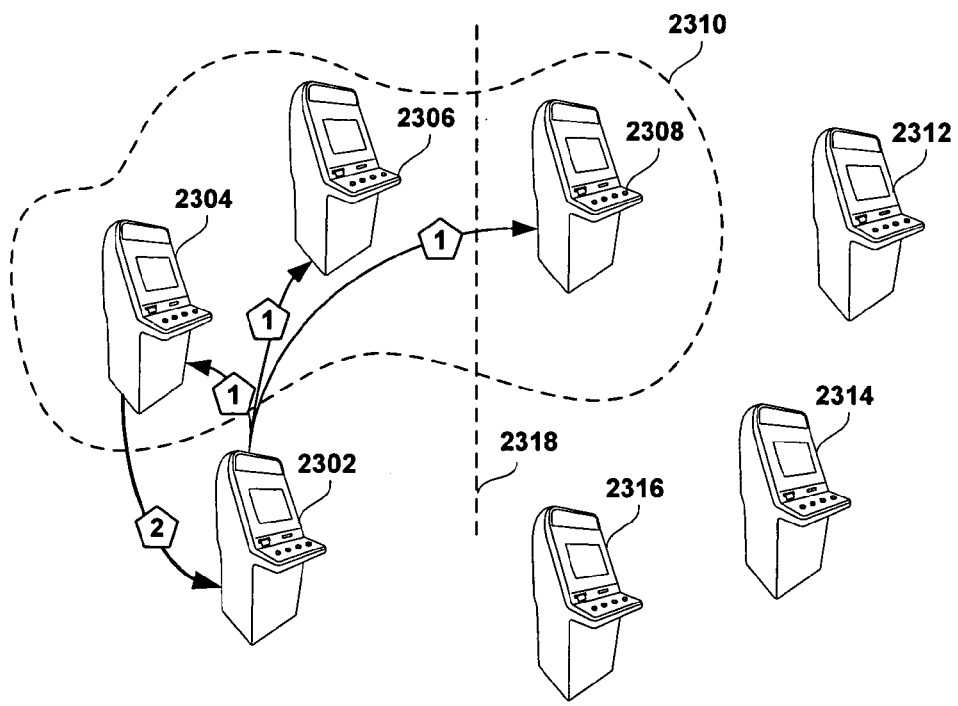
FIG. 23 shows another serverless embodiment of the present invention, in which a first, random or designated one of the gaming machines within a group responds to a broadcast request.

FIG. 23 shows another serverless embodiment of the present invention, in which a first, random or designated one of the gaming machines within a group responds to a broadcast request. The embodiment of FIG. 23 is a variant of that shown in FIG. 22, in that a subset of the gaming machines shown are either physically and/or logically grouped together in a group 2310 of a predetermined or dynamic size. As shown in FIG. 23, gaming machines 2304, 2306 and 2308 may be designated as belonging to group 2310. Gaming machines 2312, 2314, 2316 and 2302 may be designated to belong to one or more groups or may be "standalone" gaming machines. Alternatively still, one or more of the gaming machines 2312, 2314, 2316 and 2302 may be designated as belonging to one or more groups whose constituent members include gaming machines that are designated as belonging to one or more other groups such as, for example, group 2310. Groups, therefore, may share gaming machines, meaning that gaming machines may belong to more than one group, or may belong to no group (or, for the sake of consistency, may be designated as belonging to a group of which it is currently the sole member). As shown in FIG. 23, one of the gaming machines (2302 in FIG. 23) may broadcast (1) a request for new installation packages to one or more gaming machines within a predetermined, selected or random group (group 2310 in this case). Thereafter, any or all of the gaming machines 2304, 2306, 2308 may respond (2) to the broadcasting gaming machine 2302. All of the gaming machines 2304, 2306 or 2308 or a designated one of the gaming machines (in this case, gaming machine 2304) may respond and bind to the broadcasting gaming machine 2302 to effectuate the transfer of software installation packages in a manner that is consistent with FIGS. 1-21, as described above. As shown, the systems of FIGS. 22 and 23 do not include a server from which installation packages are downloaded, or even any preferred provider of such installation packages or other software to be propagated across the system—all such transfers of installation packages (and/or like constructs) are carried out solely and directly amongst the gaming machines themselves. Failure of one or more gaming machines does not jeopardize the installation of packages to all the other gaming machines. Any one of the gaming machines may be that machine to which new software components are first loaded, whereupon that gaming machine may propagate the new software components across the network in any of the ways described and shown herein. Reference 2318 denotes a separation between some of the gaming machines. Such separation 2318 may be a physical separation (e.g., gaming machine 2308 is physically separated from gaming machines 2304, 2306—such as in another room or in another casino, jurisdiction or location) or may denote a logical separation related to the operation of the gaming machines.

Figure 24:
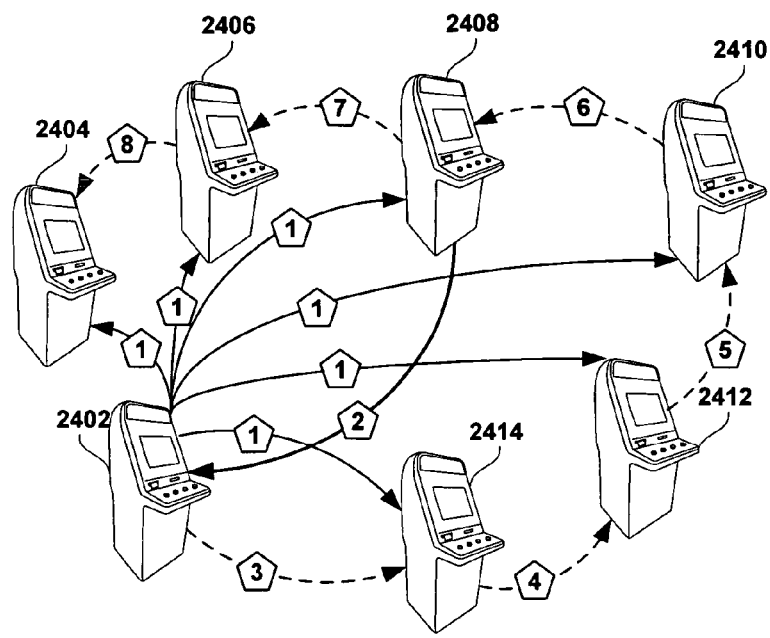
FIG. 24 shows another serverless embodiment of the present invention that utilizes the broadcast-response model, followed by a daisy-chain propagation of, e.g., installation packages.

FIG. 24 shows another serverless embodiment of the present invention that utilizes a broadcast-response model, followed by a daisy-chain propagation of, e.g., installation packages. As shown therein, one of the peer gaming machines, say gaming machine 2402, may broadcast at (1) to some or all of the gaming machines a query to determine whether any have new software installation packages. In the example of FIG. 24, gaming machine 2408 responds at (2), whereupon gaming machines 2402 and 2408 may bind together and negotiate the transfer of the installation packages, in the manner described above. Thereafter, the installation packages may be propagated across the system in any manner, such as the daisy chain method illustrated at (3), (4), (5), (6), (7) and (8). Note that gaming machine 2408 already has the new installation package(s), and may merely propagate them to the next gaming machine 2406. Alternatively, the broadcast response steps may be omitted; with the gaming machines configured to broadcast any newly received installation packages across the system (or narrowcast the newly received installation packages to a limited number of gaming machines) without waiting for a query from some other gaming machine.

Figure 25:
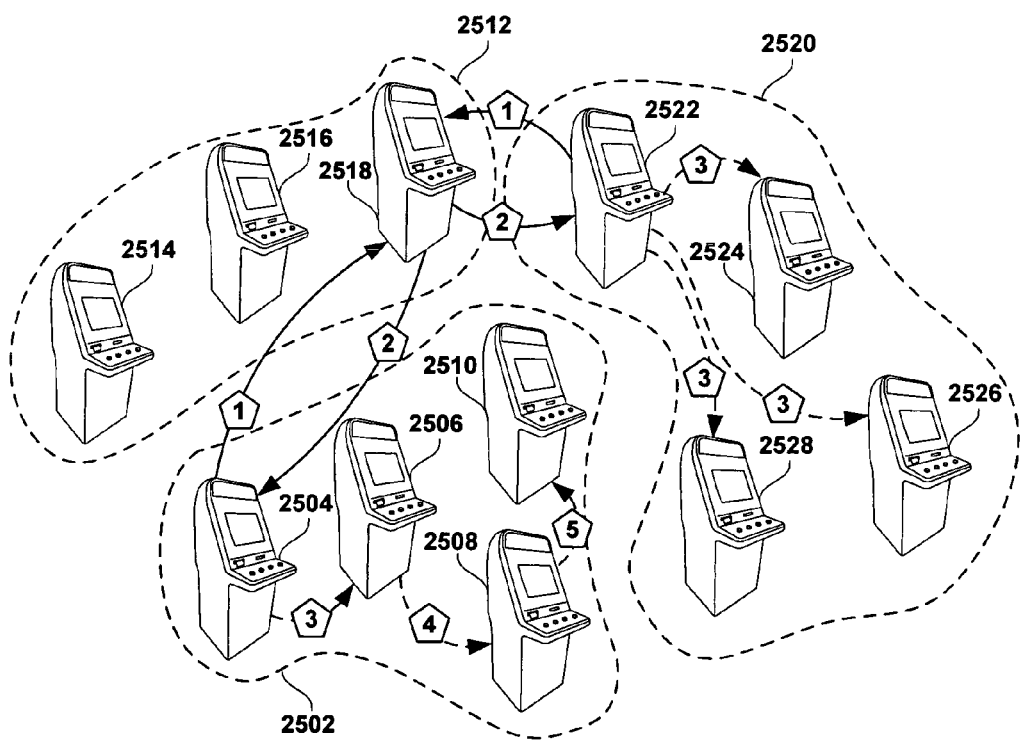
FIG. 25 shows another serverless embodiment of the present invention that utilizes a narrowcast/query-response model, followed by a daisy-chain propagation or broadcast of, e.g., installation packages within a predetermined group of gaming machines.

FIG. 25 shows another serverless embodiment of the present invention that utilizes a narrowcast/query-response model, followed by a daisy-chain propagation of, e.g., installation packages within a predetermined group of gaming machines. As shown in FIG. 25, gaming machines may be organized into one or more groups, such as shown at 2502, 2512 and 2520. Such groups may be defined by most any common element or characteristic. For example, the groups may be defined geographically or logically. Logical groupings may be dynamic, changing depending upon time of day, activity, promotional campaigns, games currently being played and/or any other characteristic or metric. A gaming machine may belong to more than one group or may be the sole member of a group. According to an embodiment of the present invention, a gaming machine may broadcast a request or a query for new installation packages to one or more gaming machines of one or more other groups. In the example of FIG. 25, the gaming machine 2504 of group 2502 sends a query to gaming machine 2518 of group 2512. Likewise, the gaming machine 2522 sends a query to the same gaming machine 2518, to determine if this gaming machine has any new installation packages. In the example shown herein, gaming machine 2518 does indeed store new installation packages and may bind together with gaming machines 2504 and 2522 to cause the new installation packages to be downloaded thereto. Thereafter, the downloaded installation packages may be propagated to all or select ones of the gaming machines within each group. As shown, the propagation may be carried out via a daisy chain mechanism, in which each gaming machine forwards a copy of the received installation packages to a designated one of the gaming machines within the group. For example, the new installation packages are propagated through group 2502 from gaming machine 2504 to, in turn, gaming machines 2506, 2508 and 2510. Alternatively, the newly downloaded installation packages may be broadcast to all gaming machines within a group, such as shown within group 2520, in which the installation packages are broadcast to gaming machines 2524, 2526 and 2528. Here it may be assumed that gaming machines 2516 and 2514 already possess a copy of the new installation packages that were downloaded from gaming machine 2518 of group 2512. As can be seen, the installation packages may be propagated across the system in a very efficient manner, without requiring a deploy server to act as a central repository of installation packages. Failure of one or more gaming machines does not jeopardize the installation of packages to all the other gaming machines. Moreover, this efficiency is increased when the gaming machines belong to more than one group, as the installation packages may propagate without requiring query-response cycles.

Figure 26:
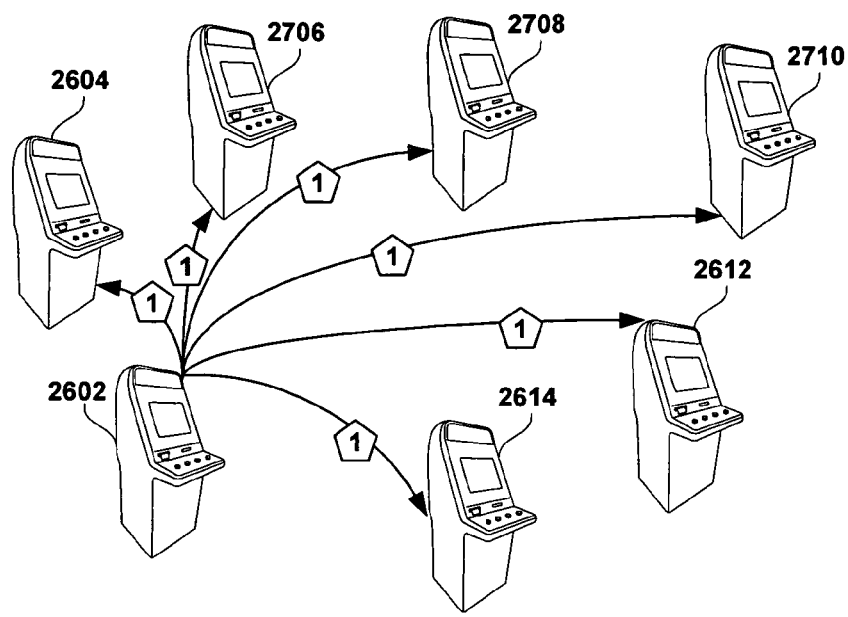
FIG. 26 shows another serverless embodiment of the present invention that utilizes a push model to propagate installation packages or messages relating to such installation packages.

FIG. 26 shows another serverless embodiment of the present invention that utilizes a push model to propagate installation packages. As shown therein, the propagation of installation packages across a network of interconnected gaming machines may be effectuated by pushing the installation packages to each or selected ones of the gaming machines. In FIG. 26, gaming machine 2602 pushes at (1) one or more installation packages to gaming machines 2604, 2606, 2608, 2610, 2612 and 2614.

Figure 27:
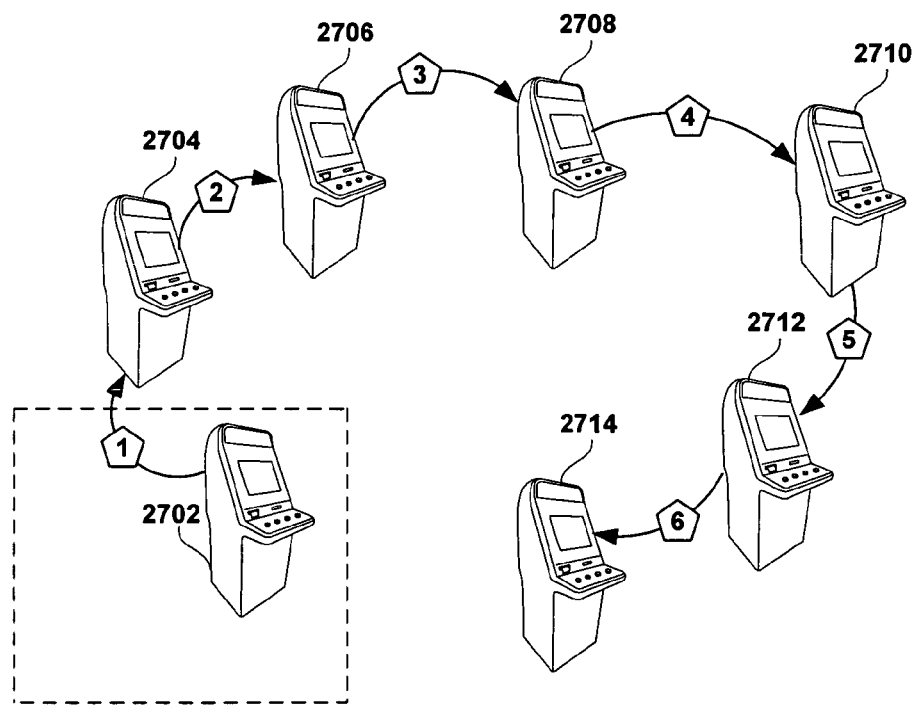
FIG. 27 shows another serverless embodiment of the present invention that utilizes a push and a daisy-chain propagation model of, e.g., installation packages from a selected peer in a predetermined location.

Alternatively, the propagation of installation packages may be effectuated solely via a daisy chain scheme, whereby each gaming machine receives installation packages from a preceding gaming machine in the chain. As shown in FIG. 27, the software installation packages may originate from any one of the gaming machines (as there are no servers and no preferred providers of such installation packages, and failure of one or more gaming machines does not jeopardize the installation of packages to all the other gaming machines), such as gaming machine 2702. The installation packages are transferred from gaming machine to gaming machine, as shown at (1), (2), (3), (4), (5), (6) and (7); that is, from gaming machine 2702 to gaming machine 2714.

Figure 28:
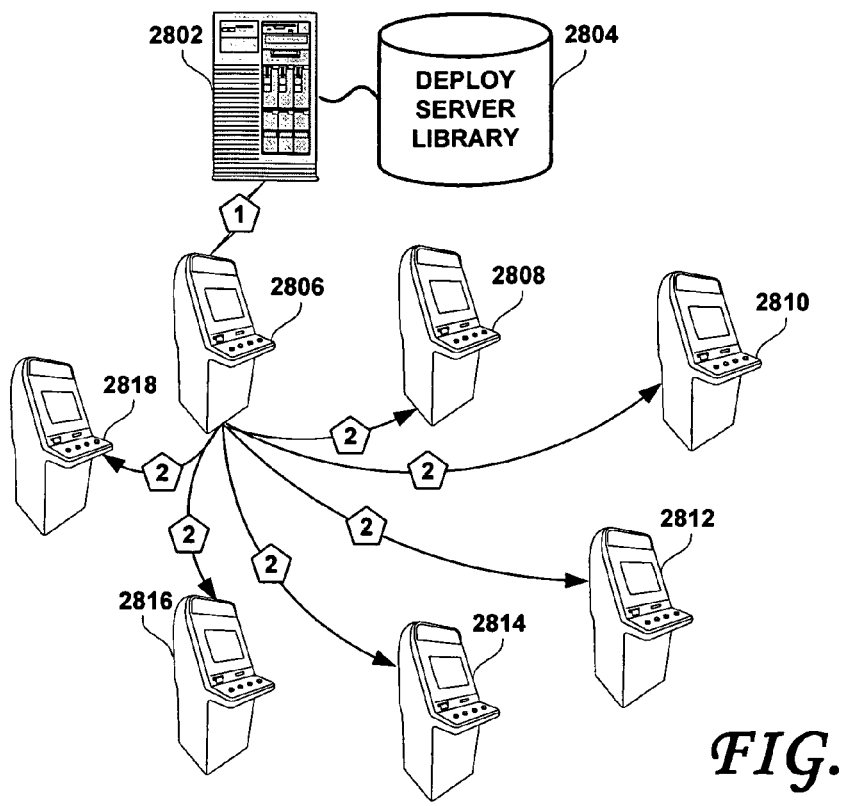
FIG. 28 shows yet another embodiment of the present invention, in which one of the peer gaming machines receives new installation packages from a deploy server coupled to a deploy server database and thereafter broadcasts such installation packages to other gaming machines.
Figure 29:
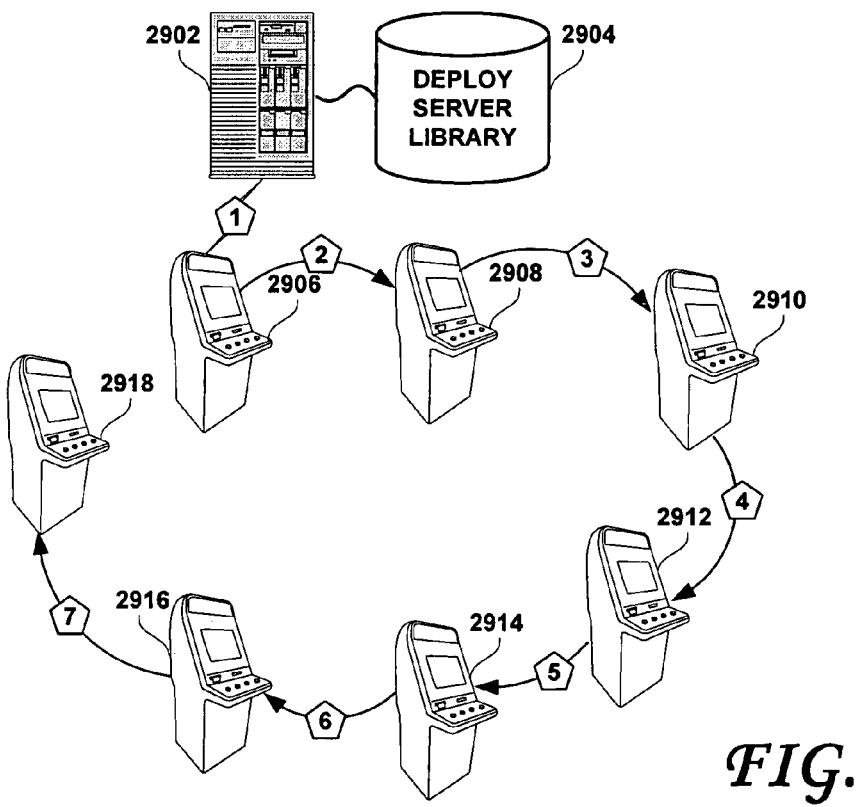
FIG. 29 shows yet another embodiment of the present invention, in which one of the peer gaming machines receives new installation packages from a deploy server coupled to a deploy server database and thereafter propagates such installation packages to other gaming machines in a daisy-chain method.

The gaming machine from which the installation packages originate may be, according to embodiments of the present invention, any gaming machine, and need not always be the same gaming machine. Aesthetically, structurally and programmatically, the gaming machine from which the installation packages originates may be identical to (or of the same type as) one or more of the other gaming machines within the system. However, it may be expedient, from a security point of view, to segregate the gaming machine from which the installation packages originate from the other, player-accessible, gaming machines. This segregation is symbolized in FIG. 27 at reference numeral 2716. 2716 may represent a secure room, for example, in which the new installation packages may be electronically or manually loaded into the gaming machine 2702. Such loading may be carried out according to local gaming regulations. This may occur, for example, within the presence of a representative of a gaming commission and a technician. For example, the gaming machine 2702 may be loaded with one or more new ROMs or may be coupled to a secure library of installation packages. However, the sole distinction of the gaming machine 2702 relative to the other gaming machines coupled thereto may be that it is the first to receive the new software installation package(s). In all other respects, the gaming machine 2702 may be identical to the other gaming machines. For example, it may be fully playable in the same manner as all of the other gaming machines within the system. In addition, the gaming machine 2702 needs to transfer the installation packages once only to a selected next peer in a daisy-chain FIG. 28 shows another embodiment of the present invention. As shown therein, a deploy server 2802 is coupled to a deploy server library 2804 containing installation packages to be downloaded. According to an embodiment of the present invention, one of the gaming machines 2806-2818 may couple to the deploy server 2802 and download one or more installation packages therefrom, as shown at (1). Thereafter, the propagation of the installation packages may be effectuated in a peer-to-peer fashion. For example, the software packages downloaded by or to gaming machine 2806 may thereafter be broadcast at (2) to all or a selected group of gaming machines, such as shown at 2808-2818 in FIG. 28 or propagated in daisy-chain fashion as shown at (2), (3), (4), (5), (6), and (7) to gaming machines 2908 to 2918 in FIG. 29. Alternatively still, the propagation of installation packages downloaded from the deploy server 2902 may be effectuated according to a method shown in FIGS. 22-26 or any combination of such methods. Such methods may be tailored according to the topology of the network, the usage patterns of the gaming machines, their location and any other factor, to insure that the installation packages are rapidly spread through the network of gaming machines. Gaming machines

2806 and 2906 are unique only in that, in this instance, they were the first among their gaming machine peers to receive a new installation package from the deploy server 2802, 2902. Any of the other gaming machines might as well have first received such packages from the server 2802, 2902.

Figure 30:
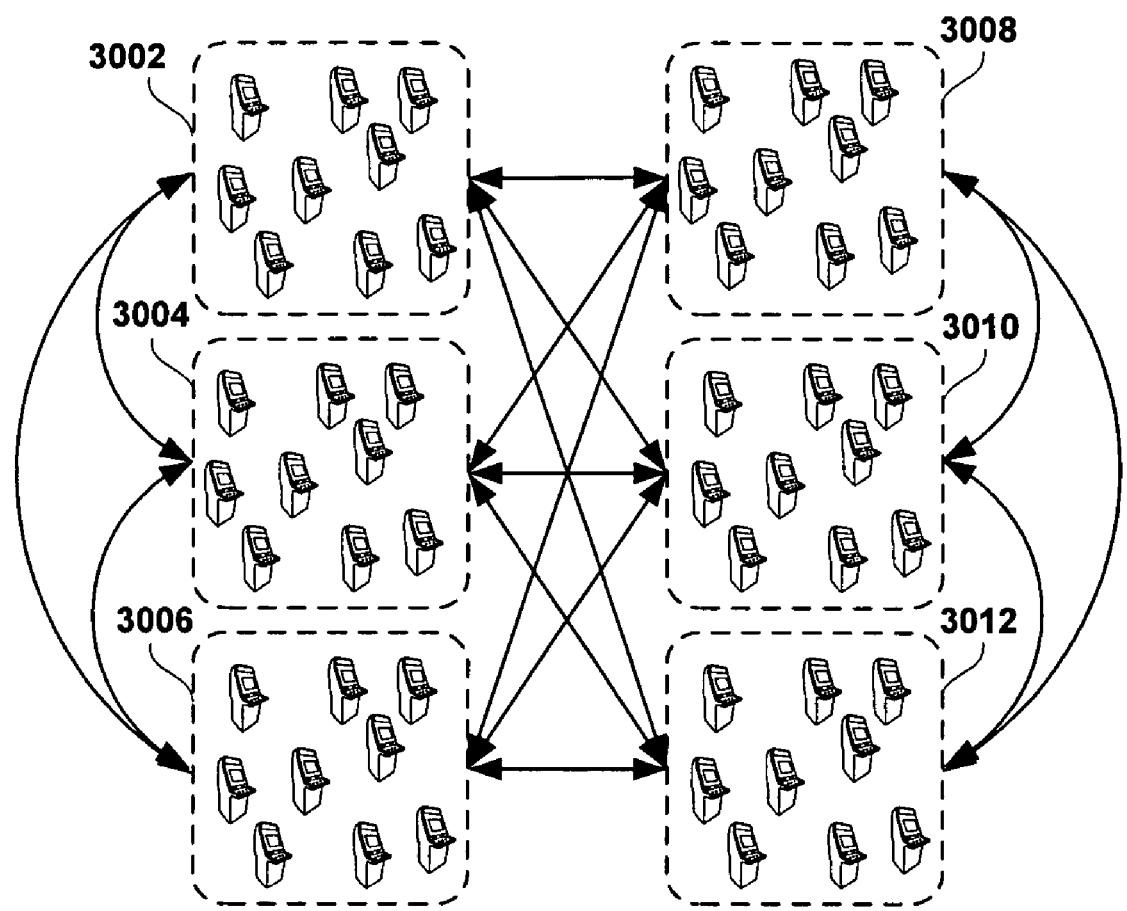
FIG. 30 shows another serverless embodiment of the present invention that utilizes an overlapping broadcasting model to propagate e.g., installation packages from group to group.

FIG. 30 shows further aspects of an embodiment of the present invention. Several groups 3002, 3004, 3006, 3008, 3010 and 3012 of gaming machines (they need not be the same gaming machines, but need only be capable of supporting (or modified to support) the functionality described herein—such as, for example, to configuring and enforcing a Software Restriction Policy) may be interconnected by a network (not shown). For example, one of the gaming machines of the group 3010 may have received new software installation packages that are to be propagated to all or selected other gaming machines in other groups. For example, such group 3010 may broadcast (publish) a message to the effect that a new software installation has been received to other groups. Thereafter, other gaming machines having subscribed to receive such installation packages may respond to this message and establish communication with the originator thereof (and/or one of the peers of the originator gaming machine) for the purpose of downloading the installation packages therefrom, according to a publish-subscribe model. Alternatively, installation packages may be broadcast to each or selected groups and thereafter disseminated through the groups according to one or more of the methods illustrated according to FIGS. 22-26, for example. Alternatively still, the daisy-chain model may be applied to the groups 3002, 3004, 3006 and 3008, each group forwarding the installation packages to one or more groups in the chain. Alternatively still, group 3010 (the first recipient of the installation packages) may choose to send the installation packages (or a message announcing the availability of such packages) to a selected group, the selection being driven by one or more rules. Such rules may specify that the farthest (or the closest) group to the initial recipient is to receive the installation packages or the message. This may then be repeated at the recipient group, which may then propagate the installation packages (or cause them to be propagated) according to the same or different rules. Such an approach may be useful, especially where large estates of gaming machines are concerned. Indeed, such estates may include thousands of interconnected gaming machines, and abstracting away from individual gaming machines to groups of such gaming machines may be expedient.

Figure 31:
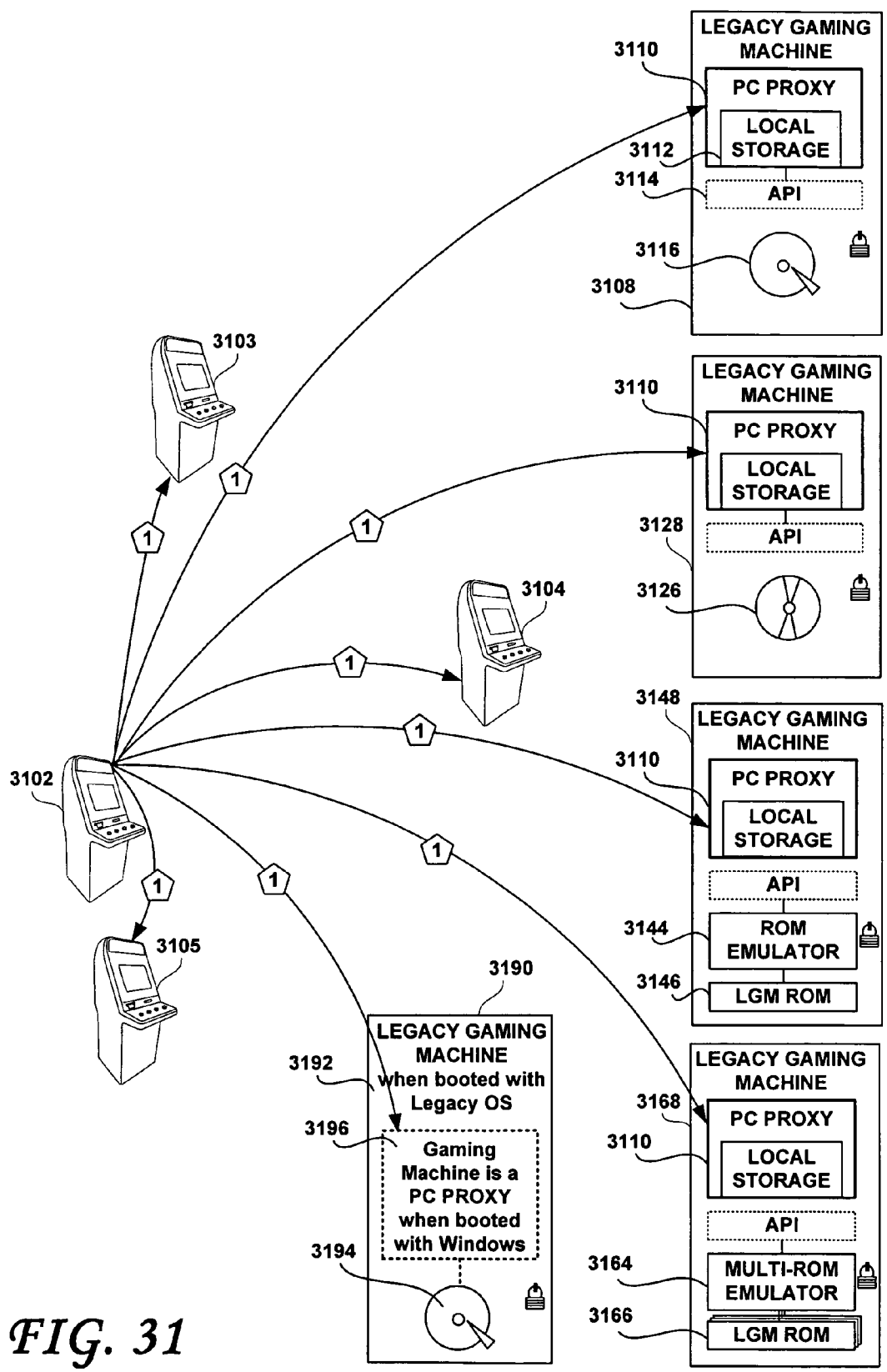
FIG. 31 shows an embodiment of the present invention that allows for legacy gaming machines to have the functionality described herein and to function as integral members of a peer-to-peer environment.
Figure 32:
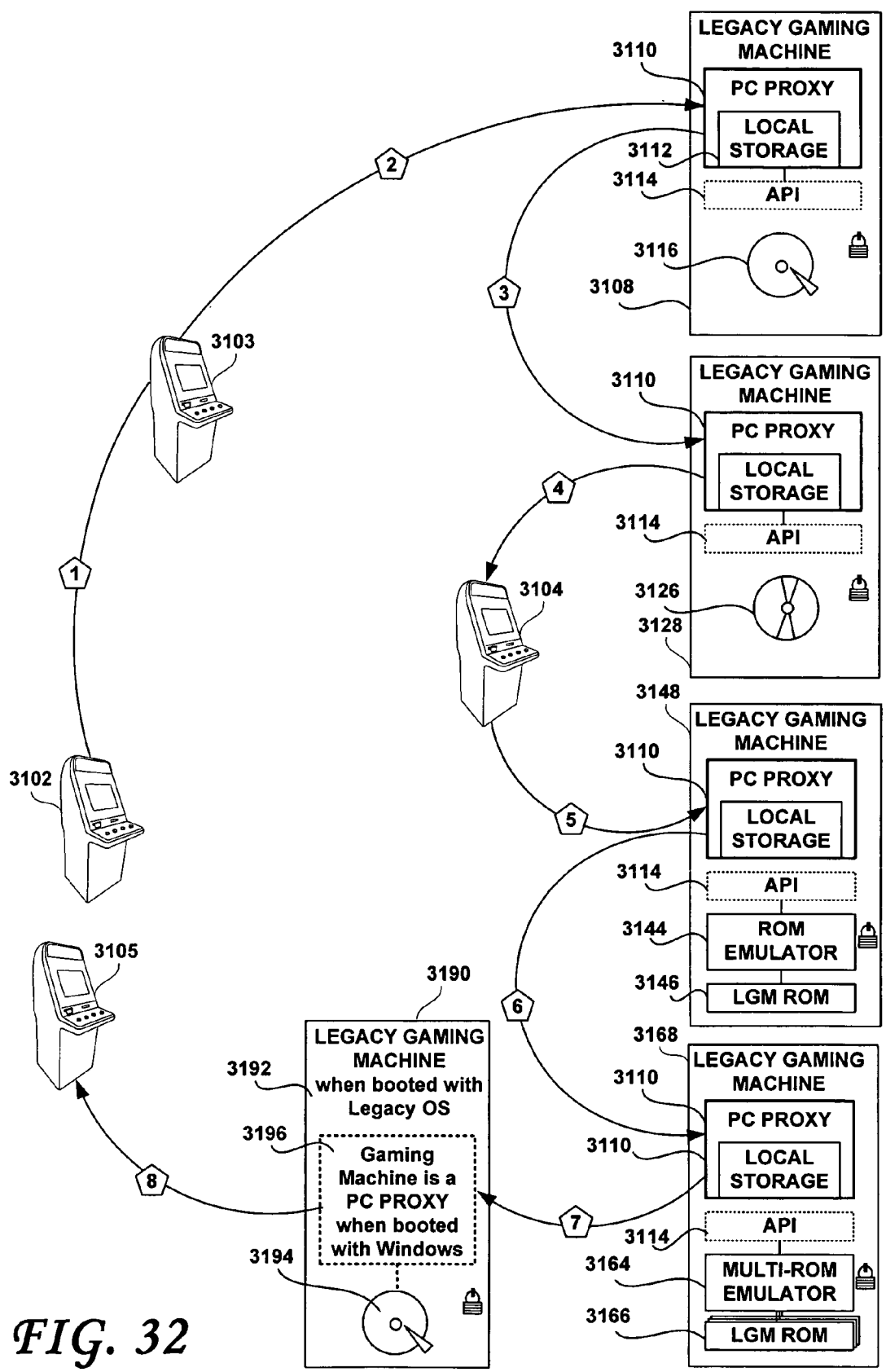
FIG. 32 shows another embodiment of the present invention that allows for legacy gaming machines to have the functionality described herein and to function as integral members of a peer-to-peer environment.

FIG. 31 illustrates aspects of alternative embodiments of the present invention in which legacy gaming machines are provided with the full functionality of the embodiments of the present invention described above, including fully secure game download, dynamic configuration capabilities and the ability to function as a full fledged peer in a PC-based peer-to-peer environment, with the full functionality described above. As shown in FIG. 31, a software installation package has been provided to gaming machine 3102 (by whatever means), whereupon gaming machine 3102 pushes the installation packages (or broadcasts a message noting the availability of such) to gaming machines 3103, 3104 and 3105, as well as to a plurality of legacy gaming machines 3108, 3128, 3148, 3168 and 3190. Similarly, as shown in FIG. 32, the installation packages may propagate in a daisy chain fashion, from gaming machine to gaming machine (either PC based or legacy gaming machines). The gaming machines 3103, 3104 and 3105 may be PC-based (running the Windows® and/or Linux operating system, for example) gaming machines, for example. Within the context of this embodiment of the present invention, a legacy gaming machine may be defined to include gaming machines that are not controlled by a PC based computing device (hardware and BIOS only), are not configured to support the policy/enforce model described above and/or are gaming machines that do not run a recent version of the Windows® Operating System and/or are not configured to support Software Restriction Policies and/or Active Directory (e.g. an embedded operating system or Linux may not be controlled by central server policies). Such gaming machines typically may not include a PC suitable for implementing the above-described functionality. The legacy gaming machines may include a hard disk drive, as shown at 3116 (although the ability of the drive to write to the media may have been disabled by, e.g., a jumper), an optical drive (e.g., CD-ROM) as shown at 3126, a Read Only Memory (ROM or EEPROM) as shown at 3146 or several ROMs and/or EEPROMs, as shown at 3166. Each of the ROMs 3146 and 3166 may include the executable code and/or media files for a single game or may be suitably partitioned to include the executable code and/or media files for more than one game to be made available to the player on the legacy gaming machine. Each of the legacy gaming machines 3108, 3128, 3148, 3168 and 3190 may be housed in a secured, locked cabinet that conforms to local gaming regulations, as symbolized by the padlock on each of the legacy gaming machines. The PC 3110 may be or include a compact embedded industrial PC board, a compact PC box or equivalent small form factor PC (e.g., handheld devices running an embedded version of, e.g., Microsoft Windows® such as embedded XP, WindowsCE, Windows Mobile, Windows SmartPhone, enabled to be controlled from an Active Directory for enforcing policies. Alternatively, policies may be enforced in the PC by configuring local policies from a central server not supporting Active Directory (e.g. a Linux server) by sending and configuring .ADM administration scripts or equivalent commands.

According to an embodiment of the present invention, each of the legacy gaming machines may be provided with a computing device that is configured to support the policy/enforce model described above. For example, each of the legacy gaming machines 3108, 3128, 3148, 3168 and 3190 may be provided with a computing device (such as a PC, for example) that is configured to run a recent version of the Windows® Operating System and that is configured to support Active Directory. As shown in FIG. 31, each PC 3110 may be disposed within the secured and locked enclosure of the legacy gaming machines 3108, 3128, 3148, 3168 and 3190. Each of the PCs 3110 may be provided with local persistent storage including, for example, a hard disk drive, flash memory (non-volatile RAM or NVRAM, for example) and/or other forms of persistent readable and writable memory. An Application Program Interface (API) 3114 intermediates communication between the PC 3110 and the legacy gaming machine software, storage and electronics. Preferably, the API should be examined by the appropriate local gaming authorities and appropriately certified. For ease of reference below, each PC 3110 will be referred to as a "PC proxy" herein below. Advantageously and according to an embodiment of the present invention, each of the legacy gaming machines 3108, 3128, 3148, 3168 and 3190 is simply seen, from the peers (3103, 3104, 3105, 3108, 3128, 3148 and 3168) within the gaming system, as another (e.g., Windows®) PC, and no longer as a legacy gaming machine.

Functionally, the PC proxy 3110 may be configured to communicate with a peer within the gaming system to enable the legacy gaming machine to enforce Software Restriction Policies and to implement functionality for which the legacy gaming machine was not originally configured. In particular, the proxy PC may enable new software, updates and/or media files (for example) to be securely downloaded, installed onto the legacy gaming machine and transferred to other peers in a fully secure, trusted and auditable manner. In particular, embodiments of present invention enable new software to be packaged and wrapped in a secure (by a certificate, for example) package and downloaded to the PC proxy 3110 within the legacy gaming machine, as if the legacy gaming machine had that native capability—that is, as if it were not a legacy gaming machine. According to one embodiment of the present invention, the secure package may be or include a code signed MSI installation package. The MSI package may then be verified in the manner described above, unpacked and transferred from the PC proxy's local storage 3112 to the legacy gaming machine's own storage via an API, as referenced at 3114. As the transfer occurs within the secured and locked physical cabinet of the legacy gaming machine, the transfer is controlled, trusted and secure.

According to an embodiment of the present invention, the code that is wrapped in the MSI package may not be compatible with and/or executable by the proxy PC itself. Indeed, the files contained in the MSI package may be considered, from the PC proxy's point of view, to be data files, as they are not compatible with or executable by the PC proxy. Therefore, the individual software components wrapped in the code signed MSI installation package need not be code signed themselves. According to an embodiment of the present invention, only the MSI package itself may be code-signed with a unique certificate and the appropriate Software Restriction Policy may be configured to enable installation (execution) of this MSI package. The selected non-executable (non-executable to the PC proxy, but executable to the legacy gaming machine) files may receive at least a part number (and preferably a version number as well) that is used in the subject name of the certificate associated with the MSI package. Consequently, according to embodiments of the present invention, when the MSI package is installed within the PC proxy 3110, the certificate may be verified in the same manner as described above. Information similar to that shown and detailed relative to FIG. 3 may be attached to the MSI package. Therefore, the non-executable (to the PC proxy) files that were unwrapped through the execution of the MSI package may now be trusted as having been obtained from a trusted and authorized source. After the MSI package has been unwrapped and verified (the installation will fail if the verification fails), the API 3114 may transfer the constituent software components of the unwrapped MSI package from the PC proxy local storage 3112 to the persistent storage of the legacy gaming machine as needed and installed. Note that no communication between the PC proxy and other peers (such as gaming machine 3102 that broadcasted the installation packages) is necessary when the MSI package is installed.

According to an embodiment of the present invention, when the API is to transfer the files wrapped in the MSI package to the legacy gaming machine, a preliminary step may be carried out to execute the MSI, which automatically verifies (e.g., checks its certificate) and unwraps it. If the MSI package is corrupted, the installation will fail and the API will not be able to transfer the contained files to the legacy gaming machine.

Many legacy gaming machines do not include writable storage or the write features of the storage may have been disabled, as it is typically not allowed to reprogram the machine on the casino floor. Some legacy gaming machines include one or more ROMs (on the legacy gaming machine's motherboard, for example) on which the game software (including executables, configuration and/or media files, for example) may be stored. Typically, the ROM(s) and/or Electrically Erasable ROM(s) (EEPROM(s)) are produced, or are received from a supplier and then are checked by an approved game laboratory. After the ROMs have passed the prescribed gaming laboratory tests, they may be clearly marked and/or sealed with unalterable or tamper-evident labels. To enable such legacy gaming machines 3148 and 3168 to receive new trusted software components, embodiments of the present invention include provisions for one or more ROM emulators. The ROM emulator(s) are disposed within the secured locked cabinet of the legacy gaming machine and subject to the same physical security within the enclosure as are the legacy gaming machine's own native ROM(s), whereby access to the ROM emulator(s) may be restricted by multiple layers of keys locks and tamper detectors. The API 3114 may then communicate with the ROM emulator. The ROM emulator may be coupled to the proxy PC 3110 in any known manner such as, for example, an Ethernet or serial port. If the legacy gaming machine includes more than one ROM, a multi-ROM emulator may be used, or the legacy gaming machine may be configured with a corresponding number of separate ROM emulators. The ROM emulator duplicates (provide an emulation of) the functions of the legacy gaming machine's ROM, so that the emulated ROM appears, to the legacy gaming machine, to behave like the legacy gaming machine's own native ROM. In effect, providing one or more ROM emulators within the locked enclosure of the gaming machine and in communication with the API 3114 and with the PC proxy 3110 enables the legacy gaming machine to emulate a manual change of the ROM(s) and/or EEPROM(s). This emulation uses a secure ROM/EEPROM emulator 3144 whose software image may be downloaded through the trusted and secure mechanism described herein, through code signed MSI installation packages downloaded from a peer gaming machine to the PC proxy 3110 disposed within the secure and locked enclosure of the legacy gaming machine. In this manner, the ROM/EEPROM emulator(s) 3144 effectively bypass the existing ROM(s) and/or EEPROM(s) within the legacy gaming machine. According to an embodiment of the present invention, in the case wherein the legacy gaming machine includes a plurality of ROMs and/or EEPROMs, the ROM/EEPROM emulators or the multi ROM/EEPROM emulators bypass selected ones of the ROM(s)/EEPROM(s) by plugging an emulator probe into each of the ROM(s)/EEPROM(s) to be emulated.

The combination of the PC proxy 3110, the API 3114 and the ROM emulator (if one is needed) provides the legacy gaming machine with powerful new functionalities. For example, the local storage of the PC proxy 3110 may store a plurality of MSI packages (or equivalent digital certificate-bound package), each of which may impart the legacy gaming machine with new or updated functionality. For example, each legacy gaming machine may display a menu of authorized games that is dynamically generated. This may be done by having each legacy gaming machine check the policies enforced on the games by, for example, having a process in each legacy gaming terminal attempt to execute the entry point for each game. Download of any required code signed MSI installation package(s) from a peer gaming machine may occur as soon as the associated Software Installation Policies are enforced (and the SRPs for the MSI installation package is permitted accordingly). Therefore, scheduling of the download from a peer to the PC proxy within the legacy gaming machine may be achieved by simply enforcing the associated software installation policies at a given time; this may be accomplished by having an operator manually enforcing the SIP or having a process automatically enforcing the SIP at a predetermined time via the API. Enforcing a policy may be achieved by linking the selected policy to the selected policy object in the domain controller active directory. Note that the downloads of MSI packages from a peer gaming machine to the PC proxy within the legacy gaming machine may be carried out while a player is playing the legacy gaming machine. If the execution of the MSI package succeeds, then the game is authorized and may be added to the games menu offered to the player. If the execution is denied (SRP is unlinked or the security level is disallowed), then the game is not authorized and it is removed from the games menu offered to the player. Similarly, if a game entry software component file is not found, then the software is not installed or has been removed and is removed from the games menu offered to the player. The process of dynamically generating the game selection menu may be optimized in many ways in order to reduce the game time to start overhead to check if it is authorized.

When the player selects a game from the dynamically generated menu of games available on the legacy gaming machine, the proxy PC 3110 may select the corresponding MSI package (or equivalent secure package) stored in its local storage 3112, unwrap (unpack) it (and, in so doing, check its certificate) and transfer the contents thereof to the ROM emulator 3144 for execution. Alternatively, an appropriate MSI package may be fetched by the PC proxy 3110 from one or more peer gaming machines if the MSI package corresponding to the requested game is not present in the PC proxy's local storage 3112. Thereafter, the fetched MSI package may be checked, unpacked and transferred locally from the PC proxy's local storage 3112 to the writable store and/or ROM emulator of the legacy gaming machine via the API 3114, from within the secured cabinet of the legacy gaming machine.

Game activation and deactivation may be carried out within the legacy gaming machine in the same manner as described above. Specifically, game activation that authorizes execution of the game may be achieved by enforcing the associated Software Restriction Policies. Enabling enforcement of policies as described relative to FIG. 15 and FIG. 16 may be carried out interactively by an authorized user at predetermined authorized times, or alternatively may be controlled by a process at predetermined authorized times via the appropriate API. Note that the policy to be enforced by each of the legacy gaming machines may be changes in a closed loop manner, as described relative to FIG. 18.

Each code signed MSI package is verified each time that it is executed. Should the verification fail, so would the execution of the installation package. However, a global verification procedure may be forced on the legacy gaming machine (s) in a manner similar to that shown in and described above relative to FIG. 9. Such a global verification procedure may be configured to verify each of the MSI packages stored in the PC proxy's local storage 3112. For example, this global verification procedure may be carried out by forcing a reboot of the PC proxy 3110 and optionally a reboot/restart of the legacy gaming machine. Indeed, the PC proxy may be configured to check the certificates of each MSI package (e.g., to check all files having the .msi extension or functional alternative) stored within its local storage. Should any of the locally stored MSI packages fail verification, execution (e.g., installation) thereof would be prevented and/or the MSI package itself deleted or otherwise disabled. From the foregoing, it is apparent that the MSI packages stored in the PC proxy's local storage are secure and may be trusted.

Referring again to FIGS. 31 and 32, according to an embodiment of the present invention, if the legacy gaming machine controller is a PC based controller that is capable of running Microsoft Windows® 3196 (or equivalent operating system software) controlled by policies as well as a legacy operating system 3192 (not capable of being controlled by central policies) such as Linux or other embedded operating system, another embodiment of the present invention includes a double-boot method. When the legacy operating system 3192 is booted, it is configured to execute certified software for the legacy gaming terminal 3190 from a writable mass storage 3194 such as a hard disk, a flash memory or other mass storage device. When the Windows operating system 3196 (or equivalent policy controlled operating system) is booted, it is configured to execute identically as the PC-Proxy described for 3108, 3128, 3148 and 3168, enabling secure download of software from the deploy server to the legacy terminal local storage device 3194. The certified code contained in the MSI package will be installed or copied to a location that will be accessible by the legacy operating system 3192 when booted in turn. Each of the two operating systems may be configured such that a request for re-booting to the other operating system may be requested by an application program executing in the booted mode. Preferably, no connection to the download network is allowed when the legacy operating system 3192 is booted such as to avoid intrusion, as it may not offer secure network communication 3106. A communication link may, however, exist when the legacy gaming machine is booted under the legacy operating system, such as to communicate with a central casino management system via the IGT SAS, IGT SuperSAS or GSA BOB casino standard protocol (IGT=International Game Technology, GSA=Game Standard Association).

According to an embodiment of the present invention, if the PC-Proxy is not joined to a domain and is therefore not able to be controlled directly by a central active directory (AD), a set of policy commands may be sent (called .ADM scripts or administrative scripts in Microsoft Windows®) that will configure the local policies (SRP, SIP, security policies and other policies). Once the local policies are configured and activated (by rebooting or by a policy update command), the PC-Proxy behaves identically as if an AD had directly forwarded the policies.

It is to be noted that when a player at a legacy gaming machines such as shown in FIG. 31 wins an amount equal to or greater than a predetermined amount (currently set at $25,000 in some jurisdictions) in a casino, there is a requirement to check the integrity of the gaming application. When this occurs, the legacy gaming machine may be powered-down and the ROM(s) on which the gaming software is loaded may be extracted in order to be verified in a trusted verifier named a "Kobetron". The Kobetron produces a signature for each of the ROMs that is compared with the corresponding signature produced by the certification lab. In this manner, the integrity of the all the software components of the legacy gaming terminal, including the operating system, the game application and the configuration data may be verified, which game application and configuration data includes game application and data obtained from one of the MSI packages stored in the PC proxy's local memory. According to embodiments of the invention, when executing the global verification process subsequent to booting up the legacy gaming terminal, a verification equivalent to a "Kobetron verification" may be performed. This metaphor helps greatly in the acceptability of downloadable game technology by game regulators who are reluctant to accept state-of-the-art operating systems, multimedia and network technologies. Indeed, although the legacy gaming machine has been provided with all of the advantages and new functionalities described herein, it continues to operate in exactly the same manner as was previously certified. This is because the legacy gaming machine is "unaware" of the presence of the PC proxy 3110, of the API 3114 and of any ROM emulator(s) present therein, as it executes whatever code is loaded in its writable storage and/or ROM emulator (s), whether such code is native to the legacy gaming machine or loaded from a recently downloaded MSI (or equivalent code signed) package.

While the foregoing detailed description has described preferred embodiments of the present invention, it is to be understood that the above description is illustrative only and not limiting of the disclosed invention. Thus, the present invention should be limited only by the claims as set forth below.

What is claimed is:

1. A method for downloading software components to a non-PC based gaming machine over a network, the non-PC based gaming machine including a locked enclosure and persistent storage, the method comprising the steps of:
providing a PC within the locked enclosure of the non-PC gaming machine, the PC including local storage;
connecting the PC to the network;
providing an interface between the PC and the non-PC based gaming machine;
sending directly, from another gaming machine coupled to the network, a package authenticated by code signing only to the PC over the network, the package including the software components to be installed on the non-PC gaming machine;
verifying the code signing and unpacking the software components included in the package, and
enabling the non-PC based gaming machine to execute the unpacked software components.

2. The method of claim 1, wherein the PC runs a version of the Microsoft Windows® operating system.

3. The method of claim 1, wherein the non-PC is a PC hardware not running a version of time Microsoft Windows® operating system.

4. The method of claim 1, wherein the software components are authorized by a regulatory authority.

5. The method of claim 1, wherein the sending step uses a network file copy.

6. The method of claim 1, wherein the package is a Microsoft MSI package.

7. The method of claim 1, wherein the package is equivalent to a Microsoft MSI package.

8. The method of claim 1, wherein the interface includes an Application Program Interface (API).

9. The method of claim 1, wherein the persistent storage of the non PC gaming machine includes a disk drive or a recordable solid state memory storage.

10. The method of claim 9, wherein the enabling step includes a step of storing the unpacked software components on the disk drive or the recordable solid state memory storage through the interface.

11. The method of claim 1, wherein the persistent storage of the non-PC gaming machine includes a ROM.

12. The method of claim 1, wherein the persistent storage of the non-PC gaming machine includes a ROM, wherein the interface includes a ROM emulator and wherein the enabling step includes sending the unpacked software components to the ROM emulator such that the non-PC based gaming machine executes the software components from the ROM emulator, bypassing the execution of the ROM software of the non-PC gaming machine.

13. The method of claim 1, wherein the verifying step includes one of issuing a verification command and a step of rebooting the PC.

14. The method of claim 1, further comprising the step of rebooting the PC and verifying the code signing of any package stored in the PC's local memory upon reboot.

15. The method of claim 8, further including a step of sending a menu of available games to the non-PC based gaming machine and wherein when a game is selected from the menu and software for the selected game is not stored in the non-PC gaming machine, the API further causes the verifying and enabling steps to be carried out on a package corresponding to the selected game.

16. The method of claim 8, further including a step of sending a menu of available games to the non-PC based gaming machine and wherein when a game is selected from the menu and software for the selected game is not stored in the non-PC gaming machine, the API further causes the verifying, unpacking and enabling steps to be carried out on a package corresponding to the selected game.

17. The method of claim 15, wherein the package corresponding to time selected game in the verifying and enabling steps is stored in the PC's local storage.

18. The method of claim 15, wherein tile package corresponding to the selected game is stored on an other gaming machine coupled to the network and wherein the package corresponding to the selected game is directly sent to the local storage of the PC from the other gaming machine prior to the verifying and enabling steps being carried out on the downloaded and stored package.

19. The method of claim 1, wherein the sending step is carried-out in a peer-to-peer fashion or a daisy chain fashion.

20. The method of claim 1, wherein the verifying of the code signing is followed by aborting the method if the package code signing is invalid.

21. The method of claim 1, farther including a step of sending a selected package stored on the PC directly to the PC of another gaming machine.

22. The method of claim 21, wherein the sending is done in a peer-to-peer fashion or in a daisy-chain fashion.

23. The method of claim 1, wherein the verifying of the code signing is performed using software restriction policy or equivalent centrally federated enforcement infrastructure for enabling the execution of authorized software in network nodes using certificate rules, hash rules and/or path rules.

24. The method of claim 1, wherein the code signing uses a distinctive certificate for each package.

25. A method for ensuring that only authorized software components execute on a non-PC based gaming machine connected to a network, the non-PC based gaming machine including a locked enclosure, the method comprising the steps of:
providing a PC within the locked enclosure of the non-PC gaming machine;
connecting the PC to the network;
providing an interface between the PC and the non-PC based gaming machine;
packaging authorized software components that are executable to the non-PC gaming machine but not to the PC into a code signed MSI installation package;
configuring certificate rule policies to enable execution of the code signed MSI installation package;
enforcing the policies, and
directly sending, from another gaming machine coupled to the network, the code signed MSI installation package to the PC within the secure locked enclosure of time non-PC gaming machine, and executing the code signed MSI installation package upon startup of the non-PC based gaming machines or upon a command.

26. The method of claim 25, further comprising the step of booting up the PC within the locked enclosure upon startup of the non-PC gaming machine.

27. The method of claim 25, wherein the code signing uses a distinctive certificate for each MSI installation package.

28. The method of claim 25, wherein the directly sending step is carried-out in a peer-to-peer fashion or a daisy chain fashion.

29. The method of claim 25, wherein the non-PC is a PC hardware not running a version of the Microsoft Windows® operating system.

30. The method of claim 25, wherein the directly sending step uses a network file copy.

31. The method of claim 25, further including a step of sending a selected package stored on the PC directly to the PC of another gaming machine.

32. The method of claim 1, wherein the enforcing the policies is performed using software restriction policy or equivalent centrally federated enforcement infrastructure for enabling the execution of authorized software in network nodes using certificate rules, hash rules and/or path rules.

33. A gaming machine, comprising:
a locked enclosure;
a first computing device disposed within the locked enclosure, the first computing device being configured to run a first operating system and being programmed to enable game play of the gaming machine when the first operating system is booted;
a second computing device disposed within the locked enclosure of the gaming machine, the second computing device being configured to run a second operating system and, when the second operating system is booted, to receive game software components directly from an other gaming machine over a network, and
a mass storage device within the locked enclosure, the mass storage being accessible by the first and the second computing devices;
wherein the second computing device is configured to receive a package authenticated by a code signing directly from the other gaming machine over the network only when booted under the second operating system, the package including the software components to be installed on the mass storage device, and wherein the first computing device is configured to execute the unpacked software components only when booted under the first operating system.

34. The gaming machine of claim 33, wherein the second computing device is further configured to verify the code signing and to unpack the software components included in the package when booted under the second operating system.

35. Time gaming machine of claim 33, wherein time first and second computing devices are configured such that only one of the first and second computing devices can be booted at any given time.

36. Time gaming machine of claim 33, wherein the first computing device is configured to be uncoupled from the network wherein the first computing device is booted under the first operating system.

37. The gaming machine of claim 33, wherein the first operating system is one of Linux, an embedded commercial operating system and a proprietary operating system.

38. The method of claim 33, wherein the second operating system is one of Microsoft Windows® and a commercial operating system capable of secure network communication and of enforcing policies via built-in or third party add-in functionalities.

39. The gaming machine of claim 33, wherein the first computing device is non PC-based.

40. The gaming machine of claim 33, wherein the first computing device is a PC-based gaming machine that is not capable of securely receiving game software components over the network.

41. The gaming machine of claim 33, wherein the first computing device is a PC-based computing device not miming a. version of the Microsoft Windows® operating system.

42. The gaming machine of claim 33, wherein the second computing device includes a PC.

43. The gaming machine of claim 33, wherein the second computing device runs a version of the Microsoft Windows® operating system.

44. The gaming machine of claim 33, wherein receiving a package is carried-out in a peer-to-peer fashion or a daisy chain fashion.

45. The gaming machine of claim 33, wherein receiving a package uses a network file copy.

46. The gaming machine of claim 34, wherein the verifying of the code signing is done under software restriction policy or equivalent centrally federated enforcement infrastructure for enabling the execution of authorized software in network nodes using certificate rules, hash rules and/or path rules.

47. The gaming machine of claim 34, wherein the verifying of the code signing is followed by aborting if the package code signing is invalid.

48. The gaming machine of claim 33, further including sending a selected package stored on the PC directly to the PC of another gaming machine.

49. The gaming machine of claim 48, wherein the sending is done in a peer-to-peer fashion or in a daisy-chain fashion.

50. A method for downloading software components over a network to a first gaming machine controlled by a first computing device, the first gaming machine being disposed within a locked enclosure, a second gaming machine being coupled to the network, the method comprising the steps of:
providing a second computing device within the locked enclosure of the first gaming machine;
connecting the second computing device to the second gaming machine over the network;
providing an interface between the second computing device and the first computing device;
downloading a package authenticated by a code signing directly from the second gaming machine over the network, the package including software components to be installed and executed on the first computing device, the software components not being compatible with the second computing device;
verifying the code signing and unpacking the software components included in the package, and
enabling the first computing device to execute the unpacked software components.

51. The method of claim 50, wherein the downloading step is carried out with the software components not being executable by the second computing device.

52. The method of claim 50, wherein the first providing step is carried out such that the second computing device runs a version of the Microsoft Windows® operating system.

53. The method of claim 50, wherein tile first providing step is carried out with the second computing device including a PC.

54. The method of claim 50, wherein tile package downloading step is carried out with the software components being authorized by a regulatory authority.

55. The method of claim 52, wherein the package includes a Microsoft MSI package or equivalent package.

56. The method of claim 50, wherein the second providing step is carried out such that the interface includes an Application Program Interface (API).

57. The method of claim 50, wherein the verifying step includes one of issuing a verification command and a step of rebooting the second computing device.

58. The method of claim 50, further comprising the step of rebooting the second computing device and verifying the code signing of any package stored in a local memory of the second computing device upon reboot.

59. The method of claim 50, wherein downloading a package is carried-out in a peer-to-peer fashion or a daisy chain fashion.

60. The method of claim 50, wherein downloading a package uses a network file copy.

61. The method of claim 50, wherein the verifying of the code signing is followed by aborting of the method if the package code signing is invalid.

62. The method of claim 50, further including a step of sending a selected package stored on the second computing device directly to a selected gaming machine over the network.

63. The method of claim 62, wherein the sending is done in a peer-to-peer fashion or in a daisy-chain fashion.

64. The method of claim 50, wherein tile verifying of the code signing is performed using software restriction policy or equivalent centrally federated enforcement infrastructure for enabling the execution of authorized software in network nodes using certificate rules, hash rules and path rules.

65. A method for downloading software components to a PC based gaming machine over a network to which a plurality of other gaming machines are coupled, the PC based gaming machine including a persistent data storage, the method comprising the steps of:

configuring the PC based gaming machine with a dual-boot capability including a first operating system and a second operating system, the persistent storage being accessible by the first operating system and by the second operating system;

executing the game software when the first operating system is booted;

connecting the PC to the network when the second operating system is booted;

downloading a package authenticated by a code signing to the PC based gaming machine directly from one of the other gaming machines coupled to the network only when booted under the second operating system, the package including the software components to be installed on the persistent data storage;

verifying the code signing and unpacking the software components included in the package when booted under the second operating system, and enabling time PC based gaming machine when booted under the first operating system to execute the unpacked software components.

66. Time method of claim 65, wherein the first operating system is a selected one of Linux, an embedded commercial operating system and a proprietary operating system.

67. The method of claim 65, wherein the second operating system is a selected one of Microsoft Windows, a commercial operating system capable of secure network communication by enforcing policies via build-in or third party add-in functionalities.

68. The method of claim 65, wherein each of the first and second operating systems is capable of requesting a reboot under the first or second operating systems.

69. The method of claim 65, wherein the software components are authorized by a regulatory authority.

70. The method of claim 65, wherein the package is a Microsoft MSI package.

71. The method of claim 65, wherein the package is equivalent to a Microsoft MSI package.

72. The method of claim 65, wherein downloading a package is carried-out in a peer-to-peer fashion or a daisy chain fashion.

73. The method of claim 65, wherein downloading a package uses a network file copy.

74. The method of claim 65, wherein the verifying of the code signing is followed by aborting of the method if the package code signing is invalid.

75. The method of claim 65, further including a step of sending a selected package stored on the PC directly to the PC of another gaming machine.

76. The method of claim 75, wherein the sending is done in a peer-to-peer fashion or in a daisy-chain fashion.

77. The method of claim 65, wherein the verifying of the code signing is performed using software restriction policy or equivalent centrally federated enforcement infrastructure for enabling the execution of authorized software in network nodes using certificate rules, hash rules and path rules.

78. A network of gaming machines, comprising:

a network;

a first gaming machine including a first locked enclosure, a first computing device disposed within the first locked enclosure for controlling game play on the first gaming machine, a first download-enabled computing device that is configured to selectively couple to the network and disposed within the first locked enclosure, and a second gaming machine;

wherein the first download enabled computing device is configured to couple to the second gaming machine over the network aid to download a package authenticated by a code signing directly from the second gaming machine, the package including software components to be installed and executed on the first computing device.

79. The network of gaming machines of claim 78, wherein the first download-enabled device is further configured to verify the code signing, to unpack the software components included in the package, and to store the unpacked software components in a first mass storage device.

80. The network of gaming machines of claim 79, wherein the first computing device is further configured to execute the unpacked software components.

81. The network of gaming machines of claim 78, wherein the second gaming machine includes a second locked enclosure, a second computing device disposed within the second locked enclosure for controlling game play on the second gaming machine, and a second download-enabled computing device that is configured to be selectively coupled to the network and disposed within the second locked enclosure and wherein the first download enabled computing device is configured to couple to the second download-enabled computing device over the network to download the package.

82. The network of gaming machines of claim 78, wherein the software components are not executable by the first download-enabled computing device.

83. The network of gaming machine of claim 81, wherein the unpacked software components are not executable by the second download-enabled computing device.

84. The network of gaming machine of claim 81, wherein the second download enabled computing device is configured to couple to time first download enabled device over the network and to download a package authenticated ,by a code signing directly from the first download-enabled device, the package including software components to be installed and executed on the second computing device.

85. The network of gaming machines of claim 78, wherein the second gaming machine is configured to couple to the first download enabled device over the network and to download a package authenticated by a code signing directly from the first download-enabled device, the package including software components to be installed and executed on the second gaming machine.

86. The network of gaming machines of claim 78, wherein downloading a package is carried-out in a peer-to-peer fashion or a daisy chain fashion.

87. The network of gaming machines of claim 78, wherein downloading a package uses a network file copy.

88. The network of gaming machines of claim 78, wherein the verifying of the code signing is performed using software restriction policy or equivalent centrally federated enforcement infrastructure for enabling the execution of authorized software in network nodes using certificate rules, hash rules and path rules.

89. The network of gaming machine of claim 78, wherein the verifying of the code signing is followed by aborting if the package code signing is invalid.

90. A method of propagating new software components to a plurality of gaming machines coupled to a network, comprising the steps of:
broadcasting, from one of the plurality of gaming machines coupled to the network, a package authenticated by a code signing directly to other ones of the plurality of gaming machine coupled to time network, the package including the new software components to be installed and executed on the other ones of the plurality of gaming machines coupled to the network,
at each of tile gaming machines to which the package was broadcast, verifying the code signing, unpacking and storing the new software components included in the package, and executing the stored software components.

91. The method of claim 90, wherein the plurality of gaming machines include both PC-based gaming machines and non PC-based gaming machines.

92. The method of claim 90, wherein the verifying of the code signing is performed using software restriction policy or equivalent centrally federated enforcement infrastructure for enabling the execution of authorized software in network nodes using certificate rules, hash rules and path rules.

93. The method of claim 90, wherein the verifying of the code signing is followed by aborting of the method if the package code signing is invalid.

\* \* \* \* \*

UNITED STATES PATENT AND TRADEMARK OFFICE
CERTIFICATE OF CORRECTION

PATENT NO. : 7,600,251 B2  Page 1 of 1
APPLICATION NO. : 11/172518
DATED : October 6, 2009
INVENTOR(S) : Gatto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this

Fifth Day of October, 2010

David J. Kappos
*Director of the United States Patent and Trademark Office*